US 12,223,263 B2

(12) United States Patent
Luthra et al.

(10) Patent No.: US 12,223,263 B2
(45) Date of Patent: Feb. 11, 2025

(54) CORRELATION AND POLICY ENGINE POLICY CREATION SYSTEM AND METHOD OF OPERATION

(71) Applicant: Rakuten Mobile, Inc., Tokyo (JP)

(72) Inventors: Mohit Luthra, Singapore (SG); Nasruddin Shaikh, Tokyo (JP); Rohit Khede, Madhya Pradesh (IN); Vijay Kumar, Madhya Pradesh (IN)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/759,036

(22) PCT Filed: May 23, 2022

(86) PCT No.: PCT/US2022/030603
§ 371 (c)(1),
(2) Date: Jul. 18, 2022

(87) PCT Pub. No.: WO2023/229574
PCT Pub. Date: Nov. 30, 2023

(65) Prior Publication Data
US 2024/0184980 A1    Jun. 6, 2024

(51) Int. Cl.
*G06F 40/186*    (2020.01)
*G06F 3/0482*    (2013.01)
*G06F 3/0486*    (2013.01)
*G06F 9/54*    (2006.01)

(52) U.S. Cl.
CPC ......... *G06F 40/186* (2020.01); *G06F 3/0482* (2013.01); *G06F 3/0486* (2013.01); *G06F 9/542* (2013.01)

(58) Field of Classification Search
CPC .... G06F 40/186; G06F 3/0482; G06F 3/0486; G06F 9/542; H04L 41/0631; H04L 41/12; H04L 41/40; H04L 41/22; H04L 41/0894
See application file for complete search history.

(56) References Cited

U.S. PATENT DOCUMENTS

| 2016/0163186 A1 | 6/2016 | Davidson et al. |
| 2018/0324219 A1* | 11/2018 | Xie .................... H04L 63/0209 |
| 2019/0260804 A1 | 8/2019 | Beck et al. |

FOREIGN PATENT DOCUMENTS

| CN | 110972092 A * | 4/2020 | ............. H04L 12/14 |
| JP | 2002507295 A * | 3/2002 | ......... H04L 63/0263 |

* cited by examiner

*Primary Examiner* — Hassan Mrabi
(74) *Attorney, Agent, or Firm* — HAUPTMAN HAM, LLP

(57) ABSTRACT

A system includes processing circuitry; and a memory connected to the processing circuitry, wherein the memory is configured to store executable instructions that, when executed by the processing circuitry, facilitate performance of operations, including receive a policy template identifier; receive network element selections; receive network element filter parameters; receive network event parameters; receive conjunctive operation parameters; receive action configuration parameters; and create a network policy template to monitor event messages and perform an action based on the action configuration parameters.

20 Claims, 35 Drawing Sheets

Templates > Add Policy Template – RCA Based

✓ Basic Information ◉ Select Elements ○ Policy Definition ○ Action ○ Preview

🔍 Search        All ▽

Select Elements (5)

| Element Group Name | Criteria Type | Element Type | Domain Type | No. of Element(s) | Element Name |
|---|---|---|---|---|---|
| Element Group 1 | Manage Object Type Based | CU-CP, CU-UP | RAN | 10 | Element 1 |
| Element Group 2 | Domain Based | CU-CP | CORE | 3 | Element 2 |
| Element Group 3 | Domain Based | CU-CP, CU-UP | CORE | 6 | Element 3 |
| Element Group 4 | Manage Object Type Based | DU | RAN | 2 | Element 4 |
| Element Group 5 | Domain Based | DU | CORE | 5 | Element 5 |

1502

Previous          Cancel   Next

Templates > Add Policy Template – RCA Based

◉ Basic Information ◉ Select Elements ◉ Policy Definition ◉ Action ◯ Preview

🔍 Search          All ▽

Action Type*  ⤺ 1802  Action Resource* ⤺ 1804  Action* ⤺ 1806  Payload ⤺ 1808
Workflow ▽           LCM                      Restart NF ▽      Xml-payload ☐ Trigger When CR in Progress ⤺ 1810

Selected Elements

| Element Group Name | Criteria Type | Element Type | Domain Type | No. of Element(s) | Element Name |
|---|---|---|---|---|---|
| Element Group 1 | Manage Object Type Based | CU-CP, CU-UP | RAN | 10 | Element 1 |
| Element Group 2 | Domain Based | CU-UP | CORE | 3 | Element 2 |
| Element Group 3 | Domain Based | CU-CP, CU-UP | CORE | 6 | Element 3 |
| Element Group 4 | Manage Object Type Based | DU | RAN | 2 | Element 4 |
| Element Group 5 | Domain Based | DU | CORE | 5 | Element 5 |

⟩ 1502

Previous          Cancel    Next

FIG. 18

Templates
Correlation and Policy Engine — 1906

Q Search

√ Request to create MME Auto Scale Up Policy – 1.0.0 has been sent for approval. — 1902

| Status | Name | Type | Version | Created On | Created by | Last Modified | CR Trigger |
|---|---|---|---|---|---|---|---|
| ☐ Activated | MME Auto Scale Up Policy | Standard | 1.4.9 | xx/xx/xxxx xx:xx:xx | John Q. Public | xx/xx/xxxx xx:xx:xx | ▨ |
| ☐ Activated | MME Auto Healing Policy | RCA Based | 4.0.0 | xx/xx/xxxx xx:xx:xx | John Roe | xx/xx/xxxx xx:xx:xx | ▨ |
| ☐ Ready | MME Auto Scale Down Po. | Standard | 2.2.0 | xx/xx/xxxx xx:xx:xx | John Roe | xx/xx/xxxx xx:xx:xx | ☐ |
| ☐ Activated | MME Auto Scale Up Policy | RCA Based | 8.1.0 | xx/xx/xxxx xx:xx:xx | Johnny Doe | xx/xx/xxxx xx:xx:xx | ▨ |
| ☐ Ready | MME Auto Healing Policy | Standard | 1.4.0 | xx/xx/xxxx xx:xx:xx | John Smith | xx/xx/xxxx xx:xx:xx | ☐ |
| ☐ Draft | MME Auto Scale Up Policy | RCA Based | 3.0.0 | xx/xx/xxxx xx:xx:xx | John Stiles | xx/xx/xxxx xx:xx:xx | ▨ |
| ☐ Activated | MME Auto Scale Down Po | RCA Based | 7.0.1 | xx/xx/xxxx xx:xx:xx | Mary Major | xx/xx/xxxx xx:xx:xx | ▨ |
| ☐ Validation Failed | MME Auto Scale Up Policy | Standard | 5.7.0 | xx/xx/xxxx xx:xx:xx | Richard Miles | xx/xx/xxxx xx:xx:xx | ▨ |
| ☐ Activated | MME Auto Healing Policy | Standard | 2.0.0 | xx/xx/xxxx xx:xx:xx | Joe Bloggs | xx/xx/xxxx xx:xx:xx | ▨ |
| ☐ Ready | MME Auto Scale Up Policy | Standard | 1.4.6 | xx/xx/xxxx xx:xx:xx | Janie Doe | xx/xx/xxxx xx:xx:xx | ☐ |
| ☐ Draft | MME Auto Scale Down Po. | RCA Based | 1.7.0 | xx/xx/xxxx xx:xx:xx | Richard Roe | xx/xx/xxxx xx:xx:xx | ☐ |
| ☐ Activated | MME Auto Scale Up Policy | Standard | 1.5.0 | xx/xx/xxxx xx:xx:xx | Joe Public | xx/xx/xxxx xx:xx:xx | ▨ |

MME Auto Scale Up Policy 1.0.0
Templates > Add Policy Template

Configure Elements / Event

◉ Elements Selection ——— ◉ Event Configuration

NE Types
- Search
- Cluster
- Server
- vRAN APP

Operators
Actions

Event Source* ⌐2502  Event Type* ⌐2504  Event Name* ⌐2506
OBF ▽              Fault ▽              Fault Event 1 ▽

Time Window (mins)* ⌐2508
- 5 +

Define Condition
Match By ⌐2510  Operator         ⌐2512  Value* ⌐2514
Average ▽       Greater Than ▽          90 ▽

Previous                                 Cancel   Next

Correlation and Policy Engine Templates           🔍 Search      All ▽

| Job Status | Policy Template Name | Version | Trigger Count | Last Run | Created ON | Created By |
|---|---|---|---|---|---|---|
| Success | MME Auto Scale Up Policy | 1.4.9 | 5 | xx/xx/xxxx xx:xx:xx | xx/xx/xxxx xx:xx:xx | A |
| Failed | MME Auto Healing Policy | 4.0.0 | 10 | xx/xx/xxxx xx:xx:xx | xx/xx/xxxx xx:xx:xx | B |
| In Progress | MME Auto Scale Down Po. | 2.2.0 | 69 | xx/xx/xxxx xx:xx:xx | xx/xx/xxxx xx:xx:xx | C |
| In Progress | MME Auto Scale Up Policy | 8.1.0 | 100 | xx/xx/xxxx xx:xx:xx | xx/xx/xxxx xx:xx:xx | D |
| Failed | MME Auto Healing Policy | 1.4.0 | 39 | xx/xx/xxxx xx:xx:xx | xx/xx/xxxx xx:xx:xx | E |
| Success | MME Auto Scale Up Policy | 3.0.0 | 87 | xx/xx/xxxx xx:xx:xx | xx/xx/xxxx xx:xx:xx | F |
| Failed | MME Auto Scale Down Po. | 7.0.1 | 67 | xx/xx/xxxx xx:xx:xx | xx/xx/xxxx xx:xx:xx | G |
| In Progress | MME Auto Scale Up Policy | 5.7.0 | 5 | xx/xx/xxxx xx:xx:xx | xx/xx/xxxx xx:xx:xx | H |
| In Progress | MME Auto Healing Policy | 2.0.0 | 78 | xx/xx/xxxx xx:xx:xx | xx/xx/xxxx xx:xx:xx | I |
| Failed | MME Auto Scale Up Policy | 1.4.6 | 4 | xx/xx/xxxx xx:xx:xx | xx/xx/xxxx xx:xx:xx | J |
| Success | MME Auto Scale Down Po. | 1.7.0 | 35 | xx/xx/xxxx xx:xx:xx | xx/xx/xxxx xx:xx:xx | K |
| Failed | MME Auto Scale Up Policy | 1.5.0 | 178 | xx/xx/xxxx xx:xx:xx | xx/xx/xxxx xx:xx:xx | L |

FIG. 34

CORRELATION AND POLICY ENGINE POLICY CREATION SYSTEM AND METHOD OF OPERATION

RELATED APPLICATIONS

The present application is a National Phase of International Application No. PCT/US2022/030603, filed May 23, 2022.

BACKGROUND

Event-driven architecture (EDA) is a software architecture promoting the production, detection, consumption of, and reaction to events. An event is a change in state, or an annotated label based on an entity's log output in a system. For example, when a consumer purchases an online product, the product's state changes from "for sale" to "sold". A seller's system architecture treats this state change as an event whose occurrence is made known to other applications within the architecture. What is produced, published, propagated, detected, or consumed is a message called the event notification, and not the event, which is the state change that triggered the message emission. Events occur and event messages are generated and propagated to report the event that occurred. Nevertheless, the term event is often used metonymically to denote the notification event message. The EDA is often designed atop message-driven architectures, where such a communication pattern includes one of the inputs to be text-based (e.g., the message) to differentiate how each communication is handled.

Event correlation is a technique for making sense of many events and pinpointing the few events that are of interest in the considerable number of events. This is accomplished by looking for and analyzing relationships between events.

BRIEF DESCRIPTION OF THE DRAWINGS

Aspects of the present disclosure are best understood from the following detailed description read with the accompanying FIGS. In accordance with the standard practice in the industry, various features are not drawn to scale. The dimensions of the various features are arbitrarily increased or reduced for clarity of discussion.

FIGS. 13, 14, 15, 16, 17, 18, and 19 are graphical user interfaces (GUIs) for a correlation and policy engine (CPE), in accordance with some embodiments.

FIGS. 22, 23, 24, 25, 26, 27, 28, 29, 30, 31, 32, 33, and 34 are graphical user interfaces (GUIs) for a correlation and policy engine (CPE), in accordance with some embodiments.

DETAILED DESCRIPTION

Figure 1:
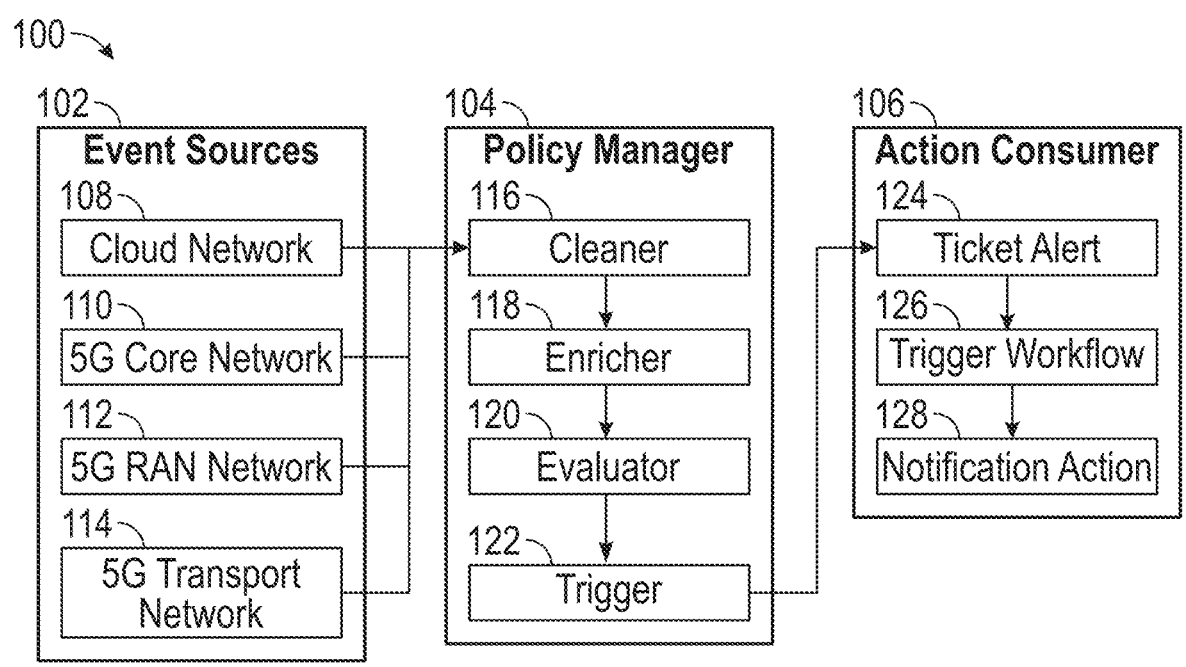
FIG. 1 is a block diagram of a correlation and policy engine (CPE), in accordance with some embodiments.

The following disclosure includes many different embodiments, or examples, for implementing different features of the subject matter. Examples of components, values, operations, materials, arrangements, or the like, are described below to simplify the present disclosure. These are, of course, examples and unintended to limit. Other components, values, operations, materials, arrangements, or the like, are contemplated. For example, the formation of a first feature over or on a second feature in the description that follows include embodiments in which the first and second features are formed in direct contact, and further include embodiments in which additional features are formed between the first and second features, such that the first and second features are unable to contact directly. In addition, the present disclosure repeats reference numerals and/or letters in the various examples. This repetition is for the purpose of simplicity and clarity and does not in dictate a relationship between the various embodiments and/or configurations discussed.

Further, spatially relative terms, such as "beneath," "below," "lower," "above," "upper" and the like, are usable herein for ease of description to describe one element or feature's relationship to another element or feature as illustrated in the FIGS. The spatially relative terms are intended to encompass different orientations of the device in use or operation in addition to the orientation depicted in the FIGS. The apparatus is otherwise oriented (rotated 90 degrees or at other orientations) and the spatially relative descriptors usable herein likewise are interpreted accordingly.

An EDA architectural pattern is applied by the design and implementation of applications and systems that transmit event messages among loosely coupled software components and services. An event-driven system typically consists of event emitters (agents, data sources), event consumers (sinks), and event channels (the medium the event messages travel from emitter to consumer). Event emitters detect, gather, and transfer event messages. An event emitter does not know the consumers of the event messages, the event emitter does not even know whether an event consumer exists, and in the event the consumer exists, the event emitter does not know how the event message is used or further processed. Event consumers apply a reaction as soon as an event message is presented. The reaction is or is not completely provided by the event consumer. For example, the event consumer filters the event message frame while the event policy executes and produces transformation and forwards the event message frame to another component or the event consumer supplies a self-contained reaction to such event message frame. Event channels are conduits in which event message frames are transmitted from event emitters to event consumers. In some embodiments, event consumers become event emitters after receiving event message frame and then forwarding the event message frame to other event consumers. The configuration of the correct distribution of event message frames is present within the event channel. The physical implementation of event channels is based on components, such as message-oriented middleware or point-to-point communication, which might rely on a more appropriate transactional executive framework (such as a configuration file that establishes the event channel).

A correlation and policy engine (CPE) is a software application that programmatically understands relationships. CPEs are configured to be used in system management tools to aggregate, normalize, and analyze event data. Event correlation is a technique for making sense of many events and pinpointing the few events that are important in a mass of information. This is accomplished by looking for and analyzing relationships between events. Further, a CPE is a program or process that receives machine-readable policies and applies them to a particular problem domain to constrain the behavior of network resources.

In other approaches, the CPE has tightly bound capabilities that limits the CPE. For example, multiple use-cases used by tightly bound systems, include: (1) a change management system; (2) a root cause analysis engine (performed in real time), (3) an anomaly detection model engine (performed in real time), (4) an AI model performance engine (performed in real time), (5) a performance analysis engine, (6) a security analytics engine, (7) an on-the-fly policy load/change engine.

Change management systems are an information technology (IT) service management discipline. The objective of change management is to ensure that standardized methods and procedures are used for efficient and prompt handling of all changes to control IT infrastructure, to minimize the number and impact of any related incidents upon service. Changes in the IT infrastructure arise reactively in response to problems or externally imposed requirements, e.g., legislative changes, or proactively from seeking improved efficiency and effectiveness or to enable or reflect business initiatives, or from programs, projects, or service improvement initiatives. Change management ensures standardized methods, processes and procedures which are used for all changes, facilitate efficient and prompt handling of all changes, and maintain the proper balance between the need for change and the potential detrimental impact of changes.

A root cause analysis engine is an algorithm developed to provide an automated version of root cause analysis, the method of problem solving that tries to identify the root causes of faults or problems. The algorithm is configured to be used for inaccurate or inconsistent data, incomplete data, large amounts of data, small datasets, and complex problems such as multi-modal failures or with more than one solution.

In data analysis, anomaly detection (further known as outlier detection) is the identification of rare items, events or observations which raise suspicions by differing significantly from most of the data. Typically, the anomalous items translate to a problem. Anomalies are further referred to as outliers, novelties, noise, deviations, and exceptions. In the context of abuse and network intrusion detection, the interesting objects are often not rare objects, but unexpected bursts in activity. This pattern does not adhere to the common statistical definition of an outlier as a rare object, and many outlier detection methods (unsupervised methods) fail on such data, unless it has been aggregated appropriately.

AI model performance engines monitor AI models for changes such as model degradation, data drift, and concept drift, to ensure the AI model is maintaining an acceptable level of performance.

A performance analysis engine identifies whether service performance targets are being achieved, and where relevant, to provide verifiable evidence. Alerts when service performance is degrading, especially when service performance falls below targets; provides information that helps analyze situations, identify locations, scales, and variances of performance problems, and supports information for proposed remedial action; and tracks the impacts of interventions and remedial measures.

Security analytics engines use both real-time and historical data to detect and diagnose threats. Sources of information include real-time alerts from workstations, servers, sensors, mobile devices, and other endpoints; real-time feeds from other IT security applications (firewalls, intrusion prevention, endpoint detection and response, and other suitable security applications); network traffic volume and types; server logs; and third-party threat intelligence feeds. Security analytics combines data from the various sources and looks for correlations and anomalies within the data.

On the fly policy load/change services periodically download policy and data from servers. The policies and data are loaded on the fly without requiring a restart. Once the policies and data have been loaded, they are enforced immediately. On the fly policy load/change services ensure up-to-date policies and data.

Event processing is a method of tracking and analyzing (e.g., processing) streams of information (e.g., data) about things that happen (events), and deriving a conclusion from them. Complex event processing, or CEP, consists of a set of concepts and techniques for processing real-time events and extracting information from event streams as they arrive. The goal of CEP is to identify meaningful events (such as opportunities or threats) in real-time situations and respond to them as quickly as possible.

A data filter is a computer program or subroutine to process a data stream that produces another data stream. While a single filter is used individually, data filters are frequently strung together to form a pipeline. A data filter, as the name suggests, is used to filter data for desired data elements.

In programming and software design, an event is a change of state (e.g., an action or occurrence) recognized by software, often originating asynchronously from the external environment that is handled by the software. Computer event messages are generated or triggered by a system, by a user, or in other ways based upon the event. Event messages are handled synchronously with the program flow; that is, the software is configured to have one or more dedicated places (e.g., a data sink) where event messages are handled. A source of event messages includes the user, who interacts with the software through the computer's peripherals; for example, by typing on a keyboard. Another source is a hardware device such as a timer. Software is configured to further trigger the software's own set of event messages into the event channel (e.g., to communicate the completion of a task). Software that changes behavior in response to event messages is said to be event-driven, often with the goal of being interactive.

Real-time or real time describes operations in computing or other processes that guarantee response times within a specified time (deadline), usually a relatively short time. A real-time process is generally one that happens in defined time steps of maximum duration and fast enough to affect the environment in which the real-time process occurs, such as inputs to a computing system. In computer science, message queues and mailboxes are software-engineering components typically used for inter-process communication (IPC), or for inter-thread communication within the same process. Message queues use a queue for messaging, the passing of control or of content. In a computer network, downstream refers to data sent from a provider to a consumer. One process sending data primarily in the downstream direction is downloading. In some embodiments, downstream refers to the direction from a shared queue to an event consumer.

FIG. 1 is a block diagram of a correlation and policy engine (CPE) 100, in accordance with some embodiments.

CPE 100 generally includes an event sources input block 102, policy manager block 104, and an action consumer block 106.

Event sources input block 102 includes event emitters (agents, data sources, and other suitable event emitters within embodiments of the present disclosure). Event emitters detect, gather, and transfer event messages. An event emitter does not know the consumers of the event messages, the event emitter does not even know whether an event consumer exists, and in the event the consumer exists, the event emitter does not know how the event message is used or further processed.

Event sources 102 include events from a cloud network 108. Cloud network computing is on-demand availability of computer system resources, especially data storage (e.g., cloud storage) and computing power, without direct active management by the user. Large clouds often have functions distributed over multiple locations, each location being a data center. Event sources from cloud network 108 are events occurring in the cloud network. In a non-limiting example, one or more incidents occurring within a data center (a building, a dedicated space within a building, or a group of buildings used to house computer systems and associated components, such as telecommunications and storage systems) of cloud network 108.

Event sources 102 include events from a 5G core network (CN) 110. A backbone or CN 110 is a part of a computer network which interconnects networks, providing a path for the exchange of information between different local area networks (LANs) or subnetworks. A CN ties together diverse networks in the same building, in different buildings in a campus environment, or over wide areas. A large corporation that has many locations has a CN that ties the locations together, for example, in response to a server cluster needing to be accessed by different departments of a company that are located at different geographical locations. The pieces of the network connections (for example: ethernet, wireless) that bring these departments together is often referred to as the CN. One example of a CN is the Internet backbone. Event sources from 5G CN 110 are events occurring in the 5G CN. In a non-limiting example, one or more incidents occurring within a server cluster (a set of servers that work together and viewed as a single system where each node is set to perform the same task, controlled, and scheduled by software) of 5G CN 110.

Event sources 102 include events from a 5G radio access network (RAN) network 112. A RAN is part of a mobile telecommunication system. RAN implements a radio access technology. RANs reside between a device such as a mobile phone, a computer, or remotely controlled machines and provides connection with a CN, such as CN 110. Depending on the standard, mobile phones and other wireless connected devices are varyingly known as user equipment (UE), terminal equipment, mobile station (MS), or other suitable equipment within embodiments of the present disclosure. Examples of radio access network types include global system for mobile communications (GSM) radio access network, GSM RAN (GRAN), GERAN (essentially the same as GRAN but specifying the inclusion of EDGE packet radio services), universal mobile telecommunications system (UMTS) RAN, UMTS terrestrial RAN (UTRAN), and E-UTRAN (e.g., long term evolution (LTE) high speed and low latency radio access network). Event sources from 5G RAN 112 are events occurring in the 5G RAN. In a non-limiting example, one or more incidents occurring within terminal equipment and or mobile stations of 5G RAN 112.

Event sources 102 include events from 5G transport networks 114. 5G transport networks 114 include fronthaul and backhaul portions.

The backhaul portion of a network includes the intermediate links between the CN, such as CN 110 and small subnetworks at the edge of a network. The most common network type in which backhaul is implemented is a mobile network. A backhaul of a mobile network, also referred to as mobile-backhaul that connects a cell site to the CN. Two methods of mobile backhaul implementations are fiber-based backhaul and wireless point-to-point backhaul. In both the technical and commercial definitions, backhaul generally refers to the side of the network that communicates with the global Internet. Sometimes middle mile networks exist between the customer's own LAN and those exchanges. In some embodiments, this is a local wide area network (WAN) connection.

A fronthaul network is coincident with the backhaul network, but subtly different. In a cloud RAN (C-RAN) the backhaul data is decoded from the fronthaul network at centralized controllers, from where the backhaul data is then transferred to the CN. The fronthaul portion of a C-RAN includes the intermediate links between the centralized radio controllers and the radio heads (or masts) at the edge of a cellular network. Event sources from 5G transport networks 114 are events occurring in the 5G transport networks 114. In a non-limiting example, one or more incidents occurring within radio controllers or network switches of 5G transport networks 114.

Policy Manager 104 is a real-time CEP engine at scale, which automates various workflows and network healing operations. CPE 100 processes events based on policies. Based upon pre-defined policies and rules policy manager 104 filters the events, enriches the events, correlates, and processes the events for action.

Policy manager 104 includes cleaner 116 that accepts the events from event sources block 102, removes unwanted events, and passes the filtered events to enricher 118 for further processing. In some embodiments, these filtered events are forwarded by using a message-policy cache built by a message-policy sync process. In computing messages are passed between programs or between components of a single program. Message passing is a form of communication used in concurrent and parallel computing, object-oriented programming, and channel communication, where communication is made by sending messages to recipients. A message is sent to an object specifying a request for action.

Policy manager 104 includes enricher 118 which enriches the messages arriving from cleaner 116 with inventory information to successfully execute a policy. In some embodiments, enricher 118 is configured with a message-enrichment cache built by an enricher sync process. In a non-limiting example, received event data is missing fields or parameters. Events are then enriched with the help of an inventory to fill the missing fields and parameters so decisions are made, and predetermined actions occur.

Policy manager 104 includes evaluator 120 that evaluates and processes the enriched events arriving from enricher 118. Evaluator 120 is configured to identify root causes (e.g., what is causing or initiating the received events), decide relevant actions pursuant to predetermined policies, and inform action manager 120 accordingly.

Policy manager 104 includes trigger 122 that matches a policy with an event based the output of evaluator 120 identifying the root causes of the received events. Trigger 122 then forwards the matched policy/event to action consumer 106 to begin an action workflow.

Action consumer 106 includes ticket alert 124. Ticket alert 124 creates an incident creation or a trigger to begin a workflow action.

Action consumer 106 includes trigger workflow 126. In some embodiments, trigger workflow 126 performs actions based on a user-created policy. In some embodiments, trigger workflow 126 initiates the sending of a notification. In some embodiments, trigger workflow 126 initiates a reboot, restart, scale in, scale out, or other suitable actions within embodiments of the present disclosure.

Action consumer 106 includes a notification action 128. In some embodiments, notification action 128 is an email, text message or graphical user interface (GUI) display on a user interface, such as user interface 3518 (FIG. 35) notifying the policy creator and/or network operator an event was received, diagnosed, an action taken, and the result of the action taken (e.g., the action taken was successful or failed).

Figure 2:
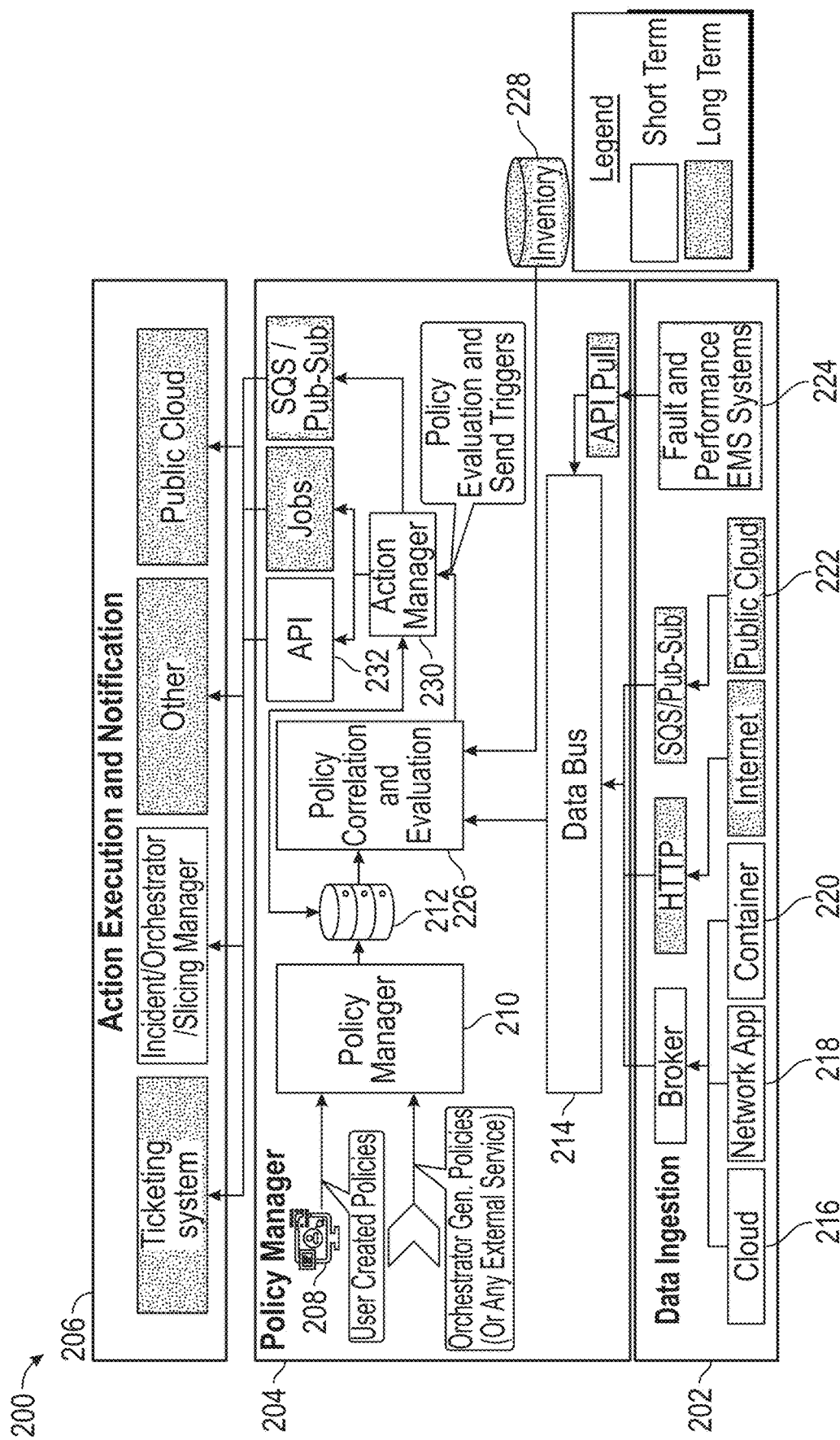
FIG. 2 is a diagrammatic representation a correlation and policy engine (CPE), in accordance with some embodiments.

FIG. 2 is a diagrammatic representation a correlation and policy engine (CPE) 200, in accordance with some embodiments.

In some embodiments, CPE 100 is like CPE 200. In some embodiments, event sources 102 is like data ingestion block 202, policy manager 104 is like policy manager 204, and action consumer 106 is like action manager 230.

Policy Manager 204 is a real-time CEP engine at scale, which automates various workflows and network healing operations (e.g., repair and/or restoration). Policy manager 204 processes events based on predetermined policies and/or rules. Policy manager 204 filters the events, enriches the events, correlates, and processes the events for action. Policy manager 204 provides a framework to support CEP capabilities. In some embodiments, in memory computation logic mitigates latency issues. In some embodiments, multi-source events ingestion covers broader use cases in complex networks and infrastructure. In some embodiments, policy manager 204 is configured with scalable architecture based upon a business requirement (e.g., a new business policy being implemented). In some embodiments, policy manager 204 supports multiple computation logic in near-real time processing, such as event followed by, event AND, event OR, count of event occurrences, and mathematical operations on event counters. In a non-limiting example, the computation logic supports performing an action managed by action manager 230 in response to XYZ event, followed by ABC event, AND (UVW event OR DEF event) along with ten event GHI occurrences. In some embodiments, policy queries are applied on a potentially infinite stream of data. In some embodiments, events are processed immediately. In some embodiments, once policy manager 204 processes all events for a matching sequence, results are driven directly. In some embodiments, this aspect effectively leads to policy manager 204 having a near real-time capability.

Users and/or network operators create policy templates using UI 208. In some embodiments, UI 208 is configured with GUIs that are configured to allow a user to view policy creation templates where the user enters information to create a policy. In some embodiments, UI 208 is like UI 3518. In some embodiments, an orchestrator (orchestration is the automated configuration, coordination, and management of computer systems and software) provides general policies, artificial intelligence (AI) generated policies or policies from any external service. The generated policies are sent to policy manager 210 and policy manager 210 relays the created policies to database 212.

The created policy templates are saved in database 212 as a draft. The policy templates are configured to be validated, activated, de-activated, edited, and deleted. Thus, templates are stored in database 212 until needed and then activated upon command by a user.

Data bus 214 receives data from various sources from data ingestion block 202, such as cloud platform 216, network applications 218, container applications 220, other events through the Internet, events through a public cloud 222, and events through a fault and performance system 224.

In response to received event data at data bus 214 missing fields and/or parameters, these events with missing fields and/or parameters are enriched at policy correlation and evaluation (PCE) module 226 through inventory 228 that provides the missing fields and/or parameters, to make decisions and take predetermined actions. In some embodiments, this is referred to as inventory enrichment.

PCE module 226 logically evaluates and processes the events from data bus 214 based on policies from policy manager 210. PCE 226 is configured to identify root causes of events, determine relevant actions pursuant to the predetermined policies, and inform action manager 230 accordingly of any relevant actions pursuant to the predetermined policies.

Action manager 230 accepts the results after event processing by PCE 226 and takes the corresponding action related to that result. In a non-limiting example, action manager 320 sends an email, sends a request to an API endpoint 232, or other suitable action within embodiments of the present disclosure. Action Manager 230 obtains the status of the executed action and updates the database 212 so that users visualize a job status in UI 208.

Figure 3:
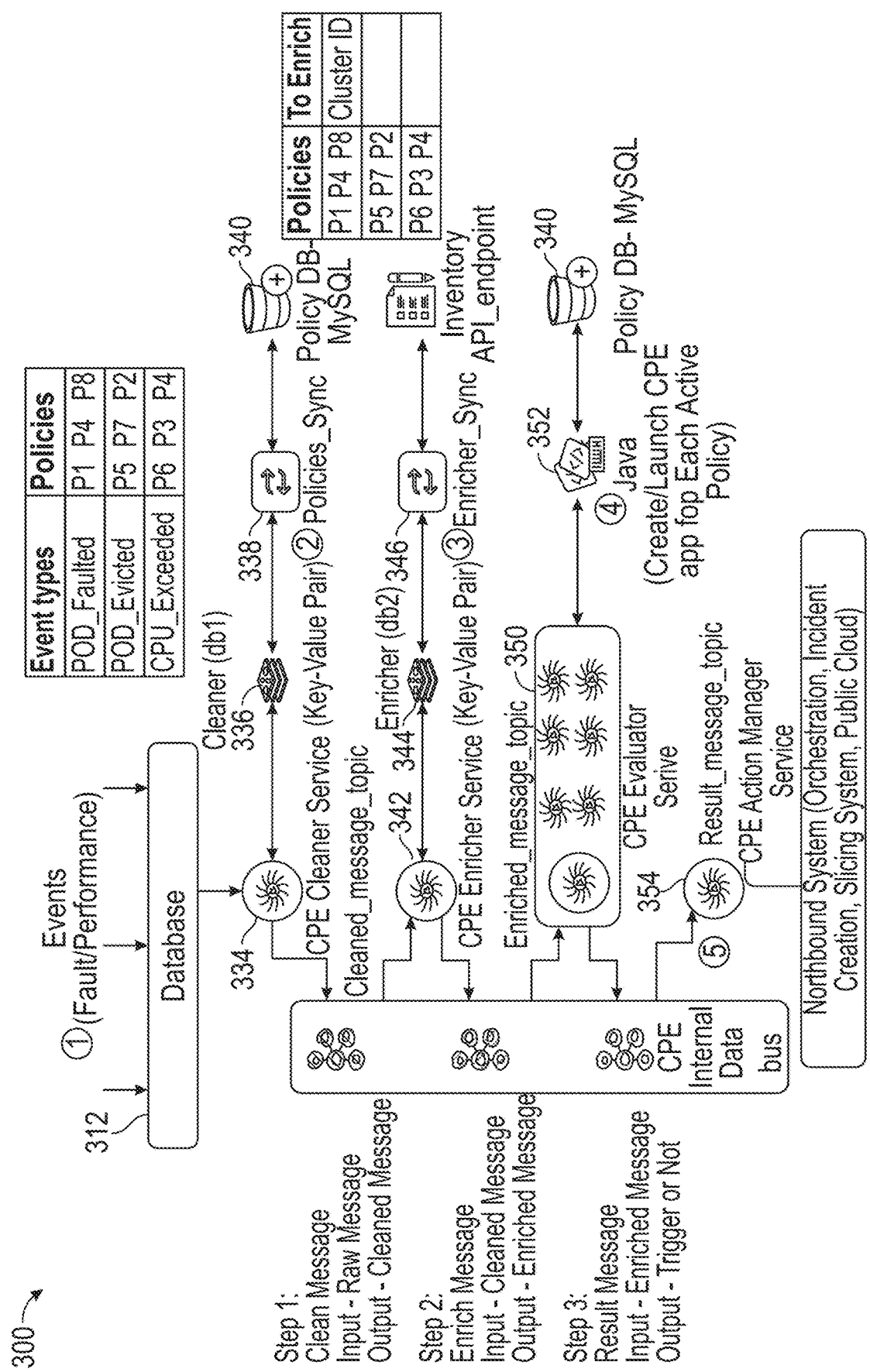
FIG. 3 is a pictorial diagram representation a correlation and policy engine (CPE), in accordance with some embodiments.

FIG. 3 is a pictorial diagram representation a correlation and policy engine (CPE) 300, in accordance with some embodiments.

Figure 4:
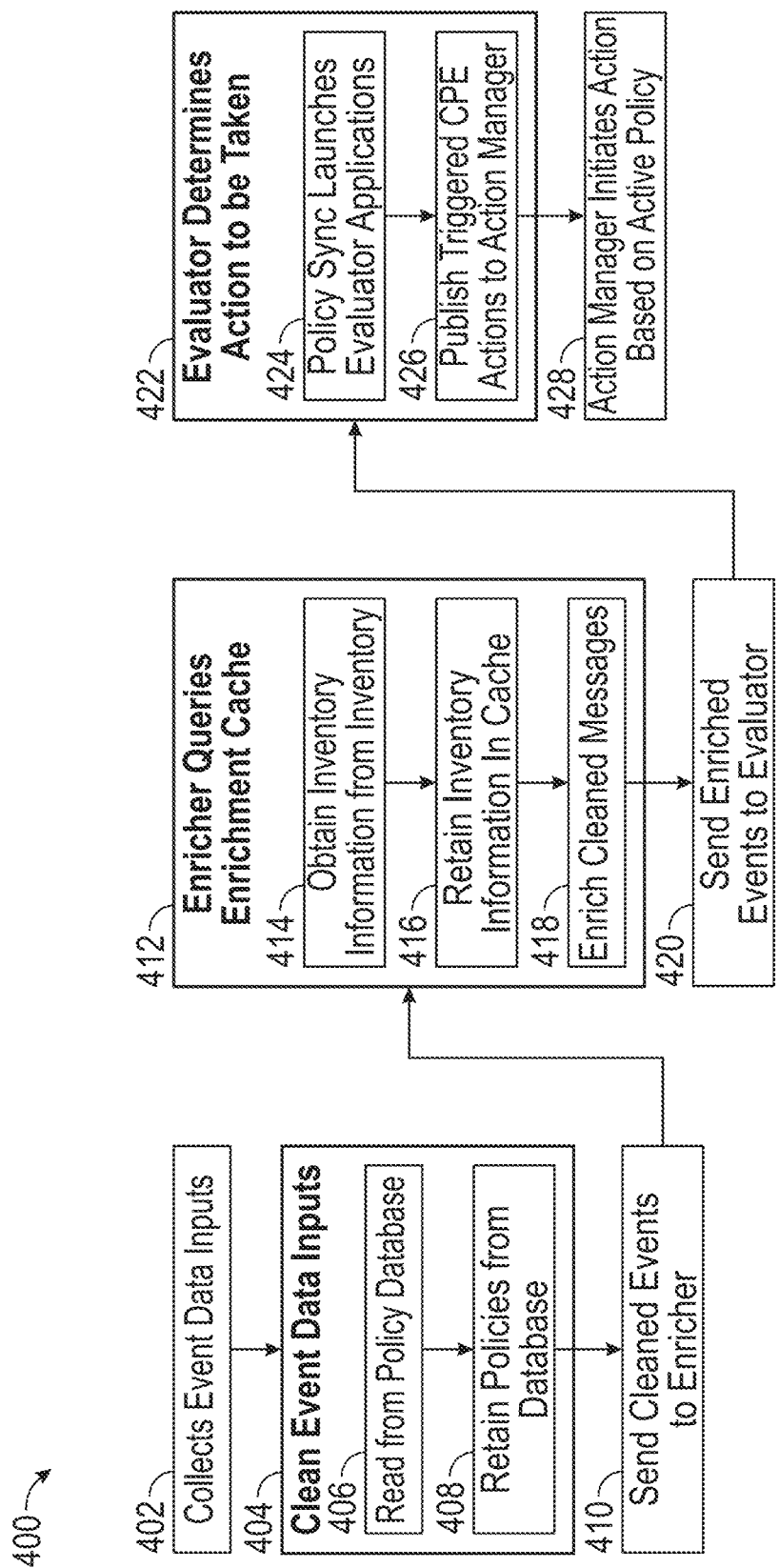
FIG. 4 is a flow diagram of a method for policy correlation and action management, in accordance with some embodiments.

FIG. 4 is a pictorial diagram representation of a method for implementing a correlation and policy engine (CPE) 400, in accordance with some embodiments.

FIGS. 3 and 4 are discussed together to provide an understanding of the operation of CPE 300 through method for implementing a correlation and policy engine (CPE) 400. In some embodiments, method for implementing a CPE 400 is a functional overview of a CPE, such as CPEs 300, 200, or 100. Method 400 is executed by processing circuitry 3502 discussed below with respect to FIG. 35. In some embodiments, some, or all the operations of method 400 are executed in accordance with instructions corresponding to instructions 3506 discussed below with respect to FIG. 35.

Method 400 includes operations 402-428, but the operations are not necessarily performed in the order shown. Operations are added, replaced, order changed, and/or eliminated as appropriate, in accordance with the spirit and scope of disclosed embodiments. In some embodiments, one or more of the operations of method 400 are repeated. In some embodiments, unless specifically stated otherwise, the operations of method 400 are performed in order.

In some embodiments, CPE 300 analyzes, computes, enriches, and evaluates the collected events. In some embodiments, a user creates policy templates through a user interface (UI), such as UI 208 or UI 3518. The created policy filters the collected events, enriches the events (e.g., adds any related event data), correlates the enriched event and then processes the enriched event for action. In some embodiments, created policy templates are saved in a database as a draft where a user validates, activate, de-activate, edit, delete, and other suitable modifications to policy templates within embodiments of the present disclosure. In some embodiments, collected event data is missing parameters and these events are enriched with event data within an inventory so that processing is performed, and actions taken.

A user interface (UI), such as UI 208 or UI 3518, is the space where interactions between humans and machines occur. The goal of this interaction is to allow effective operation and control of the machine from the human end, while the machine simultaneously feeds back information that aids the operators' decision-making process. Non-limiting examples of UIs include the interactive aspects of computer operating systems, hand tools, heavy machinery operator controls, and process controls. UIs are composed of one or more layers, including a human-machine interface (HMI) that interfaces machines with physical input hardware such as keyboards, mice, or game pads, and output hardware such as computer monitors, speakers, and printers. A device that implements an HMI is called a human interface device (HID). Other terms for human-machine interfaces are man-machine interface (MMI) and, when the machine in question is a computer, human-computer interface. Additional UI layers may interact with one or more human senses, including: tactile UI (touch), visual UI (sight), auditory UI (sound), olfactory UI (smell), equilibria UI (balance), and gustatory UI (taste).

A database is a structured collection of data. Databases are anything from a simple shopping list to a picture gallery or a place to hold vast amounts of information in a corporate network. A relational database is a digital store collecting data and organizing the collected data according to a relational model. In this model, tables consist of rows and columns, and relationships between data elements all following a logical structure. A relational database management system (RDBMS) is the set of software tools used to implement, manage, and query such a database.

A cache is a hardware or software component that stores data so that future requests for that data are served faster. The data stored in a cache might be the result of an earlier computation or a copy of data stored elsewhere. A cache hit occurs when the requested data is found in a cache, while a cache miss occurs when it unable to be found. Cache hits are served by reading data from the cache, which is faster than recomputing a result or reading from a slower data store; thus, the more requests that are served from the cache, the faster the system performs.

An action is triggered based upon a matched policy. In some embodiments, a CPE core, such as processing circuitry 3502 of FIG. 35, logically evaluates and processes the collected events. In some embodiments, the CPE core identifies root causes, decides relevant actions pursuant to pre-determined policies (discussed above) and instruct an action manager according to the predetermined policies. In some embodiments, the action manager collects the results of event processing and takes a respective action related to the collected result. In a non-limiting example, the action manage sends an email, sends a request to an application programming interface (API) endpoint, and other suitable actions within embodiments of the present disclosure. In some embodiments, the action manager obtains job status feedback to determine the status of the executed job and update a back-end application at the database, so that users determine a status of the job through a UI.

An API is a connection between computers or between computer programs. An API is a type of software interface, offering a service to other pieces of software. An API specification is a document or standard that describes how to build or use such a connection or interface. A computer system that meets this standard is said to implement or expose an API. The term API refers either to the specification or to the implementation. In contrast to a UI, which connects a computer to a person, an application programming interface connects computers or pieces of software to each other. An API is not intended to be used directly by a person (e.g., the end user) other than a computer programmer who is incorporating the API into the software. An API is often made up of different parts which act as tools or services that are available to the programmer. A program or a programmer that uses one of these parts is said to call that portion of the API. The calls that make up the API are also known as subroutines, methods, requests, or endpoints.

Auto healing operation is triggered through CPE 300. In some embodiments, zero-touch network healing is implemented. In a non-limiting example, a user creates a policy through a UI for network healing (e.g., automatic fault resolution). Continuing with the non-limiting example, in response to a fault event being detected and filtered by CPE 300, the filtered fault activates the user created policy. Continuing with the non-limiting example, CPE 300 sends enrichment request to an inventory for topology information of the affected network function. Continuing with the non-limiting example, CPE 300 sends requests to an orchestrator (orchestration is the automated configuration, coordination, and management of computer systems and software) for a network function restart and CPE 300 updates the job status in a CPE UI, such as UI 208 or UI 3518. Continuing with the non-limiting example, based upon the status of the network function restart, a request is made of CPE 300 to take follow up action. For example, in response to the network function restart failing, then CPE 300 sends a request to the orchestrator for a network re-instantiate (e.g., to create again as an instance of a class). Continuing with the non-limiting example, the network re-instantiate request is sent to a cloud adapter that relays the status of the network re-instantiate and the CPE updates the job status in the CPE UI.

Thus, the automatic network healing proceeds from fault detection to fault repair, to repair verification, to status update all based upon a user predetermined policy.

Zero-touch provisioning (ZTP) is a method of setting up devices that automatically configures the device using a switch feature. ZTP helps IT teams quickly deploy network devices in a large-scale environment, eliminating most of the manual labor involved with adding them to a network. ZTP is found in devices and tools such as network switches, routers, wireless access points and firewalls. The goal is to enable IT personnel and network operators to install networking devices without manual intervention. Manual configuration takes time and is prone to human error especially with large amounts of devices being configured. ZTP is faster, reduces the chance of error and ensures configuration consistency. Zero-touch provisioning is also used to automate the system updating process. Using scripts, ZTP connects configuration management platforms and other tools for configuration or updates.

Network topology is the arrangement of elements (e.g., links, nodes, and other suitable elements within embodiments of the present disclosure) of a communication network. Network topology is used to define or describe the arrangement of various types of telecommunication networks, including command and control radio networks, industrial fieldbuses, and computer networks. Network topology is the topological structure of a network and is depicted physically or logically. Topology is an application of graph theory wherein communicating devices are modeled as nodes and the connections between the devices are modeled as links or lines between the nodes. Physical topology is the placement of the various components of a network (e.g., device location and cable installation), while logical topology illustrates how data flows within a network.

In operation 402 of method 400, CPE 300 collects near real time performance and event data inputs. In some embodiments, event data inputs are cloud platform events, network application counters, container counters, internet events, public cloud events, fault and performance events or other suitable events within embodiments of the present disclosure. Database 312 accepts events from one or more sources and publishes the events using CPE input messages so that CPE cleaner 334 subscribes to the events and filters the corresponding events. Process flows from operation 402 to operation 404.

In operation 404 of method 400, CPE cleaner 334 filters unwanted events and passes the filtered events for further processing by message-policy cache 336 built by message-policy sync 338. In some embodiments, message-policy cache 336 is a remote dictionary server such as an in-memory data structure store, used as a distributed, in-memory key-value database, cache, and message broker, with optional durability. Message-policy cache 336 supports various types of abstract data structures, such as strings, lists, maps, sets, sorted sets, hyper-logs, bitmaps, streams, and spatial indices. Process flows from operation 404 to operation 406.

In operation 406 of method 400, message-policy sync 338 reads from policy database 340 the active policies in CPE 300 and creates an active policy cache in massage-policy cache 336 such that the policies with the same triggering event type are grouped together. Process flows from operation 406 to operation 408.

In operation 408 of method 400, message-policy cache 336 retains a cache of the policy information provided by message-policy sync 338. Thus, message-policy cache 336 retains real-time current policy information. Process flows from operation 408 to operation 410.

In operation 410 of method 400, CPE cleaner 334 publishes CPE cleaned messages (cleaned or filtered events) to CPE enricher 342. Process flows from operation 410 to operation 412.

In operation 412 of method 400, CPE enricher 342 enriches the cleaned message from CPE cleaner 334 with inventory information (e.g., filling in any missing parameters) to successfully execute a policy, by using message-enrichment cache 344 built by enricher sync 346. Process flows from operation 412 to operation 414.

In operation 414 of method 400, an enricher sync occurs where enricher sync 346 obtains inventory information from a policy-message enrichment database table (a database table in inventory 348 which has information about what inventory information is to be enriched for each message type) and save the information to message-enrichment cache 344. Thus, CPE enricher 342 quickly identifies whether an event needs enriching (i.e., adding missing data to the event). Process flows from operation 414 to operation 416.

In operation 416 of method 400, message-enrichment cache 344 retains a cache of the information provided by enricher sync 346. Process flows from operation 416 to operation 418.

In operation 418 of method 400, message-enrichment cache 344 enriches information (e.g., using the information from inventory 348) for each cleaned message from CPE cleaner 334. Process flows from operation 418 to operation 420.

In operation 420 of method 400, the enriched CPE enriched messages are sent to CPE evaluator 350. Process flows from operation 420 to operation 422.

In operation 422 of method 400, CPE evaluator 350 performs CEP and determines whether an action is to be triggered based upon the enriched message or not. Process flows from operation 422 to operation 424.

In operation 424 of method 400, there is a CPE evaluator 350 created for each active policy template by policy CPE sync 352. Policy CPE sync 352 is the entity which creates and/or launches the one or more CPE Evaluator applications 350 for each active policy. Process flows from operation 424 to operation 426.

In operation 426 of method 400, triggered CPE actions are published by CPE Evaluators 350. CPE action manager 354 is subscribed to the published CPE actions. Process flows from operation 426 to operation 428.

In operation 428 of method 400, CPE action manger 354 initiates the API trigger to trigger an action which based upon the CPE evaluator application 350 (e.g., based on the active policy template).

Figure 5:
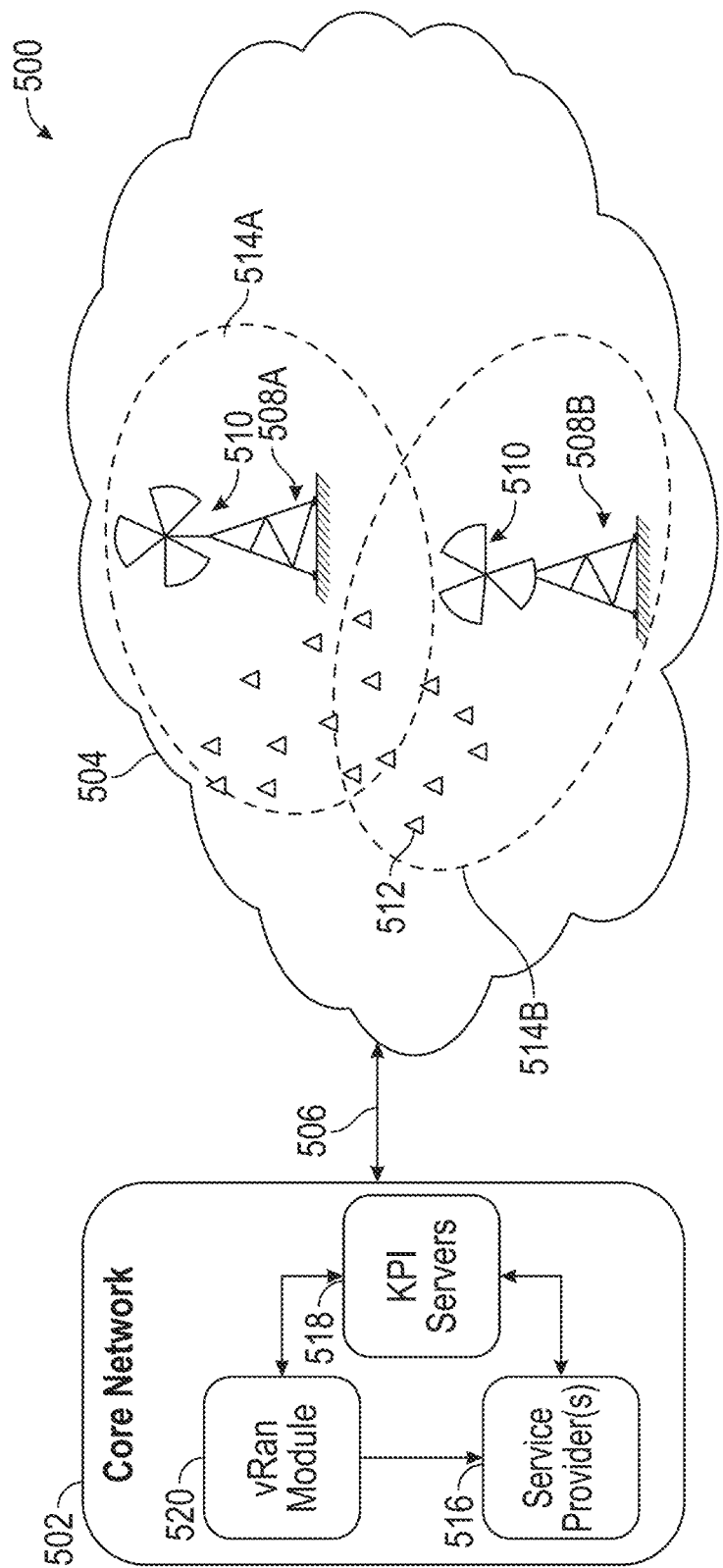
FIG. 5 is a diagrammatic representation of a virtualized Radio Access Network (vRAN) system, in accordance with some embodiments.

FIG. 5 is a diagrammatic representation of a virtualized radio access network (vRAN) system 500, in accordance with some embodiments.

VRAN system 500 includes a CN 502 communicatively connected to RAN 504, through backhaul 506, which is communicatively connected to base stations 508A and 508B (hereinafter base station 508), with antennas 510 that are wirelessly connected to UEs 512 located in geographic coverage cells 514A and 514B (hereinafter geographic coverage cells 514). CN 502 includes one or more service provider(s) 516, KPI servers 518, and vRAN module 520.

In some embodiments, CN 502 is like 5G core network 112 of FIG. 1. CN 502 (also known as a backbone) is a part of a computer network which interconnects networks, providing a path for the exchange of information between different Local Area Networks (LANs) or subnetworks. In some embodiments, CN 502 ties together diverse networks over wide geographic areas, in different buildings in a campus environment, or in the same building.

In some embodiments, RAN 504 is like 5G RAN network 114 of FIG. 1. RAN 504 is a GSM RAN, a GSM/EDGE RAN, a UMTS RAN (UTRAN), an E-UTRAN, Open RAN (O-RAN), virtual RAN (v-Ran), or a Cloud-RAN (C-RAN). RAN 504 resides between user equipment 512 (e.g., mobile phone, a computer, or any remotely controlled machine) and CN 502. RAN 504 is shown as a C-RAN for purposes of simplified representation and discussion In some embodiments, backhaul 506 is like 5G transport network 114 in FIG. 1. In a hierarchical telecommunications network, backhaul 506 of VRAN system 500 comprises the intermediate link(s) between CN 502 and RAN 504. The two main methods of mobile backhaul implementations are fiber-based backhaul and wireless point-to-point backhaul.

Other methods, such as copper-based wireline, satellite communications and point-to-multipoint wireless technologies are being phased out as capacity and latency requirements become higher in 4G and 5G networks. Backhaul generally refers to the side of the network that communicates with the global internet. The connection between base station 508 and UE 512 begins with backhaul 506 connected to CN 502. In some embodiments, backhaul 506 includes wired, fiber optic and wireless components. Wireless sections include using microwave bands, mesh, and edge network topologies that use a high-capacity wireless channels to get packets to the microwave or fiber links.

In some embodiments, base stations 508 are lattice or self-supported towers, guyed towers, monopole towers, and concealed towers (e.g., towers designed to resemble trees, cacti, water towers, signs, light standards, and other types of structures). Base stations are known by other names such as base transceiver station, mobile phone mast, or cell tower. In some embodiments, base stations are replaced with edge devices configured to wirelessly communicate with UEs. The edge device provides an entry point into service provider CNs, such as CN 502. Examples include routers, routing switches, Integrated Access Devices (IADs), multiplexers, and a variety of Metropolitan Area Network (MAN) and Wide Area Network (WAN) access devices.

In at least one embodiment, antenna(s) 510 are a sector antenna. In some embodiments, antenna 110 operates at microwave or Ultra-High Frequency (UHF) frequencies (300 MHz to 3 GHz). In other examples, antenna(s) 110 are chosen for their size and directional properties. In some embodiments, the antenna(s) 110 are MIMO (Multiple-Input, Multiple-Output) antenna that send and receive greater than one data signal simultaneously over the same radio channel by exploiting multipath propagation.

In some embodiments, UEs 512 are a computer or computing system. Additionally or alternatively, UEs 512 have a Liquid Crystal Display (LCD), Light-Emitting Diode (LED) or Organic Light-Emitting Diode (OLED) screen interface providing a touchscreen interface with digital buttons and keyboard or physical buttons along with a physical keyboard. In some embodiments, UE 512 connects to the Internet and interconnect with other devices. Additionally or alternatively, UE 512 incorporates integrated cameras, the ability to place and receive voice and video telephone calls, video games, and Global Positioning System (GPS) capabilities. Additionally or alternatively, UEs run Operating Systems (OS) that allow third-party apps specialized for capabilities to be installed and run. In some embodiments, UEs 512 are a computer (such as a tablet computer, netbook, digital media player, digital assistant, graphing calculator, handheld game console, handheld Personal Computer (PC), laptop, Mobile Internet Device (MID), Personal Digital Assistant (PDA), pocket calculator, portable medial player, or ultra-mobile PC), a mobile phone (such as a camera phone, feature phone, smartphone, or phablet), a digital camera (such as a digital camcorder, or Digital Still Camera (DSC), Digital Video Camera (DVC), or front-facing camera), a pager, a Personal Navigation Device (PND), a wearable computer (such as a calculator watch, smartwatch, head-mounted display, earphones, or biometric device), or a smart card.

In at least one embodiment, geographic coverage cells 514 are of any shape and size. In some embodiments, geographic coverage cells 514 are a macro-cell (covering 1 Km-30 Km), a micro-cell (covering 200 m-2 Km), or a pico-cell (covering 4 m-200 m).

Service provider(s) 516 are businesses, vendors, or organizations that sell bandwidth or network access by providing direct Internet backbone access to Internet service providers and usually access to its Network Access Points (NAPs). Service providers are sometimes referred to as backbone providers, Internet providers, or vendors. Service providers consist of telecommunications companies, data carriers, wireless communications providers, Internet service providers, and cable television operators offering high-speed Internet access.

KPI servers 118 produce both predictions and live network data. Live-network data (KPIs, UE/cell/MDT (Minimization of Drive Test) traces, and crowdsourced data) allows for modelling of network traffic, hot-spot identification, and radio signal propagation.

vRAN 504 is a type of RAN with its networking functions separated from the hardware running the networking functions. vRAN module 520 provides the control and data planes of vRAN 504 that are also separated as part of the virtualization. vRAN module 520 provides network function virtualization (NFV) which is the practice of turning hardware-based functions into software. In an NFV architecture, the hardware is typically commercial off-the-shelf (COTS) standard hardware. vRAN module 520 adapts to changes in RAN 504 quicker. vRAN module 520 allows change without having to replace hardware throughout the entire infrastructure. vRAN module 520 instead updates software. Upgrading the RAN software improves the network's connectivity, efficiency, or security among other functions.

Figure 6:
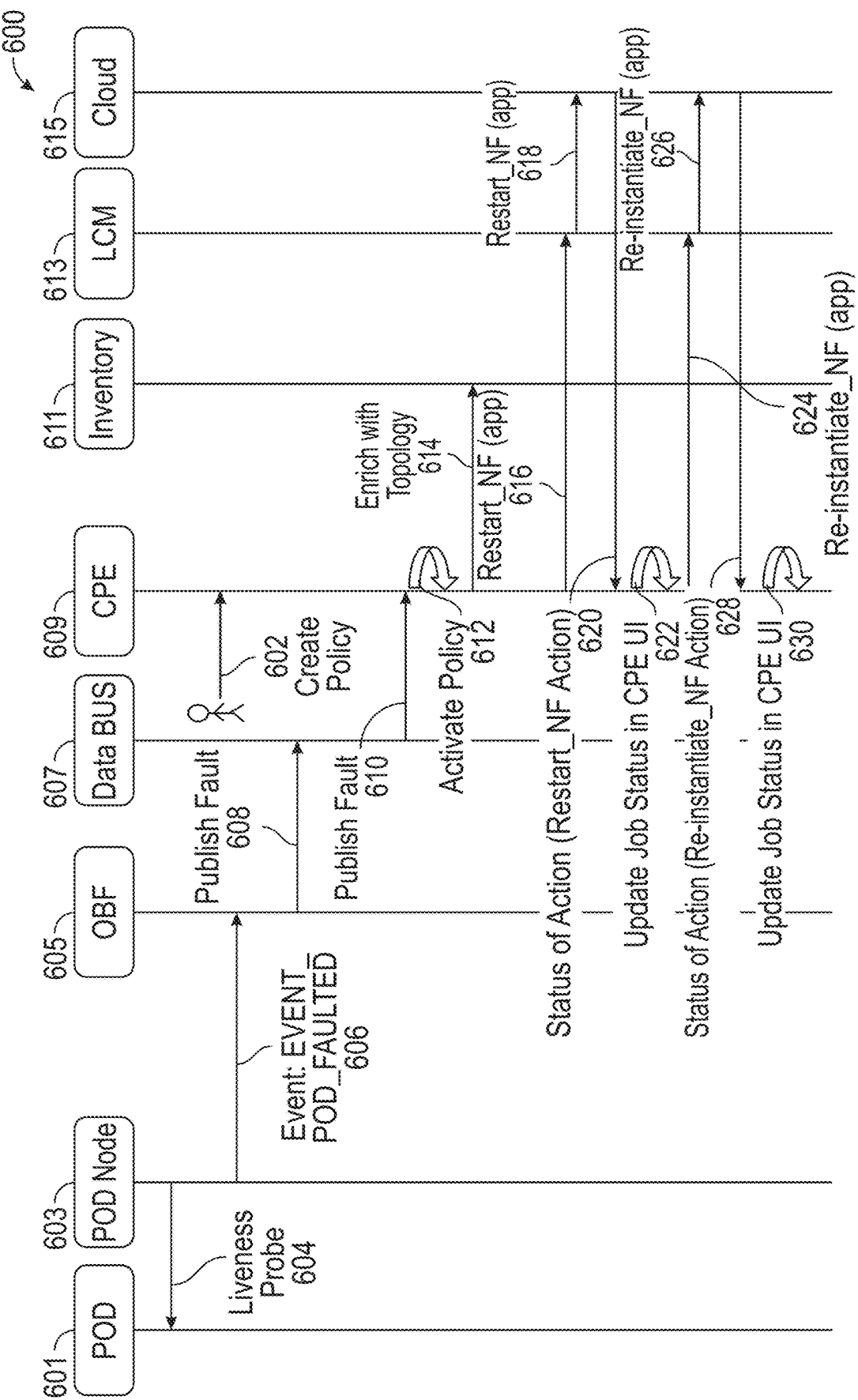
FIGS. 6, 7, 8, 9, 10, and 11 are data flow diagram representations of a method for vRAN software healing, in accordance with some embodiments.

FIG. 6 is a data flow diagram representation of a method for vRAN software healing 600, in accordance with some embodiments.

In some embodiments, method 600 is executed by processing circuitry 3502 discussed below with respect to FIG. 35. In some embodiments, some, or all the operations of method 600 are executed in accordance with instructions corresponding to instructions 3506 discussed below with respect to FIG. 35.

Method 600 includes operations 602-630, but the operations are not necessarily performed in the order shown. Operations are added, replaced, order changed, and/or eliminated as appropriate, in accordance with the spirit and scope of disclosed embodiments. In some embodiments, one or more of the operations of method 600 are repeated. In some embodiments, unless specifically stated otherwise, the operations of method 600 are performed in order.

In operation 602 of method 600, a policy is created in a CPE system, such as CPEs 300, 200, or 100, for vRAN healing. Process flows from operation 602 to operation 604.

In operation 604 of method 600, aggregation nodes (not shown) and container pods 601 are being monitored by liveness probes which are used to know when to restart a container. Aggregate nodes are configured to replace a sequence of input records with summary, aggregated output records. Pods, such as pod 601, are collections of one or more containers that look like real computers from the point of view of the programs running them (e.g., virtual machines). Process flows from operation 604 to operation 606.

In operation 606 of method 600, pod node 603 detects a failure of a pod container, such as pod 601. Pod node 603 attempts to restart the failed pod until all attempts are exhausted, including attempting to restart the pod from a different pod node. In response to one or more pods having trouble restarting, a fault event is created (e.g., EVENT_POD_FAULTED) and is sent to observability framework 605 (OBF) that collects fault events and increments performance counters. Process flows from operation 606 to operation 608.

In operation 608 of method 600, OBF 605 receives the event and sends the event to data bus 607. Process flows from operation 608 to operation 610.

In operation 610 of method 600, data bus 607 sends the fault to CPE 609. In some embodiments, CPE 609 is like CPEs 300, 200, or 100. Process flows from operation 610 to operation 612.

In operation 612 of method 600, CPE 609 filters the fault events and activates policy. CPE 609 filters events based upon existing policy and applies policy condition and rules. Process flows from operation 614 to operation 616.

In operation 614 of method 600, CPE 609 sends an enrichment request to inventory 611 to obtain topology information of the affected network function (NF) and cluster for POD 601. Process flows from operation 614 to operation 616.

In operation 616 of method 600, CPE 609 sends a request to a lifecycle management system 613 (LCM) which is an orchestrator (aligns business requests with the applications, data, and infrastructure) for a NF restart. Process flows from operation 616 to operation 618.

In operation 618 of method 600, LCM 613 sends the NF restart request to cloud adapter 615 (a software utility that controls the transfer of information between local back-office systems and a cloud provider). Process flows from operation 618 to operation 620.

In operation 620 of method 600, cloud adapter 615 and LCM 613 sends the status of the NF restart request to CPE 609. Process flows from operation 620 to operation 622.

In operation 622 of method 600, CPE 609 updates the job status in CPE UI, such as UI 208, and based upon the status of the NF restart request, CPE 609 takes follow up action. Process flows from operation 622 to operation 624.

In operation 624 of method 600, in response to the NF restart failing, then CPE 609 sends a request to LCM 613 for NF to re-instantiate. Process flows from operation 624 to operation 626.

In operation 626 of method 600, LCM 613 sends the NF re-instantiate request to cloud adapter 615. Process flows from operation from operation 626 to operation 628.

In operation 628 of method 600, Cloud Adapter 615 and LCM 613 send the status of the NF re-instantiate to Cpe 609. Process flows from operation 628 to operation 630 where CPE 609 updates the job status in CPE UI.

Figure 7:
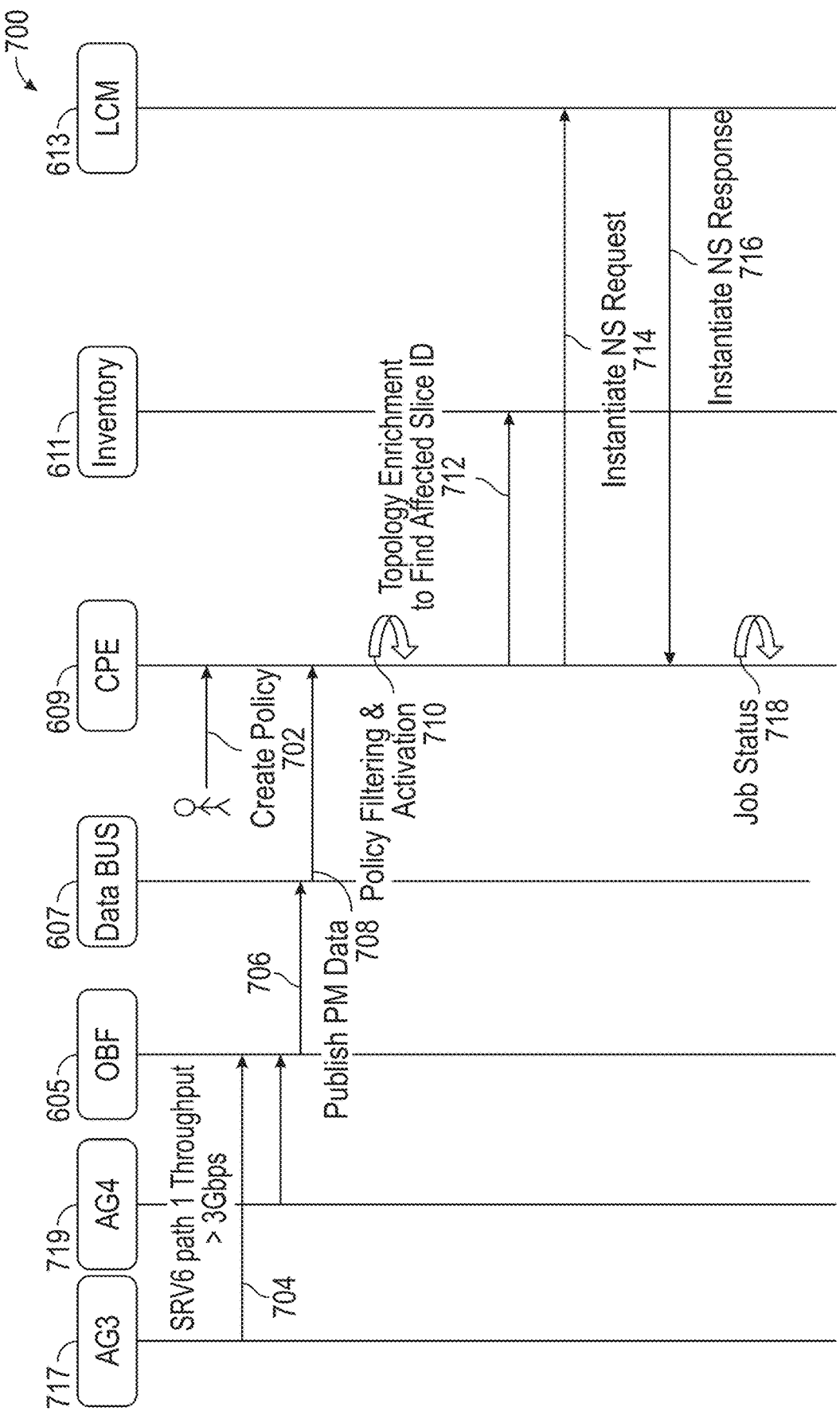

FIG. 7 is a data flow diagram representation of a method for vRAN software healing 700, in accordance with some embodiments.

In some embodiments, method 700 is executed by processing circuitry 3502 discussed below with respect to FIG. 35. In some embodiments, some, or all the operations of method 700 are executed in accordance with instructions corresponding to instructions 3506 discussed below with respect to FIG. 35.

Method 700 includes operations 702-718, but the operations are not necessarily performed in the order shown. Operations are added, replaced, order changed, and/or eliminated as appropriate, in accordance with the spirit and scope of disclosed embodiments. In some embodiments, one or more of the operations of method 700 are repeated. In some embodiments, unless specifically stated otherwise, the operations of method 700 are performed in order.

In operation 702 of method 700, policy is created in CPE system 609. In a non-limiting example, a user creates a polity where in response to segment routing IPv6 (SRV6) path 1 throughput being greater than 3 Gbps, trigger an action for new user plan function (UPF) instance creation. Segment Routing IPv6 (SRv6) is a next-generation IP bearer protocol that combines Segment Routing (SR) and IPv6. Utilizing existing IPv6 forwarding technology, SRv6 implements network programming through flexible IPv6 extension headers. The 5G User Plane Function (UPF) is the function that does the work to connect the data over the RAN to the Internet to route packets quickly and accurately to the correct destination. Thus, in response to throughput being greater than 3 Gbps, a new UPF is created to reduce the throughput burden. Process flows from operation 702 to operation 704.

In operation 704 of method 700, the transport network traffic of aggregation nodes three 717 and four 719 are monitored every thirty seconds at OBF 605 for SRV6 Path 1 throughput. Process flows from operation 704 to operation 706.

In operation 706 of method 700, performance metric (PM) events for SRV6 Path 1 throughput are sent to data bus 607 through OBF 605. Process flows from operation 706 to operation 708.

In operation 708 of method 700, CPE 609 receives the events through data bus 607. Process flows from operation 708 to operation 710.

In operation 710 of method 700, CPE 609 filters the PM events and activates the policy of operation 702 once SRV6 Path 1 throughput is greater than 3 Gbps. Process flows from operation 710 to operation 712.

In operation 712 of method 700, CPE 609 sends an enrichment request to inventory 611 to obtain the topology information of an affected slice identification (e.g., the network slice information). Process flows from operation 712 to operation 714.

In operation 714 of method 700, based upon the enrichment information from inventory 611, CPE 609 raises an action trigger to LCM 613 for creating a new network service instance. Process flows from operation 714 to operation 716.

In operation 716 of method 700, CPE 609 obtains a response from LCM 613 for triggered action status. Process flows from operation 716 to operation 718 where CPE 609 updates the job status in CPE UI.

Figure 8:
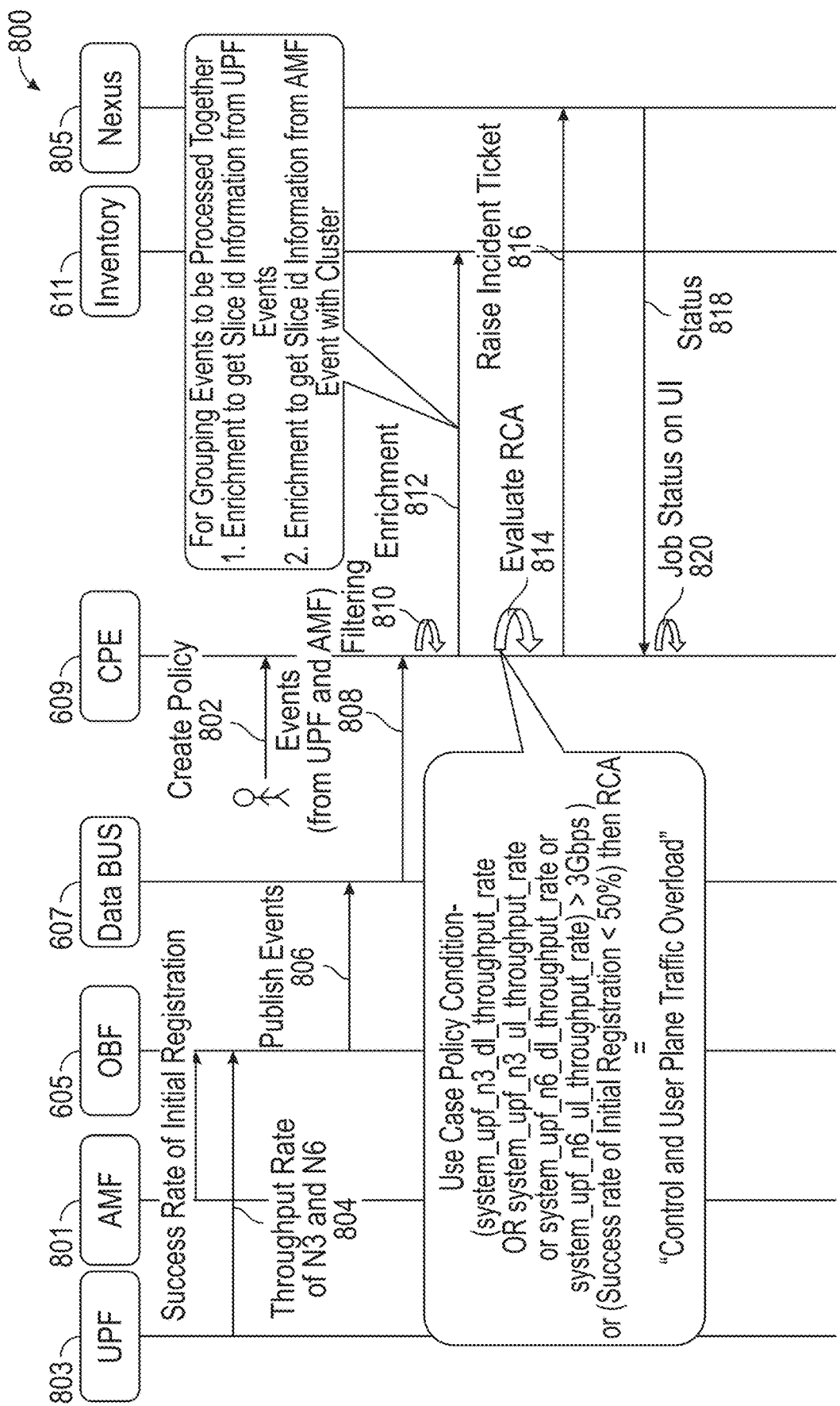

FIG. 8 is a data flow diagram representation of a method for vRAN software healing 800, in accordance with some embodiments.

In some embodiments, method 800 is executed by processing circuitry 3502 discussed below with respect to FIG. 35. In some embodiments, some, or all the operations of method 800 are executed in accordance with instructions corresponding to instructions 3506 discussed below with respect to FIG. 35.

Method 800 includes operations 802-820, but the operations are not necessarily performed in the order shown. Operations are added, replaced, order changed, and/or eliminated as appropriate, in accordance with the spirit and scope of disclosed embodiments. In some embodiments, one or more of the operations of method 800 are repeated. In some embodiments, unless specifically stated otherwise, the operations of method 800 are performed in order.

In operation 802 of method 800, policy is created in CPE system 609. In a non-limiting example, a policy is created in CPE 609 for non-AI assisted root cause analysis (RCA) use case. In a non-limiting example, the policy created monitors the downlink and uplink throughput rate for node 3 and the downlink and uplink throughput rate for node 6. Continuing with the non-limiting example the policy is set so that in response to either throughput (e.g., dl or ul) for either node 3 or node 6 is greater than 3 Gbps or the success rate of initial registration is less than 50%, then RCA is the control and user plane are overloaded. Process flows from operation 802 to operation 804.

RCA is a method of problem solving used for identifying the root causes of faults or problems. RCA is used in IT operations and telecommunications. RCA is decomposed into four steps: (1) identify and describe the problem clearly; (2) establish a timeline from the normal situation up to the time the problem occurred; (3) distinguish between the root cause and other causal factors (e.g., using event correlation); and (4) establish a causal graph between the root cause and the problem. RCA generally serves as input to a remediation process whereby corrective actions are taken to prevent the problem from reoccurring. The name of this process varies from one application domain to another. According to ISO/IEC 31010, RCA includes one or more of the following techniques: (1) five whys; (2) failure mode and effects analysis (FMEA); (3) fault tree analysis; (4) Ishikawa diagram; and (5) Pareto analysis.

In operation 804 of method 800, events are received at OBF 605 from access & mobility management function (AMF) 801 and 5G user plane function (UPF) 803. AMF is a control plane function in 5G core network, like CN 502. The main functions and responsibilities of AMF are registration management, reachability management, and connection management. UPF is the function that does the work to connect the data coming over the RAN to the Internet quickly and accurately routing packets to the correct destination on the internet. Process flows from operation 804 to operation 806.

In operation 806 of method 800, OBF 605 publishes a fault at data bus 607. Process flows from operation 806 to operation 808.

In operation 808 of method 800, CPE 609 receives the events from data bus 607. Process flows from operation 808 to operation 810.

In operation 810 of method 800, CPE 609 filters the events for based upon available policy. Process flows from operation 810 to operation 812

In operation 812 of method 800, CPE 609 sends an enrichment request to inventory 611 to obtain topology information (e.g., slice ID) of AMF 801 and UPF 803. Process flows from operation 812 to operation 814.

In operation 814 of method 800, CPE 609 evaluates the RCA logic according to policy. Process flows from operation 814 to operation 816.

In operation 816 of method 800, CPE 609 creates an incident ticket and sends the incident ticket to an incident manager system 805. Process flows from operation 816 to operation 818.

In operation 818 of method 800, CPE 609 receives a status update for an incident creation job. Process flows from operation 818 to operation 820 where the job status is updated at CPE UI.

Figure 9:
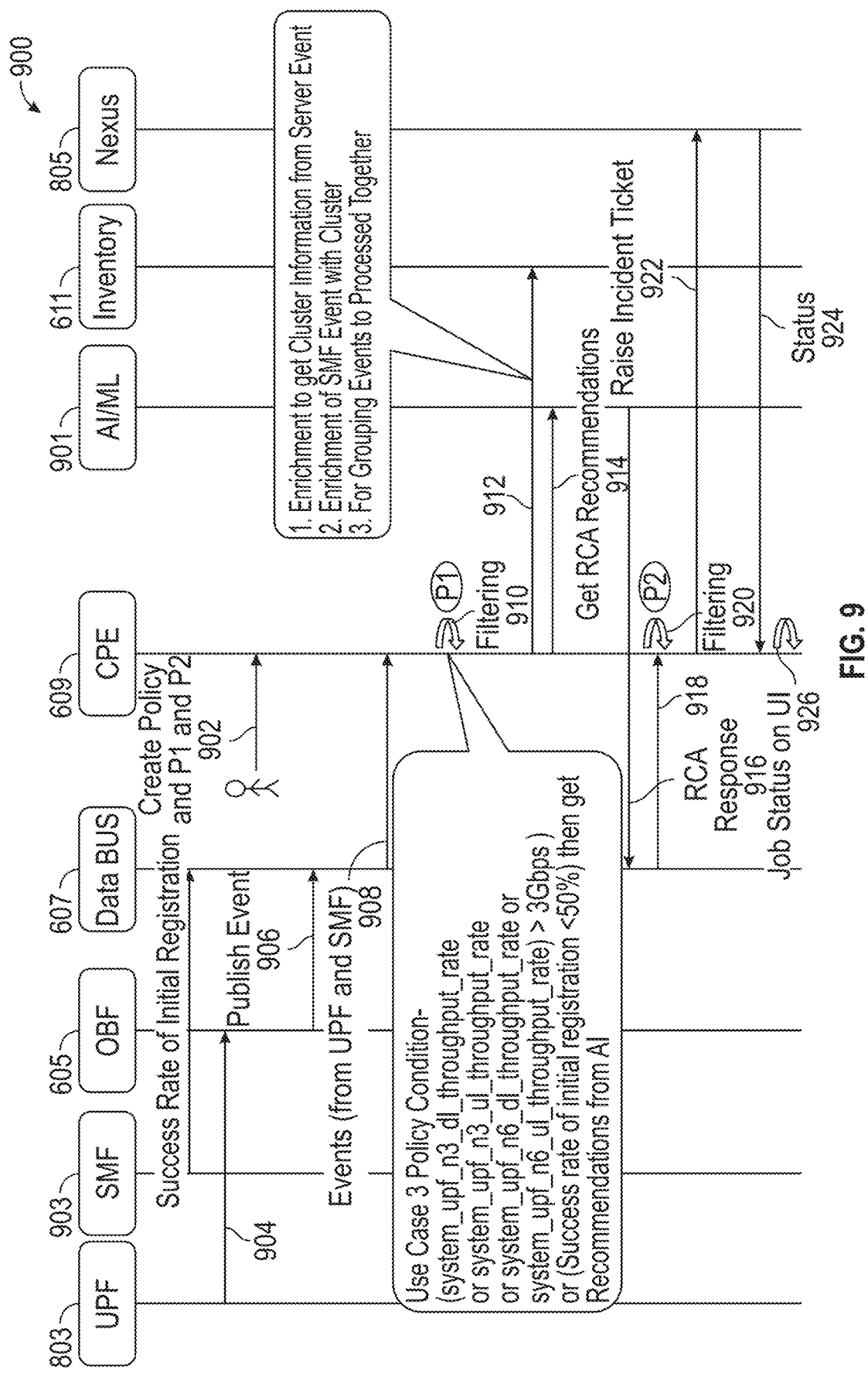

FIG. 9 is a data flow diagram representation of a method for vRAN software healing 900, in accordance with some embodiments.

In some embodiments, method 900 is executed by processing circuitry 3502 discussed below with respect to FIG. 35. In some embodiments, some, or all the operations of method 900 are executed in accordance with instructions corresponding to instructions 3506 discussed below with respect to FIG. 35.

Method 900 includes operations 902-926, but the operations are not necessarily performed in the order shown. Operations are added, replaced, order changed, and/or eliminated as appropriate, in accordance with the spirit and scope of disclosed embodiments. In some embodiments, one or more of the operations of method 900 are repeated. In some embodiments, unless specifically stated otherwise, the operations of method 900 are performed in order.

In operation 902 of method 900, policies are created in CPE system 609. In a non-limiting example, policies P1 and P2 are created. Continuing with the non-limiting example, P1 policy trigger is based upon OBF events and P2 policy trigger is based upon an RCA response from artificial intelligence/machine learning module (AI/ML) 901. AI/ML module 901 is configured to use computer algorithms that improve automatically through experience and using data. In a non-limiting example, policy 1 created monitors the downlink and uplink throughput rate for node 3 and the downlink and uplink throughput rate for node 6. Continuing with the non-limiting example the policy is set so that in response to either throughput (e.g., dl or ul) for either node 3 or node 6 is greater than 3 Gbps or the success rate of initial registration is less than 50%, then policy 2 initiates RCA to obtain recommendations from AI/ML 901. Process flows from operation 902 to operation 904. Process flows from operation 902 to operation 904.

In operation 904 of method 900, events are received at OBF 605 from UPF 803 and session management function (SMF) 903. The SMF is responsible for interacting with the decoupled data plane, creating, updating, and removing Protocol Data Unit (PDU) sessions and managing session context with UPF 803. Process flows from operation 904 to operation 906.

In operation 906 of method 900, OBF 605 publishes the fault at data bus 607. Process flows from operation 906 to operation 908.

In operation 908 of method 900, CPE 609 receives the events from respective data bus 607. Process flows from operation 908 to operation 910.

In operation 910 of method 900, CPE 609 filters the events based upon available policy P1. Process flows from operation 910 to operation 912.

In operation 912 of method 900, CPE 609 sends and enrichment request to inventory for obtaining the topology information (e.g., slice ID) of the UPF 803 and SMF 903. Process flows from operation 912 to operation 914.

In operation 914 of method 900, CPE 609 sends a get RCA recommendation action to AI/ML module 901. Process flows from operation 914 to operation 916.

In operation 916 of method 900, AI/ML module 901 sends an RCA recommendation response through data bus 607 to CPE 609. Process flows from operation 916 to operation 918.

In operation 918 of method 900, CPE 609 receives the RCA recommendation response message from data bus 607 and activates policy P2. Process flows from operation 918 to operation 920.

In operation 920 of method 900, CPE 609 implements policy P2 filtering logic. Process flows from operation 920 to operation 922.

In operation 922 of method 900, in response to an action in policy P2, CPE 609 creates an incident ticket to incident manager system 805. Process flows from operation 922 to operation 924.

In operation 924 of method 900, CPE 609 receives the status update for incident creation job and at operation 926 the job status is updated at CPE UI.

Figure 10:
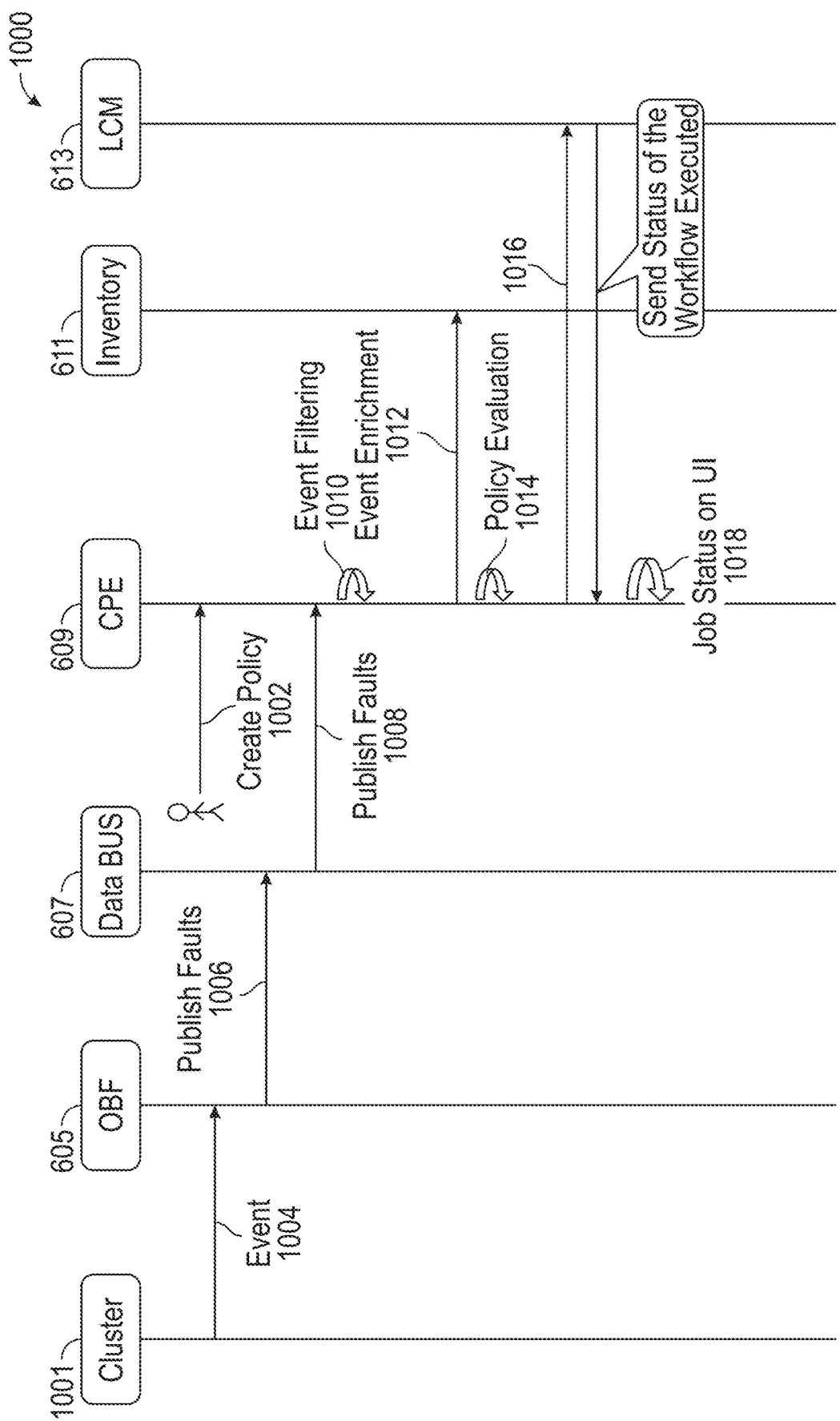

FIG. 10 is a data flow diagram representation of a method for vRAN software healing 1000, in accordance with some embodiments.

In some embodiments, method 1000 is executed by processing circuitry 3502 discussed below with respect to FIG. 35. In some embodiments, some, or all the operations of method 1000 are executed in accordance with instructions corresponding to instructions 3506 discussed below with respect to FIG. 35.

Method 1000 includes operations 1002-1018, but the operations are not necessarily performed in the order shown. Operations are added, replaced, order changed, and/or eliminated as appropriate, in accordance with the spirit and scope of disclosed embodiments. In some embodiments, one or more of the operations of method 1000 are repeated. In some embodiments, unless specifically stated otherwise, the operations of method 1000 are performed in order.

In operation 1002 of method 1000, policies are created in CPE system 609. Process flows from operation 1002 to operation 1004.

In operation 1004 of method 1000, a POD related issue occurs in server cluster 1001 and the event is received by OBF 605. Process flows from operation 1004 to operation 1006.

In operation 1006 of method 1000, OBF 605 publishes the generated event to data bus 607. Process flows from operation 1006 to operation 1008.

In operation 1008 of method 100, data bus 607 publishes the received event to CPE 609. Process flows from operation 1008 to operation 1010.

In operation 1010 of method 1000, CPE 609 filters and analyses events published by OBF 605 to data bus 607. Process flows from operation 1010 to operation 1012.

In operation 1012 of method 1000, CPE 609 sends for enrichment of event information from inventory 611. Process flows from operation 1012 to operation 1014.

In operation 1014 of method 1000, CPE 609 evaluates incoming events based on configured policies. Process flows from operation 1014 to operation 1016.

In operation 1016 of method 1000, CPE 609 invokes LCM 613 to remediate the fault and confirm with LCM 613 upon successful completion of remediation. Process flows from operation 1016 to operation 1018 where the job status is updated in CPE UI.

Figure 11:
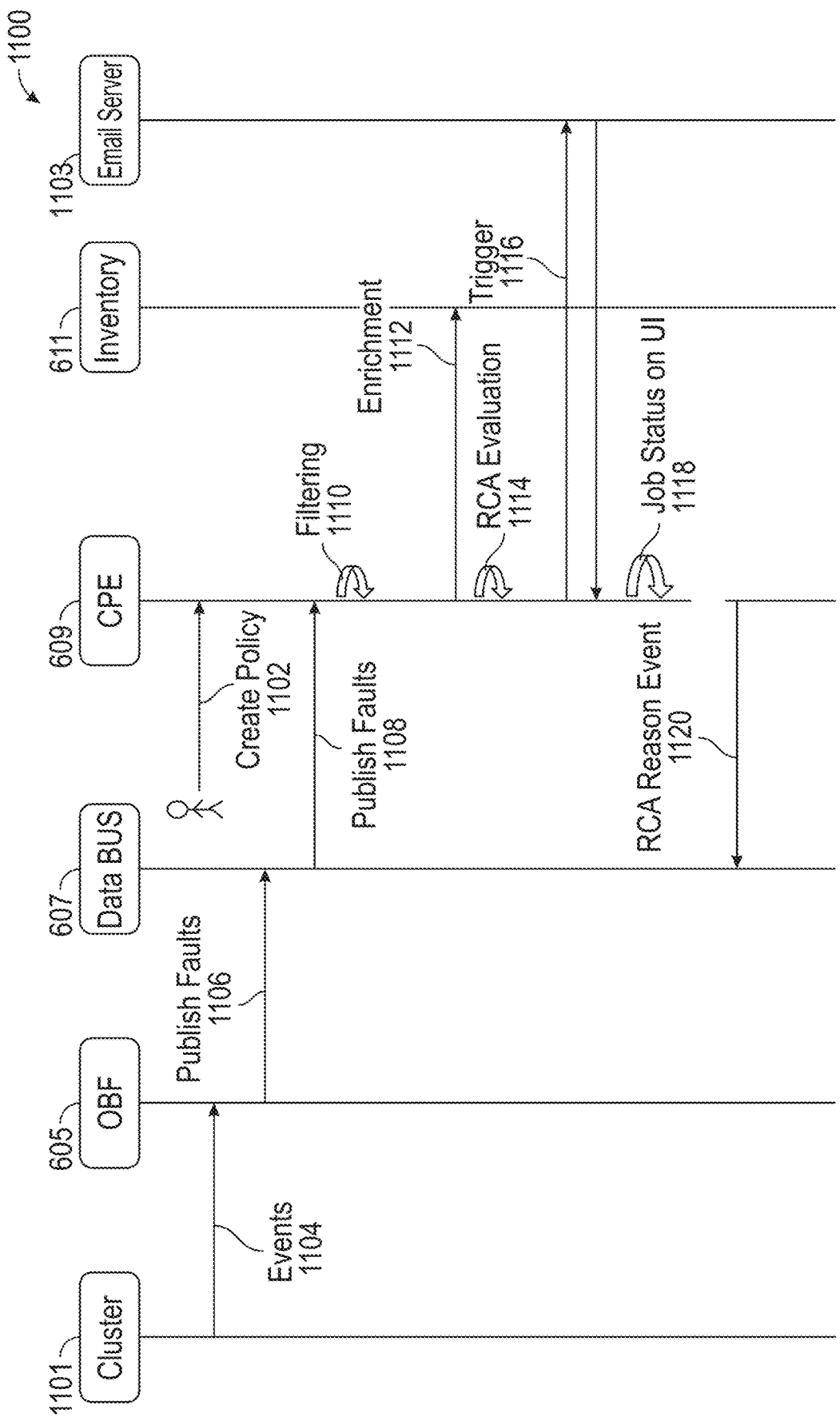

FIG. 11 is a data flow diagram representation of a method for vRAN software healing 1100, in accordance with some embodiments.

In some embodiments, method 1100 is executed by processing circuitry 3502 discussed below with respect to FIG. 35. In some embodiments, some, or all the operations of method 1100 are executed in accordance with instructions corresponding to instructions 3506 discussed below with respect to FIG. 35.

Method 1100 includes operations 1102-1120, but the operations are not necessarily performed in the order shown. Operations are added, replaced, order changed, and/or eliminated as appropriate, in accordance with the spirit and scope of disclosed embodiments. In some embodiments, one or more of the operations of method 1100 are repeated. In some embodiments, unless specifically stated otherwise, the operations of method 1100 are performed in order.

In operation 1102 of method 1100, policies are created in CPE system 609. Process flows from operation 1002 to operation 1004.

In operation 1104 of method 1100, faults occur in a cloud platform cluster 1101 and events are received by OBF 605. Process flows from operation 1104 to operation 1106.

In operation 1106 of method 1100, OBF 605 processes the received events and publishes the generated events to data bus 607. Process flows from operation 1106 to operation 1108.

In operation 1108 of method 1100, data bus 607 publishes the received events to CPE 609. Process flows from operation 1108 to operation 1110.

In operation 1110 of method 1100, CPE 609 filters the events received from data bus 607. Process flows from operation 1110 to operation 1112.

In operation 1112 of method 1100, CPE 609 performs enrichment of event information from inventory 611. Process flows from operation 1112 to operation 1114.

In operation 1114 of method 1100, CPE 609 performs RCA pursuant to the policy (e.g., rule-based RCA). Process flows from operation 1114 to operation 1116.

In operation 1116 of method 1100, CPE 609 sends mail to email server 1103 providing details about the root cause and correlated events. Process flows from operation 1116 to operation 1118 where the job status is updated in CPE UI. Process flows from operation 1118 to operation 1120.

In operation 1120 of method 1100, CPE 609 provides the details about the root cause and correlated events to data bus 607.

Figure 12:
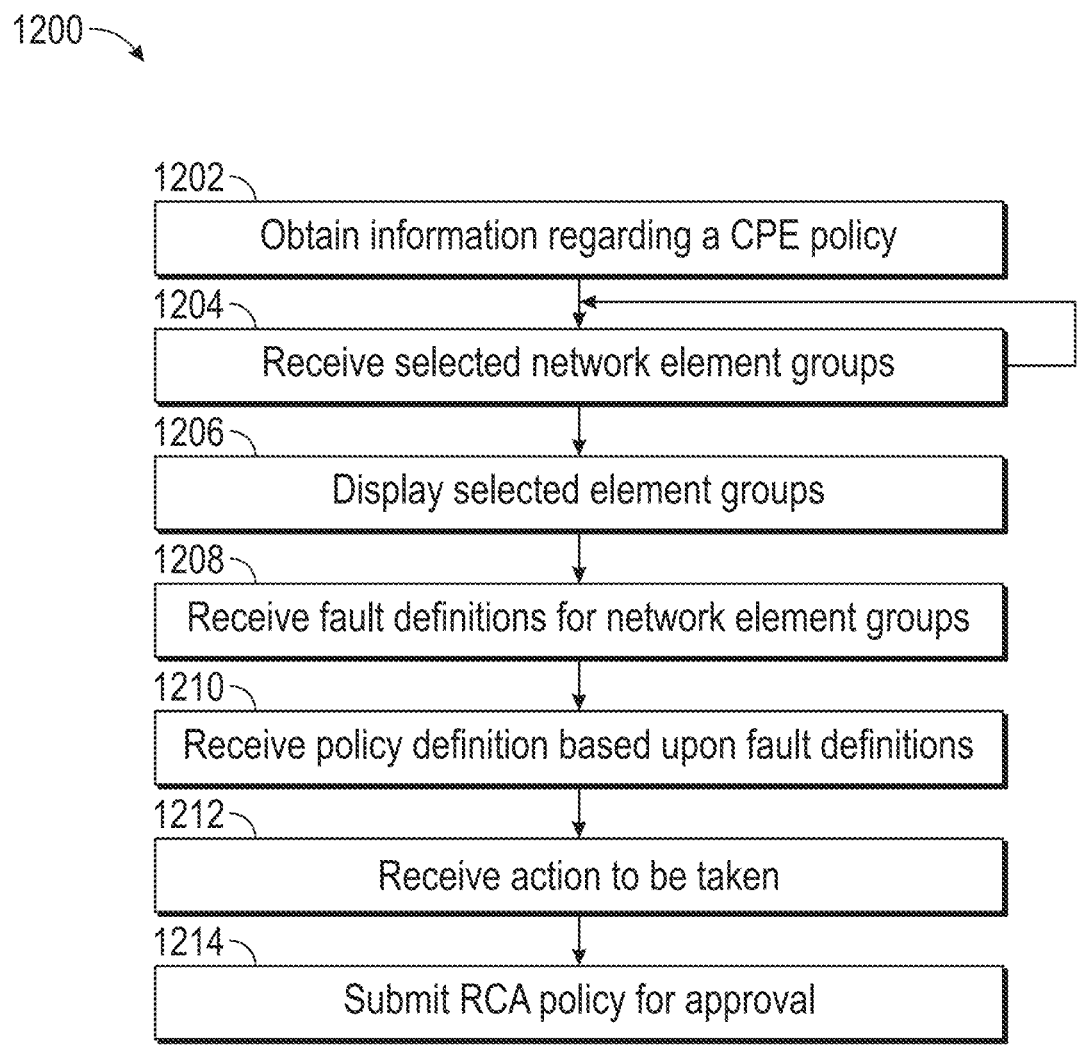
FIG. 12 is a flow diagram of a method for creating a root cause analysis (RCA) policy, in accordance with some embodiments.
Figure 13:
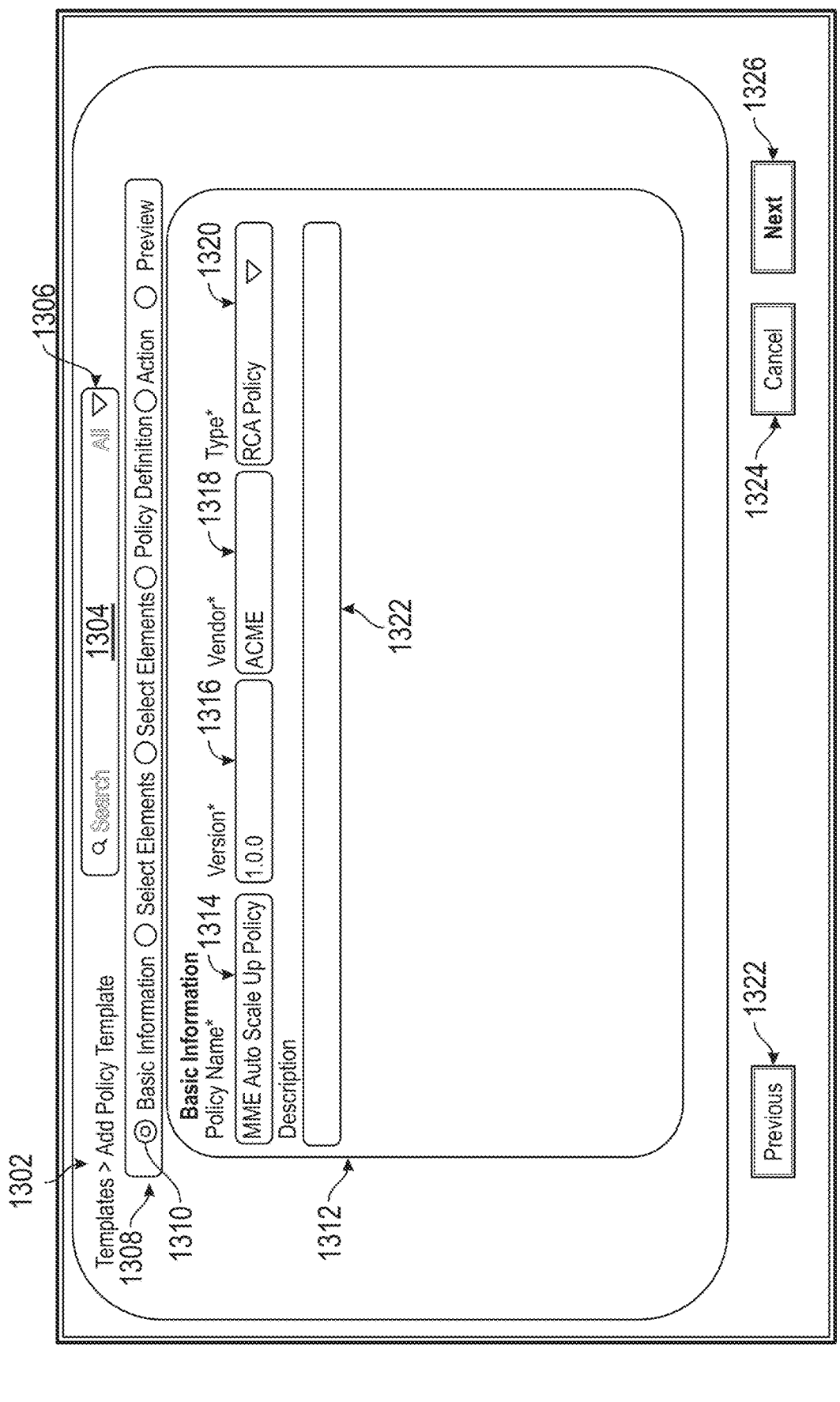
Figure 14:
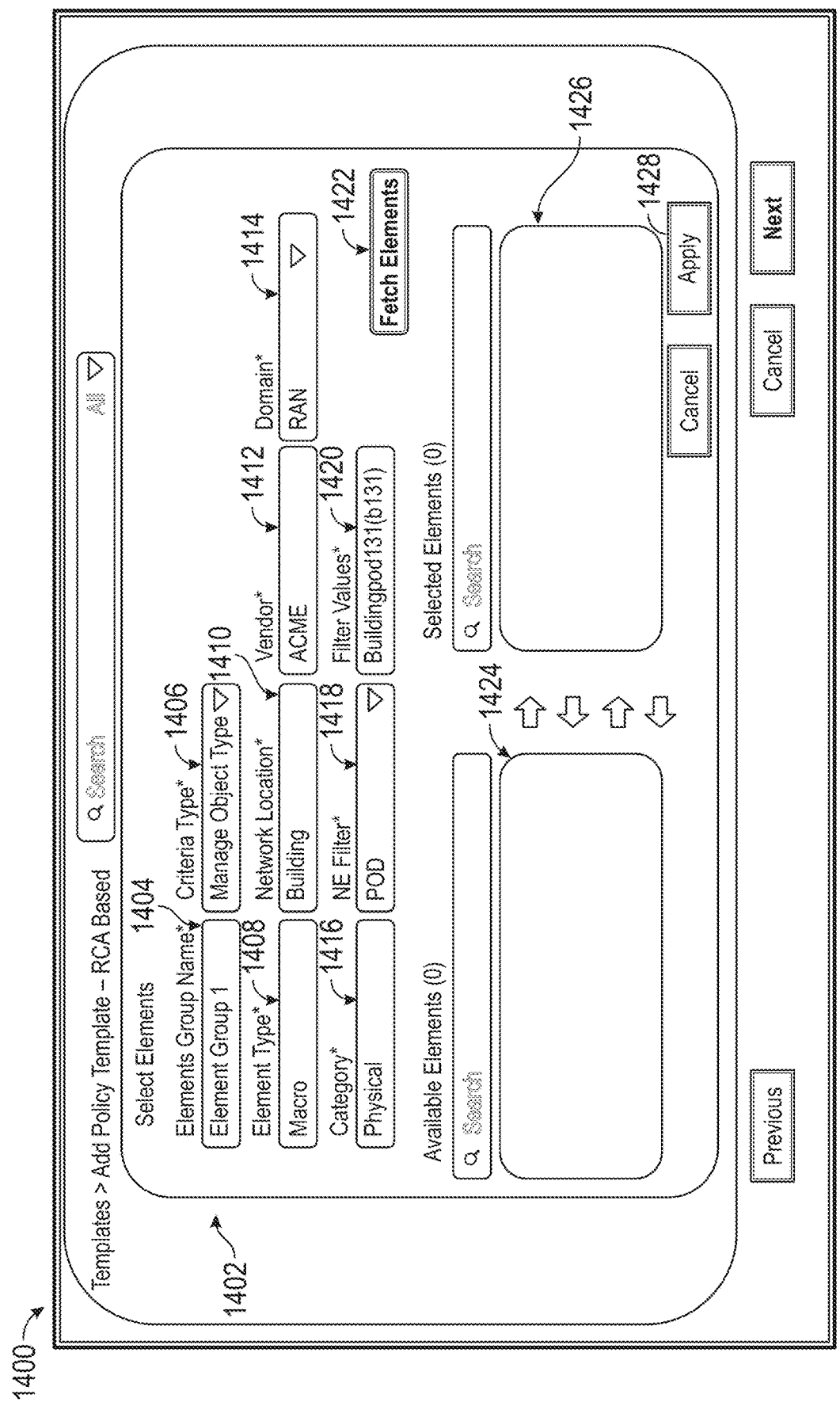

FIG. 12 is a flow diagram of a method for creating a root cause analysis (RCA) policy 1200, in accordance with some embodiments.

FIGS. 13, 14, 15, 16, 17, 18, and 19 are graphical user interfaces (GUIs) 1300, 1400, 1500, 1600, 1700, 1800, and 1900 for a correlation and policy engine (CPE), in accordance with some embodiments.

FIGS. 12-19 are discussed together to provide an understanding of the operation of GUIs 1300, 1400, 1500, 1600, 1700, 1800, and 1900 and the method for creating a root cause analysis (RCA) policy 1200. In some embodiments, method for creating a root cause analysis (RCA) policy 1200 is a functional overview of policy creation for a CPE through GUIs, such as GUIs 1300, 1400, 1500, 1600, 1700, 1800, and 1900. In some embodiments, method 1200 is stored as instructions, such as instructions 3506, and executed by processing circuitry 3502 discussed below with respect to FIG. 35. In some embodiments, some, or all the operations of method 1200 are executed in accordance with instructions corresponding to instructions 3506 discussed below with respect to FIG. 35.

Method 1200 includes operations 1202-1214, but the operations are not necessarily performed in the order shown. Operations are added, replaced, order changed, and/or eliminated as appropriate, in accordance with the spirit and scope of disclosed embodiments. In some embodiments, one or more of the operations of method 1200 are repeated. In some embodiments, unless specifically stated otherwise, the operations of method 1200 are performed in order.

In operation 1202 of method 1200, a user, through add-policy template GUI 1300 (FIG. 13) inputs basic information in which to develop an RCA policy. In some embodiments, RCA policy is located on policy manager 210 and/or policy database 340. GUI identifier 1302 identifies GUI 1300 as a policy-template creation page, for a policy to be used within CPEs 100, 200, or 300 and within methods 800, 900, or 1100. In some embodiments, from add-policy template GUI 1300, a user searches for an already existing RCA template through search box 1304. In some embodiments, a user inputs a known policy or clicks on arrow 1306 which displays a pull-down box with several already existing templates from which the user chooses. Pull-down menus are the type commonly used in menu bars (e.g., usually near the top of a window or screen), which are often used for performing actions.

In some embodiments, in response to a user being unclear as to the full title of a policy template of interest, the user begins to type what is believed to be the title and search box 1304 autocompletes with suggestive policy templates for which the user is looking. Autocomplete, or word completion, is a feature in which an application predicts the rest of a word a user is typing. In smartphones this is called predictive text. In GUIs, users typically press the tab key to accept a suggestion or the down arrow key on a keyboard to accept one of several suggestions.

Status bar 1308 informs the user of progress through the policy template creation. As shown, and discussed with regards to operation 1202, GUI 1300 is a basic information stage of a policy creation template. The user is informed of where the policy template creation process is by status circles 1310. An open circle indicates the user has not reached the stage to the right of the open circle (e.g., select elements has an empty circle to the left indicating the user has not begun this process of policy template setup); a partially filled circle, such as the circle in front of basic information included in status bar 1308, indicates the current progress in the RCA policy template creation (e.g., the user is currently working on the basic information portion of the policy template); and a checkmark within the circle indicates that stage of the policy creation process has been completed. In operation, after basic policy information is obtained, process flows to select elements, select elements, policy definition, action, and preview as discussed below.

In some embodiments, an asterisk located next to a heading of a user input field, such as user input fields 1314, 1316, 1318, 1320, and 1322 indicates an input included within the user input field allows the user to move onto the next stage of the policy creation process. In some embodiments, a user inputs a policy name in user input field 1312. In a non-limiting example, the user has inputted MME auto scale up policy.

Mobility management entity (MME) is the control-node for an LTE access-network, such as networks 112, and/or 504. MME is responsible for idle mode UE paging and tagging procedures including retransmissions. MME is involved in the bearer activation/deactivation process and is also responsible for choosing the serving gateway for UE at the initial attach and at time of intra-LTE handover involving CN, such as CNs 110 and/or 502, node relocation. MME is responsible for authenticating the user (by interacting with the home subscriber server). The non-access stratum (NAS) signaling (NAS is a set of protocols in the evolved packet system used to convey non-radio signaling between the UE and the MME for an LTE/E-UTRAN access) terminates at the MME and is also responsible for generation and allocation of temporary identities to UEs. MME checks the authorization of the UE to camp on the service provider's public land mobile network (PLMN is a combination of wireless communication services offered by a specific operator in a specific country) and enforces UE roaming restrictions. The MME is the termination point in the network for ciphering/integrity protection for NAS signaling and handles the security key management. The MME also provides the control plane function for mobility between LTE and 2G/3G access networks with the S3 interface (simple storage service is an application programming interface that provides the capability to store, retrieve, list, and delete objects) terminating at the MME.

Continuing with the non-limiting example, the user inputs a version in user input field 1316, such as 1.0.0 that indicates this is the first version of the policy. In some embodiments, in response to a major change being made to an already existing RCA policy template, the version number changes with the leftmost integer (e.g., version 2.0.0). In some embodiments, in response to a minor change being made to an already existing RCA policy template, the version number changes with the middle integer (e.g., version 1.1.0). In some embodiments, in response to a typographical change being made to an already existing RCA policy template, the version number changes with the rightmost integer (e.g., version 1.0.1).

Within user input field 1318, a user inputs a vendor, such as a service provider 516 of the network. Within user input field 1320 a user selects what type of policy is being created (e.g., RCA or standard policy). Within user input field 1322, the user inputs a description of the policy being created, such as a purpose of the policy, the boundaries of the policy, and faults or events affecting the policy. In some embodiments, this description is used when other users are performing a search for an already existing policy template to implement or modify.

In some embodiments, a user navigates to a previous GUI with user input button 1322. In some embodiments, RCA policy creation is canceled with user input button 1324. In some embodiments, in response to user input fields 1314, 1316, 1318, and 1320 including a valid input, the process moves to the next stage of RCA policy creation with user input button 1326. Process flow from operation 1202 to operation 1204.

In operation 1204 of method 1200, a user selects elements for the RCA policy template. In some embodiments, in response to the user clicking on user input button 1326 of GUI 1300, GUI 1400 (FIG. 14) is displayed for a user to begin selecting elements for the RCA policy.

Select elements box 1402 displays user input fields 1404, 1406, 1408, 1410, 1412, 1414, 1416, 1418, and 1420 for a user to select elements. In some embodiments, a user selects a name for the elements group at user input field 1404. In a non-limiting example, a user inputs "element group 1" as the element name. In some embodiments, a user selects a criteria type in user input field 1406 by clicking on the down arrow and selecting from eligible criteria (e.g., manage object type based or domain based).

In a non-limiting example, the user has selected "manage object type". In telecommunications, the term managed object includes: (1) an abstract representation (e.g., not only the actual device that is managed but also the device driver that communicates with the device) of network resources that are managed in a network. For example, a printer as a managed object is the GUI that shows information about the printer, such as the location, printer status, printing progress, paper choice, and printing margins. The database, where all managed objects are stored, is called a management information database. A managed object is dynamic and communicates with other network resources that are managed. A managed object represents a physical entity, a network service, or an abstraction of a resource that exists independently of its use in management. (2) In telecommunications management, a managed object includes a resource within the telecommunications environment that is capable of being managed using operation, administration, maintenance, and provisioning (OAMP) application protocols. Operations are the normal network operations. Administration are the support procedures performed on a network e.g., allocating of passwords. Maintenance is performed to keep the network operating smoothly and include configuring updates or aligning to new policy and regulations. Provisioning is providing users, who have been given access, access to data repositories applications and databases.

In some embodiments, in user input field 1408, the user inputs an element type. Continuing with the non-limiting example, a macro element type has been chosen. A macro element, such as a macro cell or macro site is a cell in a mobile phone network that provides radio coverage served by a high-power cell site (e.g., tower, antenna, or mast). Macro cells provide coverage larger than microcell (e.g., macro-cell covering 1 Km-30 Km, a micro-cell covering 200 m-2 Km, or a pico-cell covering 4 m-200 m). The antennas for macro cells are mounted on ground-based masts, such as base stations 508, rooftops, and other existing structures, at a height that provides a clear view over the surrounding buildings and terrain. The term macro cell is used to describe the widest range of cell sizes. Macro cells are found in rural areas or along highways. Over a smaller cell area, a microcell is used in a densely populated urban area. Picocells are used for areas smaller than microcells, such as a large office, a mall, or train station. Currently the smallest area of coverage that can be implemented with a femtocell is a home or small office.

In some embodiments, in user input field 1410 the user inputs the location of the network. Continuing with the non-limiting example, the network is in or at a building. In some embodiments, in user input field 1412 the user inputs the vendor for the network. In some embodiments, input field 1412 is automatically filled with the vendor information input in GUI 1300. In some embodiments, in user input field 1414 the user inputs the domain of the network (e.g., a RAN, such as RANs 112 and/or 504). A network domain is an administrative grouping of multiple private computer networks or local hosts within the same infrastructure. Domains are identified using a domain name; domains which are accessible from the public Internet are assigned a globally unique name within the domain name system (DNS).

In some embodiments, in user input field 1416 the user inputs a category (e.g., the open systems interconnection (OSI) layer). Continuing with the non-limiting example, the user has selected physical, such as the physical layer. The physical layer is responsible for the physical cable or wireless connection between network nodes. The physical layer defines the connector, the electrical cable or wireless technology connecting the devices, and is responsible for transmission of the raw data, which is simply a series of 0s and 1s, while taking care of bit rate control. Other categories include:

The data link layer, which establishes and terminates a connection between two physically connected nodes on a network. The data link layer breaks up packets into frames and sends them from source to destination. This layer is composed of two parts-Logical Link Control (LLC), which identifies network protocols, performs error checking, and synchronizes frames, and Media Access Control (MAC) which uses MAC addresses to connect devices and define permissions to transmit and receive data.

The network layer, which has two functions. One is breaking up segments into network packets and reassembling the packets on the receiving end. The other is routing packets by discovering the best path across a physical network. The network layer uses network addresses (typically Internet Protocol addresses) to route packets to a destination node.

The transport layer, which takes data transferred in the session layer and breaks it into "segments" on the transmitting end. The transport layer, such as transport network 114, is responsible for reassembling the segments on the receiving end, turning the segments back into data that are used by the session layer. The transport layer carries out flow control, sending data at a rate that matches the connection speed of the receiving device, and error control, checking whether data was received incorrectly and if not, requesting the data again.

The session layer, which creates communication channels, called sessions, between devices. The session layer is responsible for opening sessions, ensuring they remain open and functional while data is being transferred, and closing them when communication ends. The session layer further sets checkpoints during a data transfer in response to the session being interrupted, devices resume data transfer from the last checkpoint.

The presentation layer, which prepares data for the application layer. The presentation layer defines how two devices encode, encrypt, and compress data so data is received correctly on the other end. The presentation layer takes any data transmitted by the application layer and prepares it for transmission over the session layer.

The application layer, which is used by end-user software such as web browsers and email clients. The application layer provides protocols that allow software to send and receive information and present meaningful data to users. A few examples of application layer protocols are the Hypertext Transfer Protocol (HTTP), File Transfer Protocol (FTP), Post Office Protocol (POP), Simple Mail Transfer Protocol (SMTP), and Domain Name System (DNS).

In some embodiments, in user input field 1418 the user inputs a network element (NE) filter value. Continuing with the non-limiting example, the user clicks on the down arrow and selects the desired network element, such as POD. A POD, such as POD 601, is a module of components, such as network, compute, storage, and application, that work together to deliver networking services. Thus, as event messages are routed to a CPE, such as CPEs 100, 200, and 300, the event messages are first filtered, for the example of FIG. 14, by whether the event messages are related to a POD.

In some embodiments, in user input field 1420 the NE filter is narrowed even further by inputting filter values the user desires to filter out. Continuing with the non-limiting example, a POD within building 131 is a POD the user is interested in for the RCA policy. Thus, during the filtering process described above with regards to CPEs 100, 200, and 300, the policy, when implemented first filters according to user input field 1418 and then filters those results according to filter values in user input field 1420.

In some embodiments, the user clicks on user input button 1422 and elements associated with the criteria inputted by the user are gathered and placed within available elements box 1424. In some embodiments, the user moves available elements from available elements box 1424 to selected elements box 1426 using the right facing arrows. In some embodiments, the user is further able to move elements from the selected elements box by clicking on one or more selected elements and clicking on a left-facing arrow to move the selected elements back to the available elements box 1424. In response to the user selecting the elements of interest, the user clicks on user input button 1428 to apply the selected elements to the soon-to-be-created RCA policy.

In some embodiments, a user repeats operation 1204, creating multiple element groups (as shown below) until the user has input the elements according to the RCA policy. Process flows from operation 1204 to operation 1206.

In operation 1206 of method 1200, the user is presented with a GUI display 1500 (FIG. 15) providing a summary table 1502 of the user's selected elements after completion of operation 1204. Summary table 1502 includes the criteria type, element type, domain type, number of elements, and the element name. In summary table 1502, element groups 2, 3, and 5 are domain based on a CN, such as CNs 110 and/or 502. On the Internet, a domain consists of a set of network addresses. As CNs tie together diverse networks, a link between domain-based criteria type and core networks are common. A similar link exists between manage object criteria type and RAN domains.

A 5G RAN is divided into two physical entities named CU (Centralized Unit) and DU (Distributed Unit). With reference to the discussion of OSI layers, the CU provides support for the higher layers of the protocol stack such as service data adaptation protocol (SDAP is a protocol specified by 3GPP and maps the quality of service flow to the bearer service), packet data convergence protocol (PDCP provides services to the RRC and user plane upper layers, e.g. IP at the UE or to the relay at the base station) and radio resource control (RRC is a network layer protocol used between UE and base station) while the DU provides support for the lower layers of the protocol stack such as radio link control (RLC is a layer 2 radio link protocol used in UMTS, LTE and 5G), media access control (MAC is a unique identifier assigned to a network interface controller (NIC) for use as a network address in communications within a network segment) and physical layer. One CU controls multiple DUs, for example more than 100 DUs are connected to one CU. Each DU supports one or more cells, like cells 514, so one CU controls hundreds of cells.

The central unit control plane (CU-CP) hosts RRC and the control-plane part of the PDCP protocol. The CU-CP terminates the E1 interface (a standard wide area network (WAN) digital communication format designed to operate over copper facilities at a rate of 2.048 Mbps) connected with the central unit user plane (CU-UP) and the F1-C interface (that connects a CU to a DU) connected with the DU. The central unit user plane (CU-UP) is a logical node hosting the user plane part of the PDCP protocol of the gNB-CU for an en-gNB, and the user plane part of the PDCP protocol and the SDAP protocol of the gNB-CU for a gNB. The gNB-CU-UP terminates the E1 interface connected with the gNB-CU-CP and the F1-U interface connected with the gNB-DU.

Thus, with reference to summary table 1502, element group 1 includes ten elements that are a combination of CU-CPs and CU-UPs, element group 2 includes three CU-CP elements, element group 3 includes six elements that are a combination of CU-CPs and CU-Ups, element group 4 includes 2 DUs elements, and element group five includes five DUs. Process flows from operation 1206 to operation 1208.

In operation 1208 of method 1200, one or more faults are selected for each element group. In some embodiments, GUI 1600 is configured to allow the user to create an RCA policy template. In some embodiments, in response to the selection of elements of operation 1206 that are to be a part of the RCA policy, the user defines one or more faults to be monitored within the element group on GUI 1600.

In a non-limiting example, from the element groups established in operation 1204, the user has selected element group 5, which is shown in highlighted box 1602 (e.g., to indicate to the user the element group for which the event is being selected). Configure elements box 1604 displays each of the elements selected in operation 1204 at GUI 1400.

In some embodiments, the user selects an event source (e.g., the source of the event message in which the fault is reported) at user input field 1606. Continuing with the non-limiting example, the user has selected OBF (observability framework that collects fault events and increments performance counters as the event source), such as OBF 605. In some embodiments, the user selects the event type at user input field 1608. In some embodiments, a user selects from a list of fault events by clicking the down arrow included in user input field 1608. Continuing with the non-limiting example, the user has selected performance manager (PM), which filters incoming event messages for performance metric events, such as those discussed in method 700. Thus, the processing circuitry, such as processing circuitry 3502 (FIG. 35), is monitoring incoming event messages for performance events (e.g., event messages with performance data within the event message).

Figure 16:
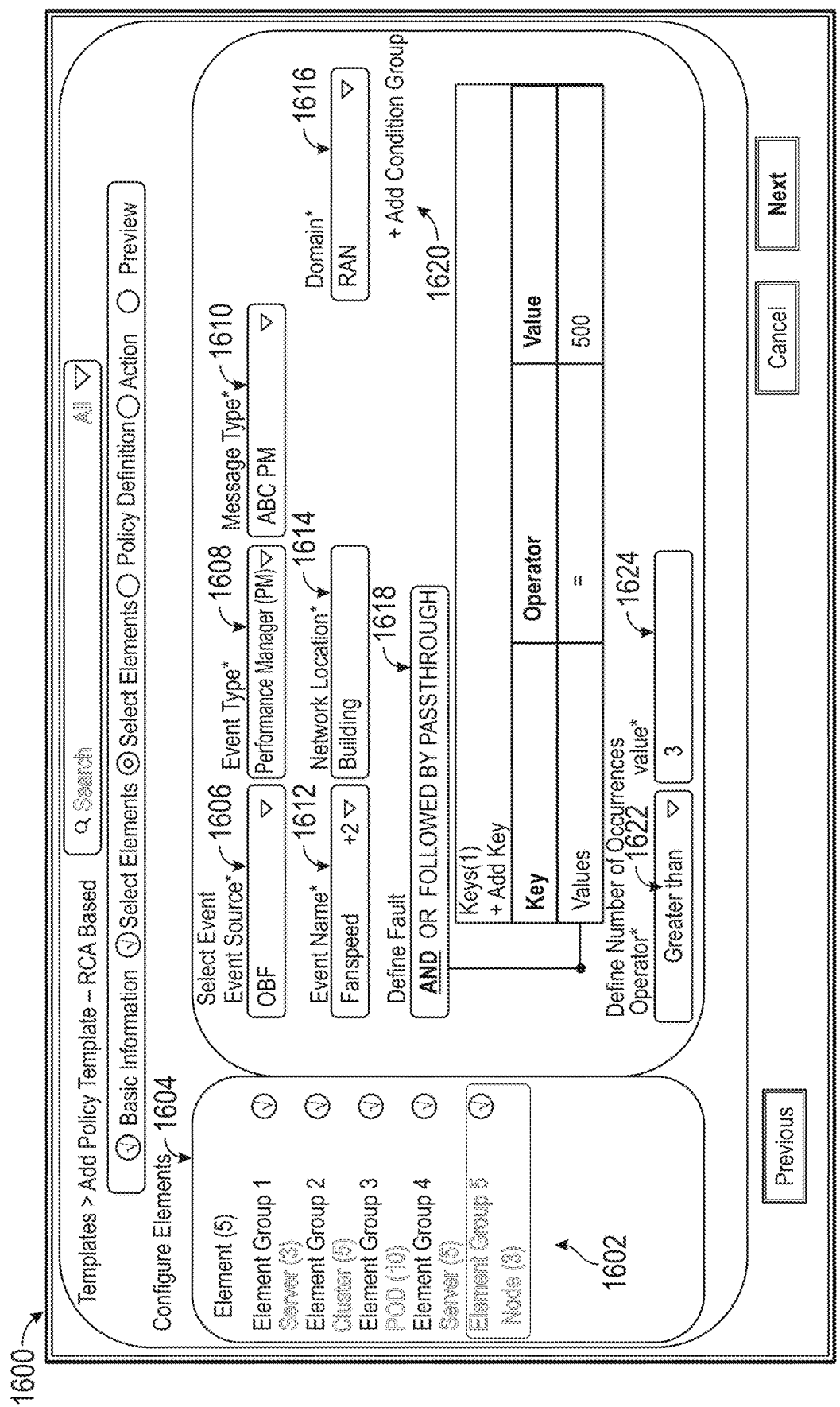

In some embodiments, the user selects a message type at user input field 1610. Message type user input field 1610 restricts the filtering of event type selected in user input field 1608 to a narrower type of performance metric. In some embodiments, the user narrows the performance metric even further in user input field 1612 by selecting an event name. In the example of FIG. 16, the user is monitoring the fan speeds within element group 5.

Network location user input field 1614 is configured to be auto filled based upon the information submitted in GUI 1400. User input field 1616 is also able to be auto filled based on the user selection in GUI 1400.

In user selection field 1618, GUI 1600 is configured to allow a user to select from several options to discover a specific fault. Continuing with the non-limiting example, the user has selected, and, from the list of conjunctions (e.g., such as and, or, followed by, or passthrough) within user selection field 1618. In the non-limiting example, the selected conjunction is in bold and underlined to show the user's selection within user selection field 1618. Continuing with the non-limiting example, the user is interested in the fan speed as reported by the performance manager, and, the user is interested in fan speed of 500 rpm (e.g., showing a fan operating above normal standards).

User selection field 1618 further includes or conjunction, followed by conjunction, and passthrough conjunction to assist a user in defining a fault condition for an RCA based policy. Additionally, the user clicks on user selection field 1620 to add another condition for the fault. For example, the fault includes a fan speed of 500 rpm or a fan speed of 0 rpm. In another example, the fault includes a fan speed of 500 rpm followed by a fan speed of 0 rpm. In another example, the fault includes a fan speed of 500 rpm event message to passthrough a certain number of times before taking any action.

In some embodiments, the user defines in user input field 1622 an operator that initiates a fault event. Continuing with the non-limiting example, the user has selected a greater than operation by clicking on the down arrow and choosing greater than from a list of mathematical and logic operators. The user has selected a value of three in user input field 1624 meaning four separate fan speed event messages where the fan speed is 500 rpm are received before initiating a fault event for the RCA policy template. Process flows from operation 1208 to operation 1210.

Figure 17:
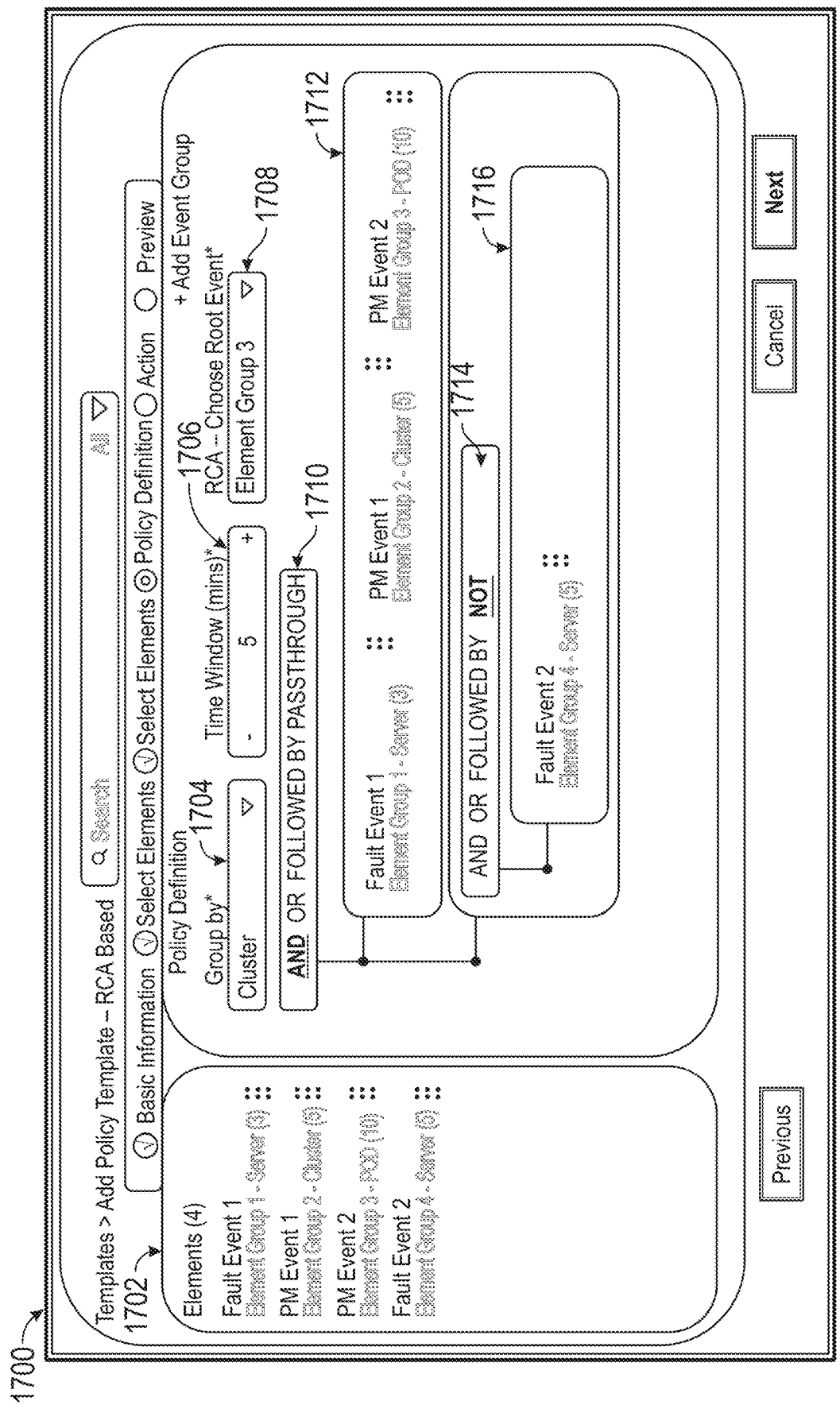

In operation 1210 of method 1200, GUI 1700 is configured to allow a user to define a policy based upon the prior selected elements. In some embodiments, from user input field 1708 the user selects which of the element groups the user is defining the policy. In a non-limiting example, the user has selected element group 3. In some embodiments, within user input field 1706 a user defines a time window in which the policy is monitoring event messages to potentially take an action. In the example of FIG. 17, a user has set the time window at 5 minutes. In some embodiments, the time window is a sliding window, meaning event messages within five minutes of the current time are retained to determine whether a policy definition is satisfied. In some embodiments, after each five-minute window, all event messages are dumped, and a new group is collected for five minutes.

In some embodiments, user input field 1704 allows a user to determine how the policy is grouped. Group By user input field 1704 is configured to allow the grouping of smaller entities within larger entities to execute a single policy at a group level. Continuing with the non-limiting example, in response to grouping a hundred servers in a cluster and the CPU load of one of the one hundred servers within the server cluster is higher than 90%, then the same auto-scaling policy for servers in that cluster triggers. In some embodiments, at user selection field 1710, a user selects a conjunction, like GUI 1600. In the non-limiting example, the user selects an and conjunction with elements box 1702, where the faults defined in GUI 1600 are identified for the element group listed in user input field 1708. Continuing with the non-limiting example, a user selects a conjunction in user selection field 1710 (e.g., and). Before the policy definition is satisfied, fault event message 1, PM event message 1, and PM event message 2 (shown in event box 1712) have been filtered and identified. In the non-limiting example, the user has further restricted the policy definition within user selection field 1714 that fault event 1, PM event 1, and PM event 2 are unable to be paired with fault event 2. Thus, in response to fault event 1, PM event 1, and PM event 2 all occurring within the five-minute window of user selection field 1706, the policy definition is satisfied, unless fault event 2 is also triggered within the five-minute window.

GUI 1700 presents a flexible system in which to monitor for specific fault events, performance metrics, or both to better monitor the operation of a system. Process flows from operation 1210 to operation 1212.

In operation 1212 of method 1200, an action to be taken is defined, when the RCA policy definition in operation 1210 is satisfied. GUI 1800 is configured to allow a user to create an action that is executed based upon the policy definition set forth in operation 1210.

Summary table 1502 is again shown in GUI 1800 summarizing all the element groups established in operation 1204. In some embodiments, the user selects an action type in user input field 1802. Continuing with the non-limiting example, the user selects workflow (as shown in FIG. 18), notification, or incident ticket (discussed in greater detail above and below). In user input field 1804, an action resource is designated. In the example of FIG. 18, LCM is selected. LCM, as discussed above in methods 600, 700, and 1000, is an orchestrator that aligns business requests with the applications, data, and infrastructure.

In user input field 1806, a user selects the action to be taken. In the example of FIG. 18, the user has selected to restart the network function like that discussed in method 600 and CPE 300. User input field 1808 allows the user to select a payload to coincide with the action taken (e.g., an XML payload with parameters to be set after a restart). At user input field 1810, a user selects to have the action triggered when a change request (CR) occurs.

A CR is declarative (i.e., CR states what needs to be accomplished, but leaves out how the change should be carried out). Elements of a change request are an ID, the customer (ID), the deadline (if applicable), an indication whether the change is required or optional, the change type (often chosen from a domain-specific ontology) and a change abstract, which is a piece of narrative. Change requests typically originate from one of five sources. (1) problem reports that identify bugs that are to be fixed, which forms the most common source; (2) system enhancement requests from users; (3) events in the development of other systems; (4) changes in underlying structure and or standards (e.g., in software development); (5) demands from senior management. Additionally, in Project Management, change requests further originate from an unclear understanding of the goals and the objectives of the project. Process flows from operation 1212 to operation 1214.

In operation 1214 of method 1200, the RCA policy is submitted for approval by a network administrator as indicated in text box 1902. The user is further presented with a list of CPE policy templates 1904. Each policy template in list 1904 is selected by clicking one or more of boxes 1906. By clicking on box 1906 adjacent to the status heading, each policy template included in list 1904 is selected. Alternatively, a user selects an individual policy template, by clicking on the box for a corresponding policy template. A user is further able to select a group of policy templates by clicking on more than one box.

List 1904 provides the name of the policy template, the type of policy template (e.g., standard, RCA), the version, the date and time of creation, the creator, date and time of last modification, and an indicator as to whether the policy is triggered upon a CR.

Figure 20:
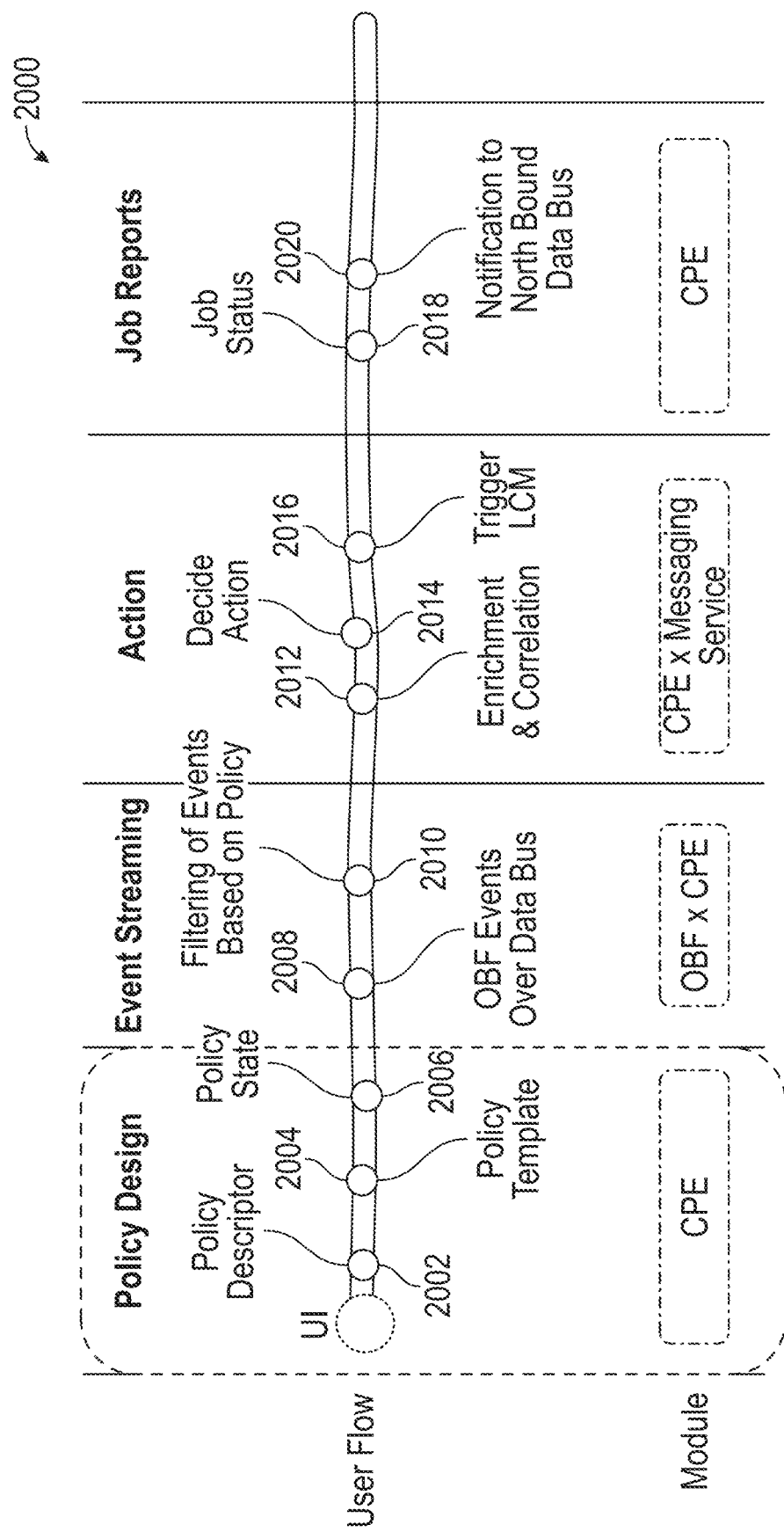
FIG. 20 is a flow diagram of policy implementation, in accordance with some embodiments.

FIG. 20 is a flow diagram of policy implementation 2000, in accordance with some embodiments.

FIG. 20 is discussed to provide an understanding of the operation of CPEs 300, 200, or 100 through method of policy implementation 2000. In some embodiments, method for implementing a policy 2000 is a functional overview of a CPE, such as CPEs 300, 200, or 100. Method 2000 is executed by processing circuitry 3502 discussed below with respect to FIG. 35. In some embodiments, some, or all the operations of method 2000 are executed in accordance with instructions corresponding to instructions 3506 discussed below with respect to FIG. 35.

Method 2000 includes operations 2002-2020, but the operations are not necessarily performed in the order shown. Operations are added, replaced, order changed, and/or eliminated as appropriate, in accordance with the spirit and scope of disclosed embodiments. In some embodiments, one or more of the operations of method 2000 are repeated. In some embodiments, unless specifically stated otherwise, the operations of method 2000 are performed in order.

In operation 2002 of method 2000, a user, at UI such as UI 208 or 3518, creates a policy descriptor that identifies one or more faults or policy metrics in which a later action is to be based upon. Process flows from operation 2002 to operation 2004.

In operation 2004 of method 2000, the user submits the policy template to a network manager who will review the template (e.g., policy structure, policy purpose, policy effectiveness, and other suitable policy parameters within embodiments of the preset disclosure). Process flows from operation 2004 to operation 2006.

In operation 2006 of method 2000, in response to the network manager approving the policy template, the policy template is placed within a template database for use by the policy creator and others. A user is now able to implement a policy state (e.g., implement the policy for a CPE to monitor and implement respective actions) on incoming event messages. Process flows from operation 2006 to operation 2008.

In operation 2008 of method 2000, an OBF, such as OBF 605, collects event messages on a data bus, such as data bus 214 or 607. The event messages are filtered in operation 2010 based upon each policy in effect, such as the created policy in operation 2002, at the time of filtering of event messages. Process flows from operation 2010 to operation 2012.

In operation 2012 of method 2000, the filtered event messages are enriched and correlated. As discussed above, an inventory database, such as inventory database 228, is accessed to enrichment of the event messages and a policy and correlation module, such as policy correction and evaluation module 226. Event correlation is a technique for making sense of many events and pinpointing the few events that are of interest in the large number of events. This is accomplished by looking for and analyzing relationships between events. Event enrichment is the process by which the CPE monitors an event source for new events, looks up information related to the new events in an external data source, such as inventory database 228, and then adds the information to the event. Process flows from operation 2012 to operation 2014.

In operation 2014 of method 2000, the CPE decides an action to be taken based upon the policy descriptor in operation 2002. In operation 2016, the action triggers an LCM, such as LCM 613, which triggers the action to be performed to remedy the issue identified by the policy or notify personnel (e.g., through email, SMS, text, or other suitable messaging within embodiments of the present disclosure) the issue identified by the policy is occurring and needs to be addressed. Process flows from operation 2016 to operation 2018.

In operation 2018, the CPE updates the job status, e.g., the state of the triggered action of the LCM, and sends a notification in operation 2020 to the data bus so that any user determines the results of the action taken.

Figure 21:
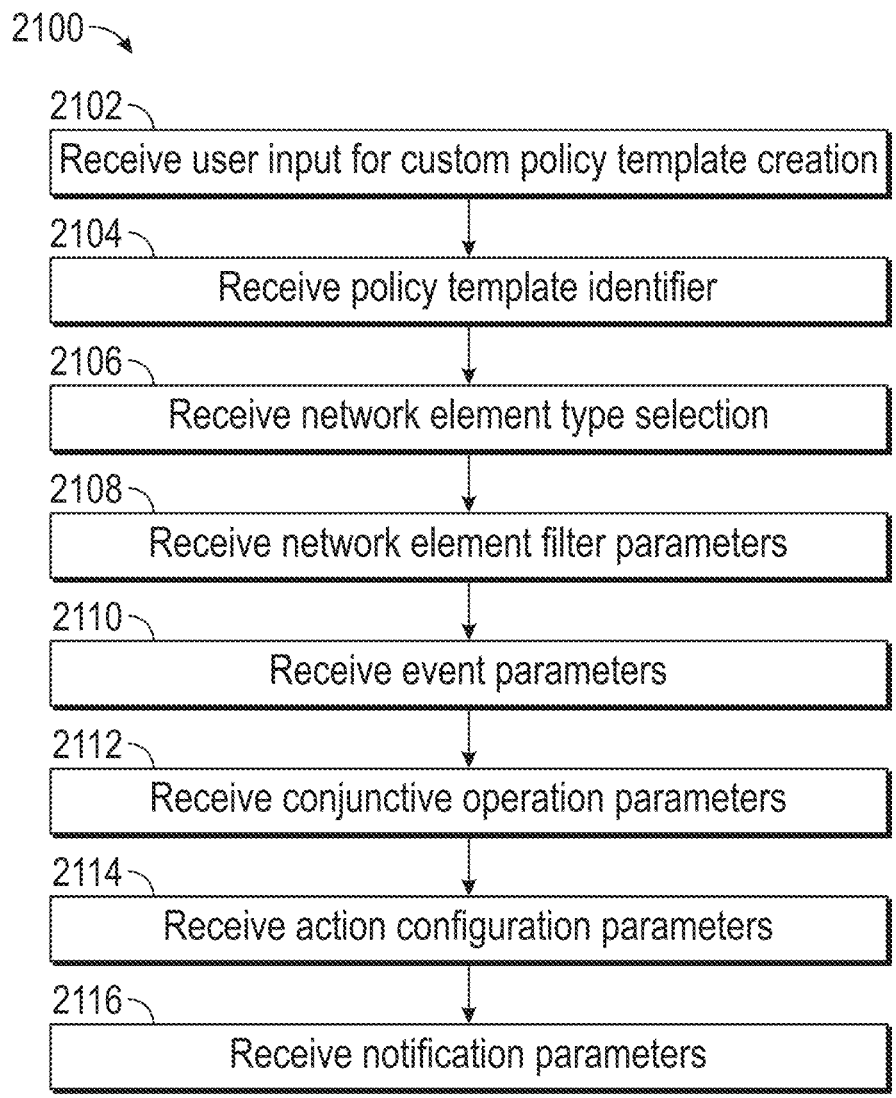
FIG. 21 is a flow diagram of a method for drag-and-drop policy creation, in accordance with some embodiments.

FIG. 21 is a flow diagram of a method for drag-and-drop policy creation 2100, in accordance with some embodiments.

FIGS. 22, 23, 24, 25, 26, 27, 28, 29, 30, 31 and 32 are graphical user interfaces (GUIs) 2200, 2300, 2400, 2500, 2600, 2700, 2800, 2900, 3000, 3100, and 3200 for a correlation and policy engine (CPE), in accordance with some embodiments.

FIGS. 21-32 are discussed together to provide an understanding of the operation of GUIs 2200, 2300, 2400, 2500, 2600, 2700, 2800, 2900, 3000, 3100, and 3200 and the method for drag-and-drop policy creation 2100. In some embodiments, method for drag-and-drop policy creation 2100 is a functional overview of policy creation for a CPE through GUIs, such as 2200, 2300, 2400, 2500, 2600, 2700, 2800, 2900, 3000, 3100, and 3200. In some embodiments, method 2100 is stored as instructions, such as instructions 3506, and executed by processing circuitry 3502 discussed below with respect to FIG. 35. In some embodiments, some, or all the operations of method 2100 are executed in accordance with instructions corresponding to instructions 3506 discussed below with respect to FIG. 35.

Method 1200 includes operations 2102-2116, but the operations are not necessarily performed in the order shown. Operations are added, replaced, order changed, and/or eliminated as appropriate, in accordance with the spirit and scope of disclosed embodiments. In some embodiments, one or more of the operations of method 2100 are repeated. In some embodiments, unless specifically stated otherwise, the operations of method 2100 are performed in order.

In operation 2102 of method 2100, a user selects to create a custom policy template from drop down window 1908 (FIG. 19). In operation, a user clicks on user selection filed 1910, which presents drop down window 1908. Within drop down window a user is presented with options to create a custom policy, upload an already created policy or to use a descriptor. Continuing with the non-limiting example, the upload—pre-filled policy rule template allows a user to upload information that includes entire policy information. Use descriptor is a pre-filled policy but does not include the entire information (e.g., user descriptor has some information pre-populated and the rest of the information is filled out to complete the policy and activate). As shown in FIG. 19, in correlation and policy engine templates GUI 1900, the custom creation option is highlighted indicating the user is selecting to create a custom policy. Process flows from operation 2102 to operation 2104.

In operation 2104 of method 2100, GUI 2200 is presented for the user to add a policy template. Pop-up box 2202 presents user input fields 2206 through 2212 to identify the policy template being created. In a non-limiting example, a user inputs a policy name in user input field 2206, a version in user input field 2208, a vendor in user input field 2210, and a description in user input field 2212. In some embodiments, a user input field with an asterisk adjacent to the titled of the user input field is an indication an input is desired to move forward with the policy template creation process. In some embodiments, a user cancels the policy template creation process by clicking on user input selection 2212. In some embodiments, a user proceeds to operation 2206 by clicking on user input selection 2214.

In some embodiments, a policy template is located on policy manager 210 and/or policy database 340. GUI identifier 2216 identifies GUI 2200 as a policy-template addition page, for a policy to be used within CPEs 100, 200, or 300 and within methods 2000 or 2100.

In some embodiments, a user inputs a policy name in user input field 2204. In a non-limiting example, the user has inputted MME auto scale up policy.

Continuing with the non-limiting example, the user inputs a version in user input field 2206, such as 1.0.0 that indicates this is the first version of the policy. In some embodiments, in response to a major change being made to an already existing policy template, the version number changes with the leftmost integer (e.g., version 2.0.0). In some embodiments, in response to a minor change being made to an already existing policy template, the version number changes with the middle integer (e.g., version 1.1.0). In some embodiments, in response to a typographical change being made to an already existing policy template, the version number changes with the rightmost integer (e.g., version 1.0.1). In some embodiments, a new template begins with beginning version number of 1.0.0 signifying a first version of the template.

Within user input field 2208, a user inputs a vendor, such as a service provider 516 of the network. Within user input field 2210, the user inputs a description of the policy being created, such as a purpose of the policy, the boundaries of the policy, and faults or events affecting the policy. In some embodiments, this description is used when other users are performing a search for an already existing policy template to implement or modify.

In some embodiments, policy creation is canceled with user input button 2212. In some embodiments, in response to user input fields 2204, 2206, and 2208 including a valid input, the process moves to the next stage of policy template creation with user input button 2214.

Figure 23:
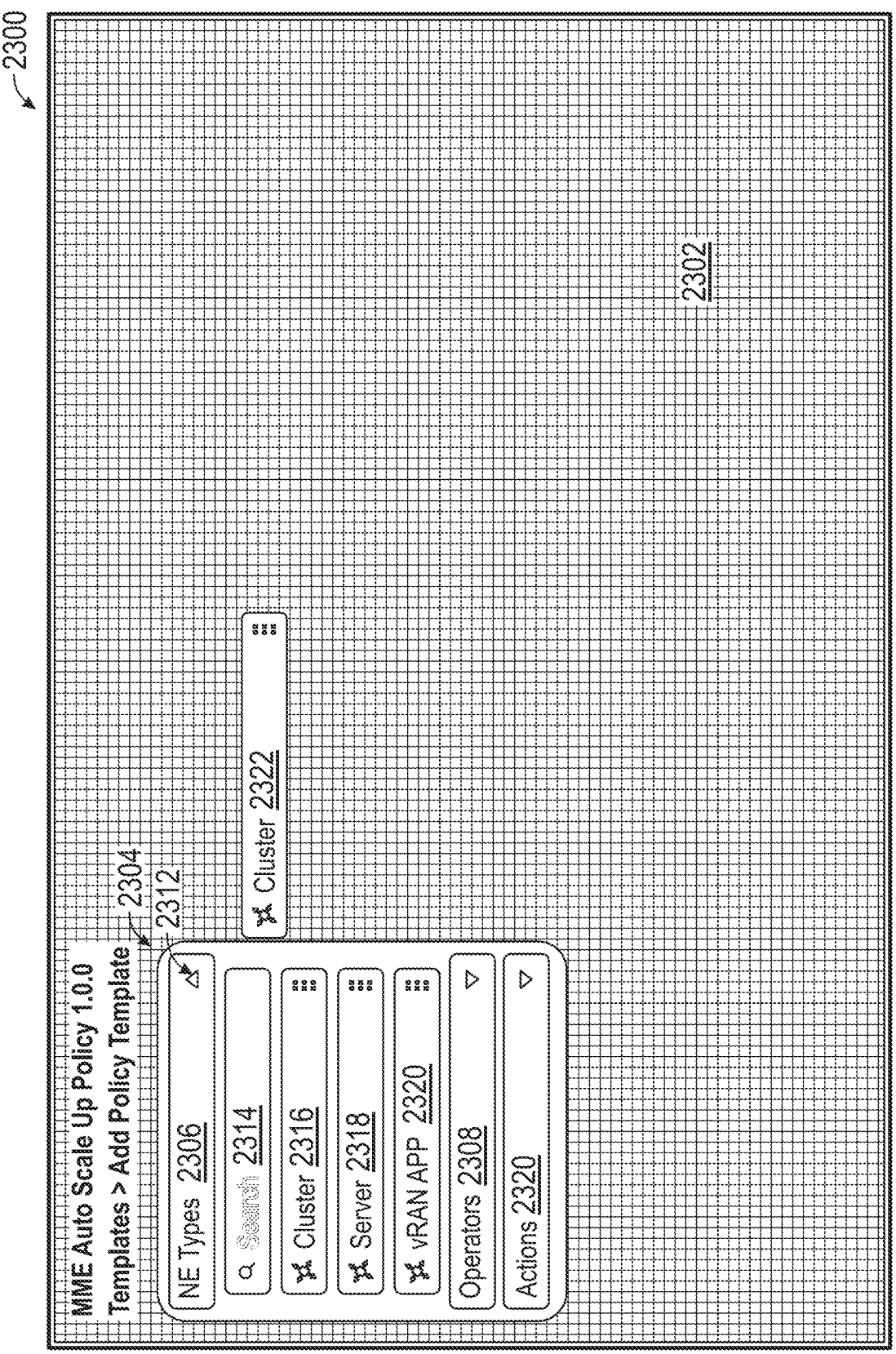
Figure 24:
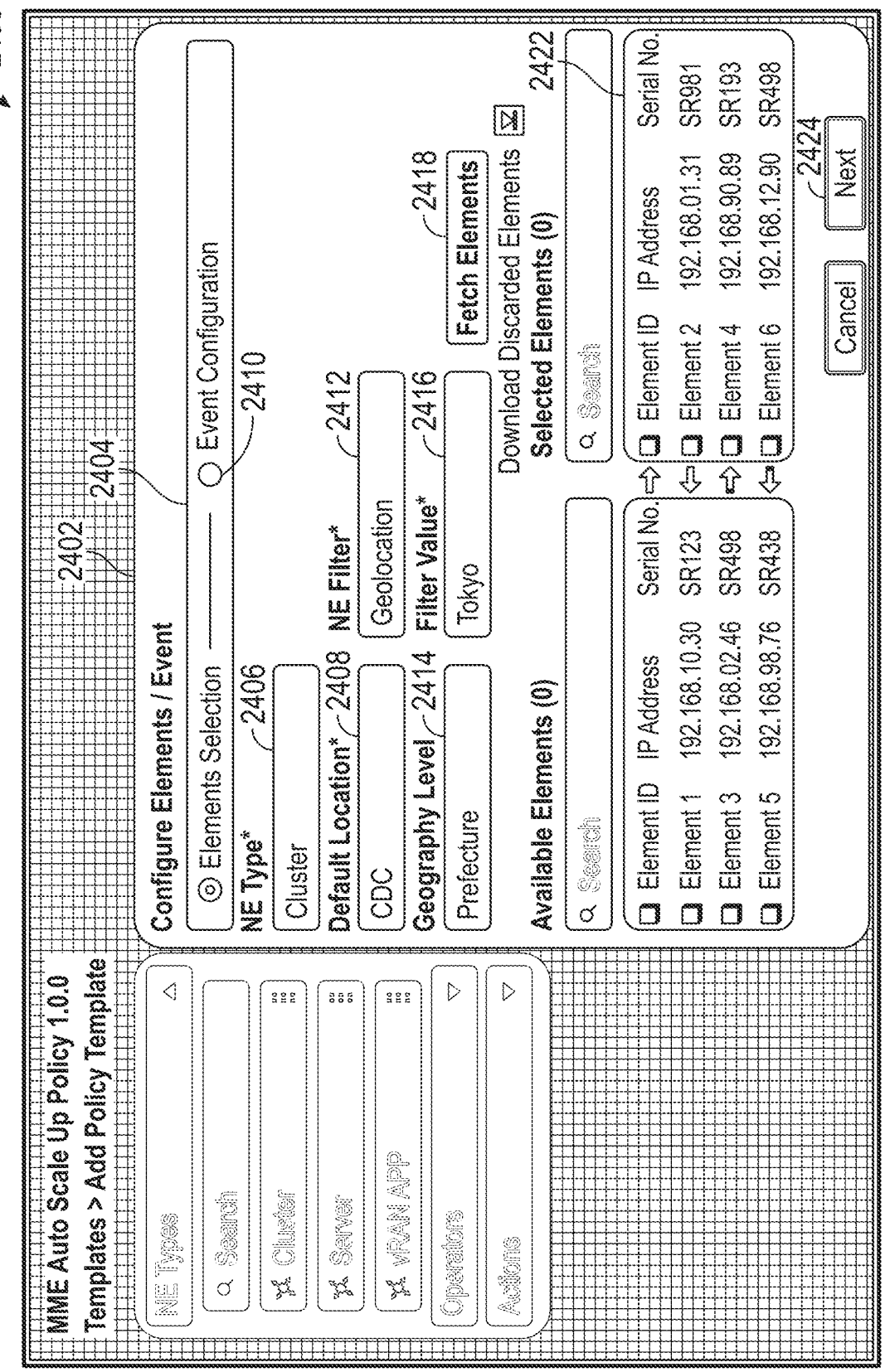
Figure 26:
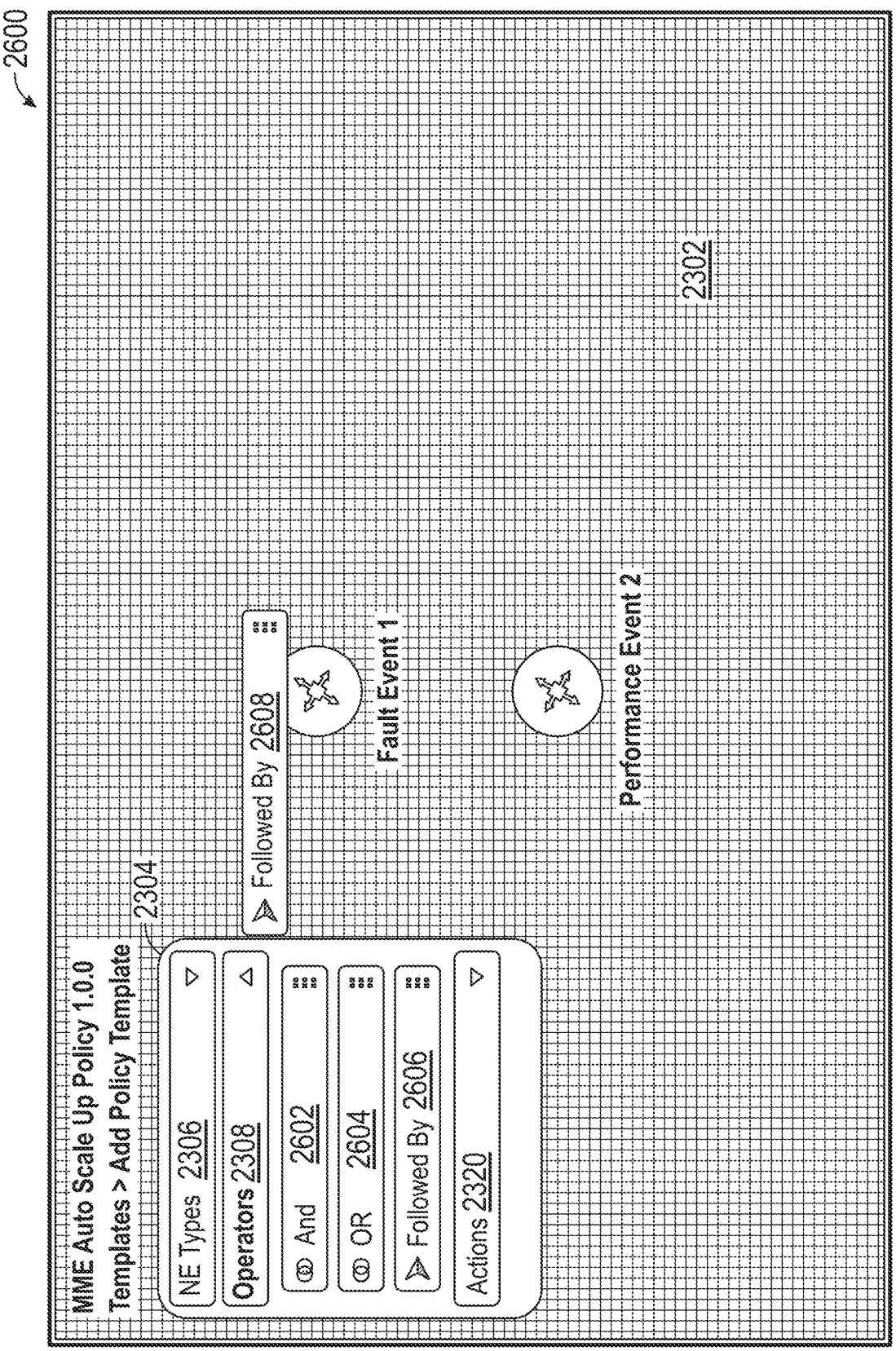
Figure 27:
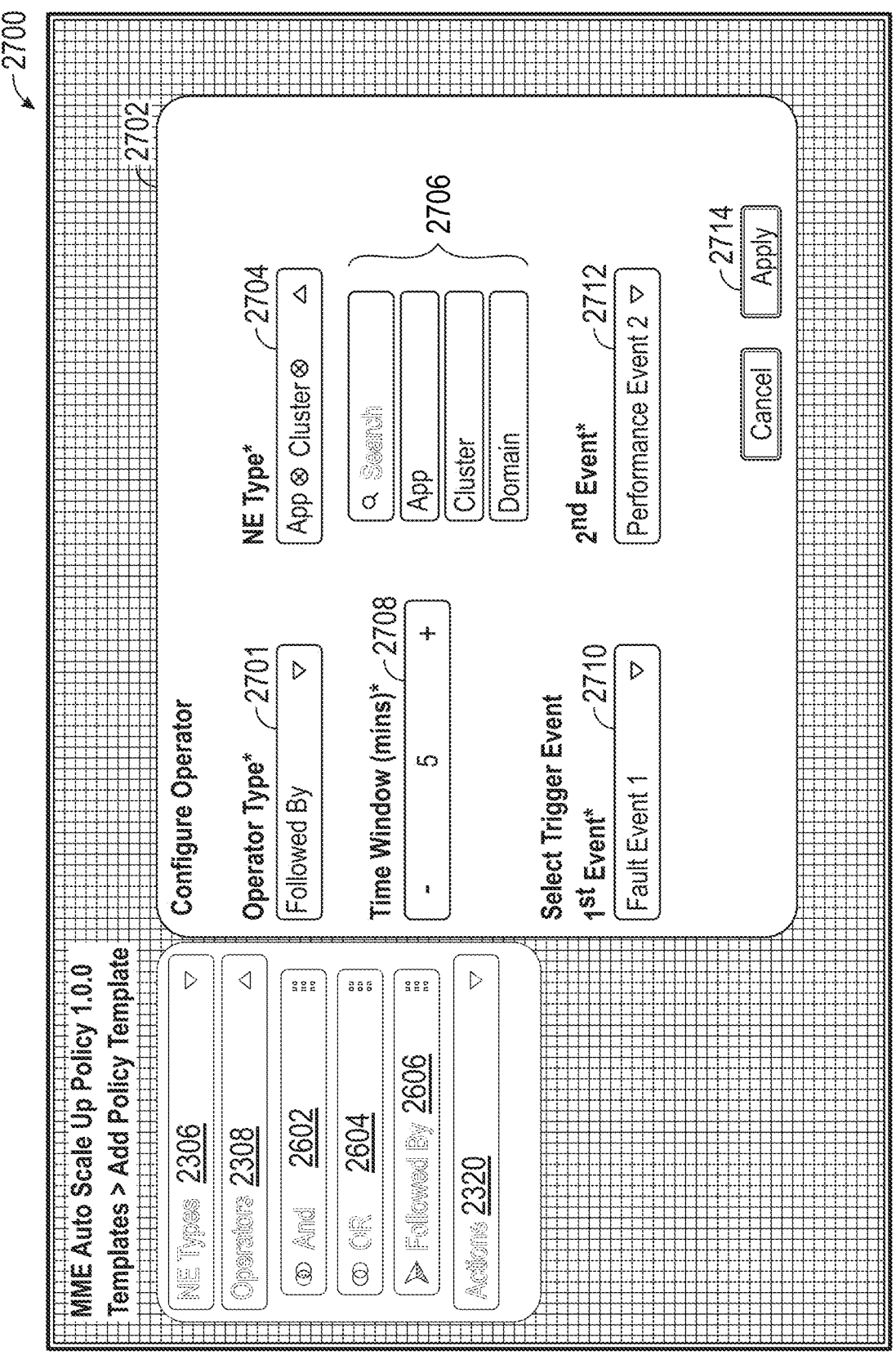

In operation 2106 of method 2100, GUI 2300 is presented to the user to begin creation of the policy description. GUI 2300 is presented as a grid 2302 in which the user drags and drops elements from toolbox 2304. Toolbox 2304 includes three user input selection fields including network types 2306, operators 2308, and actions 2310. In the example of FIG. 23, a user has selected to define network element types 2306 (shown as highlighted and the selection arrow 2312 inverted). In response to a user selecting network element types user input selection field 2306, network element types user input selection field is expanded with user input selection fields 2314, 2316, 2318, and 2320. In some embodiments, a user searches for a desired network element using user input selection field 2314. In some embodiments, a user selects a server as the desired network element type by selecting user input selection field 2318. In some embodiments, the user selects a vRAN application as the desired network element type by selection user input selection field 2320. In the example of FIG. 23, the user has selected user selection input field 2316 to select a cluster as the desired network element type. A user would click and hold on user selection input field 2316 and drag the user selection input field onto grid 2301 as represented by box 2322. Process flows from operation 2106 to operation 2108.

In operation 2108 of method 2100, a user configures the network elements selected in GUI 2400. In response to the user dropping a network element type, such as cluster selection 2322 of FIG. 23, onto grid 2302 pop-up box 2402 is presented to the user. Pop-up box 2402 includes status bar 2404 that informs the user of progress through the element configuration process. The user is informed of where the elements configuration process is by status circles 2410. An open circle indicates the user has not reached the stage to the right of the open circle (e.g., event configuration has an empty circle to the left indicating the user has not begun this process of policy template setup); a partially filled circle, such as the circle in front of elements selection included in status bar 2404, indicates the current progress in the policy template creation (e.g., the user is currently working on the elements selection portion of the policy template); and a checkmark within the circle indicates that stage of the policy creation process has been completed. In operation, after the elements are selected, process flows to event configuration as discussed below.

Pop-up box 2402 displays user input fields 2408, 2412, 2414, and 2416 for a user to select elements. NE type in box 2406 is already filled in with cluster as this is what the user selected with regards to FIG. 23. Thus, the NE type is already filled in.

In some embodiments, in user input field 2408 the user inputs the default location of the cluster. Continuing with the non-limiting example, the cluster is in or at a CDC (e.g., a central data center, such as a building, a dedicated space within a building, or a group of buildings used to house computer systems and associated components, such as telecommunications and storage systems).

In some embodiments, in user input field 2412 the user inputs a network element (NE) filter value. Continuing with the non-limiting example, the user clicks on the down arrow and selects the desired network element, such as geolocation. Thus, the policy is filtering for clusters within a geolocation. Thus, as event messages are routed to a CPE, such as CPEs 100, 200, and 300, the event messages are first filtered, for the example of FIG. 24, by whether the event messages are related within a selected geolocation.

In some embodiments, the NE filter is narrowed even further by selecting a geographic level in user input field 2414. In the non-limiting example, the user has selected a prefecture (e.g., a regional or local government subdivision in various countries). Continuing with the non-limiting example, a user narrows the filter even further by inputting a filter value in user input field 2416. In the non-limiting example, the user has selected the city of Tokyo. Thus, during the filtering process described above with regards to CPEs 100, 200, and 300, the policy, when implemented first filters according to box 2406 and then filters those results according to filter values in user input fields 2408, 2412, 2414 and 2416.

In some embodiments, the user clicks on user input button 2418 and elements associated with the criteria inputted by the user are gathered and placed within available elements box 2420. In some embodiments, the user moves available elements from available elements box 2420 to selected elements box 2422 using the right facing arrows. In some embodiments, the user is further able to move elements from the selected elements box by clicking on one or more selected elements and clicking on a left-facing arrow to move the selected elements back to the available elements box 2420. In response to the user selecting the elements of interest, the user clicks on user input button 2424 to apply the selected elements to the soon-to-be-created policy. Process flows from operation 2108 to operation 2110.

In operation 2110, a user defines event configuration parameters. In some embodiments, GUI 2500 is configured to allow the user to create the event configuration. In some embodiments, in response to the selection of elements of operation 2108 that are to be a part of the policy template, the user defines one or more faults to be monitored within the element group on GUI 2400.

In some embodiments, the user selects an event source (e.g., the source of the event message in which the fault is reported) at user input field 2502. Continuing with the non-limiting example, the user has selected OBF (observability framework that collects fault events and increments performance counters as the event source), such as OBF 605. In some embodiments, the user selects the event type at user input field 2504. In some embodiments, a user selects from a list of fault events by clicking the down arrow included in user input field 2504. Continuing with the non-limiting example, the user has selected a fault, which filters incoming event messages for fault events. Thus, the processing circuitry, such as processing circuitry 3502 (FIG. 35), is monitoring incoming event messages for fault events (e.g., event messages with faults within the event message).

In some embodiments, within user input field 2508 a user defines a time window in which the policy is monitoring event messages to potentially take an action. In the example of FIG. 25, a user has set the time window at 5 minutes. In some embodiments, the time window is a sliding window, meaning event messages within five minutes of the current time are retained to determine whether a policy definition is satisfied. In some embodiments, after each five-minute window, all event messages are dumped, and a new group is collected for five minutes.

The user defines the condition even further by setting a match by condition in user selection box 2510. Continuing with the example, average has been selected, therefore, whatever value is selected in user input box 2514, before the condition is satisfied, the average value over 5 minutes is determined.

In some embodiments, the user defines in user input field 2512 an operator that initiates a fault event. Continuing with the non-limiting example, the user has selected a greater than operation by clicking on the down arrow and choosing greater than from a list of mathematical and logic operators. The user has selected a value of 90 in user input field 2514 meaning the average over 5 minutes is greater than 90 before initiating an action. Continuing with the non-limiting example, fault event 1 is an alias of a fault, so in response to the fault event being a CPU load (one kind of fault event), then the policy is triggered in response to the CPU load being greater than 90%. Process flows from operation 1208 to operation 1210. Process flows from operation 2110 to 2112.

In operation 2112, a user defines conjunctive connectors for one or more events. With toolbox 2304, GUI 2600 is configured to allow a user to select from several options to determine a specific fault using conjunctive connectors and 2602, or 2604, and/or followed by 2606. In a non-limiting example, a user, with a drag and drop operation, place a conjunction, such a followed by 2608, to be paired with fault event 1 and performance event 2 which were defined prior regarding operations 2108 and 2110. Continuing with the non-limiting example, fault event 1 is the initial event followed by performance event 2. In some embodiments, performance event 2 is the initial event followed by fault event 1.

In computer GUIs, drag and drop is a pointing device gesture in which the user selects a virtual object by grabbing the virtual object and dragging it to a different location or onto another virtual object. In general, drag and drop is used to invoke many kinds of actions, or create various types of associations between two abstract objects.

In response to the user setting followed by icon 2608 on grid 2302, pop-up box 2701 is presented to the user to configure the conjunctive operator (e.g., followed by 2608). Box 2701 is filled automatically as the user has already selected the conjunctive operation type in FIG. 26. In some embodiments, the user changes the conjunctive operator type by clicking on the down arrow in box 2701 to select a different conjunctive operator.

In user input field 2704, the user selects the network element types from network elements group 2706. Time window 2708 is set to define boundaries as to when the $2^{nd}$ event occurs in relation to the first event. Continuing with the non-limiting example, in response to performance event 2 occurring within 5 minutes of fault event 1, an action is initiated.

In some embodiments, user selection fields 2710 and 2712 are automatically filled based upon which order the events were placed upon grid 2302. In some embodiments, a user changes the $1^{st}$ event or $2^{nd}$ event by clicking on the down arrow within user selection fields 2710 and 2712; however, the user is blocked from using the same event within both user selection fields 2710 and 2712. Once the user has configured the conjunction operator, the user clicks on user selection field 2714. Process flows from operation 2112 to operation 2114.

In operation 2114 of method 2100, a user selects an action to take in response to the trigger event set in operation 2112 (FIG. 27) being satisfied. In toolbox 2304, a user clicks on user selection box 2320 to present action types presented as user selection boxes. The user selects from user selection boxes 2802 (workflow), 2804 (notification), and 2806 (change request). Workflow 2802 is used when the user desires for an attempted repair of the fault. For example, the user desires for a network function restart. Notification is selected when the user desires for a network operator or engineer to be informed of the triggered event and for the network operator or engineer to act. Change request is selected when the triggered event initiates a change request to repair the issue causing the triggered event.

Figure 28:
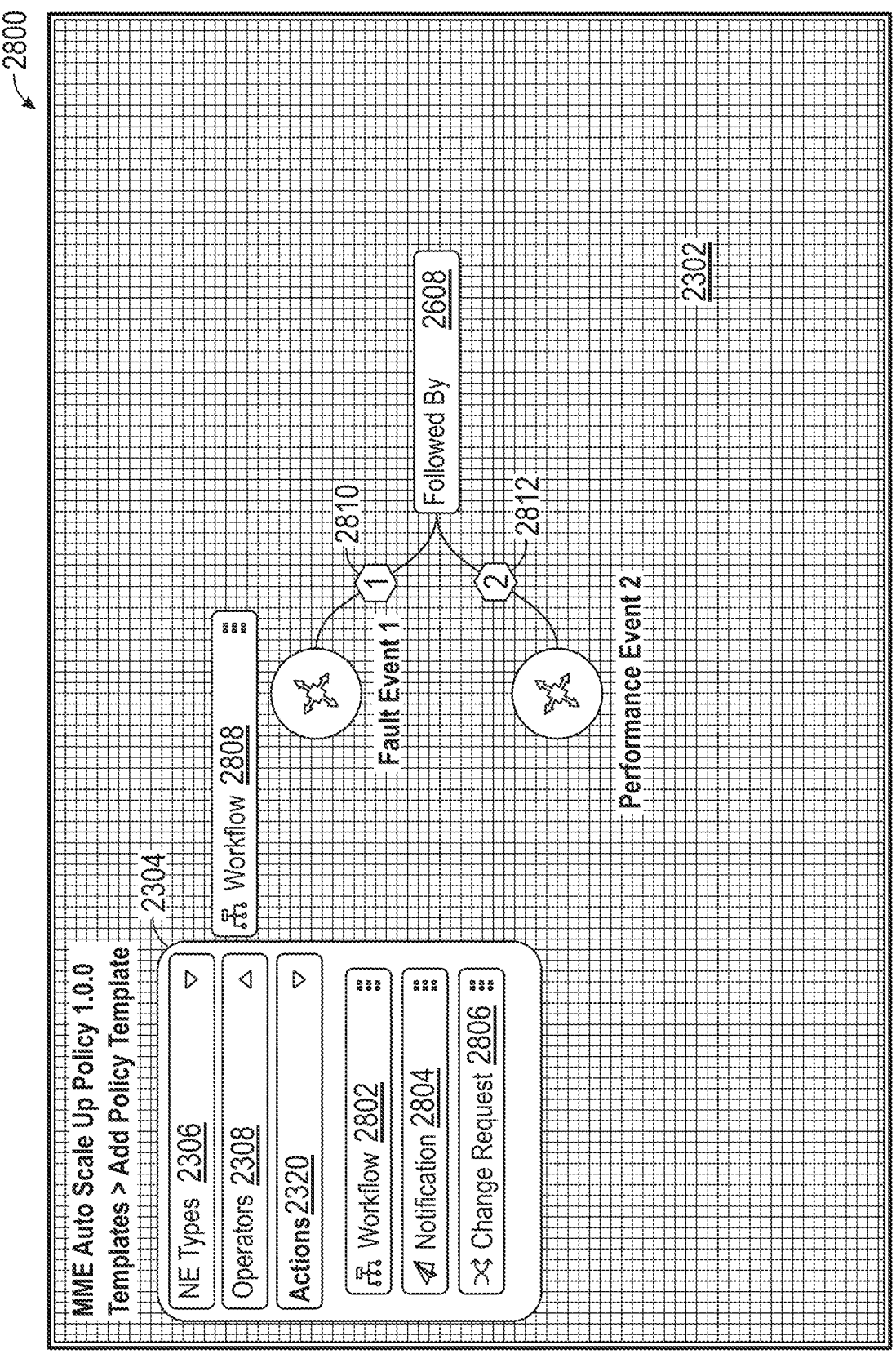

In operation, a user would drag and drop an action, such as workflow 2808, onto the grid 2302. Further, as seen in FIG. 28, fault event 1 and performance event 2 are linked to followed by conjunctive operator 2608 and each event is labeled in the order of occurrence for the trigged event. Such as, fault event 1 includes a heptagram 2810 indicating fault event 1 is to occur first and heptagram 2812 indicating performance event 2 occurs second.

Figure 29:
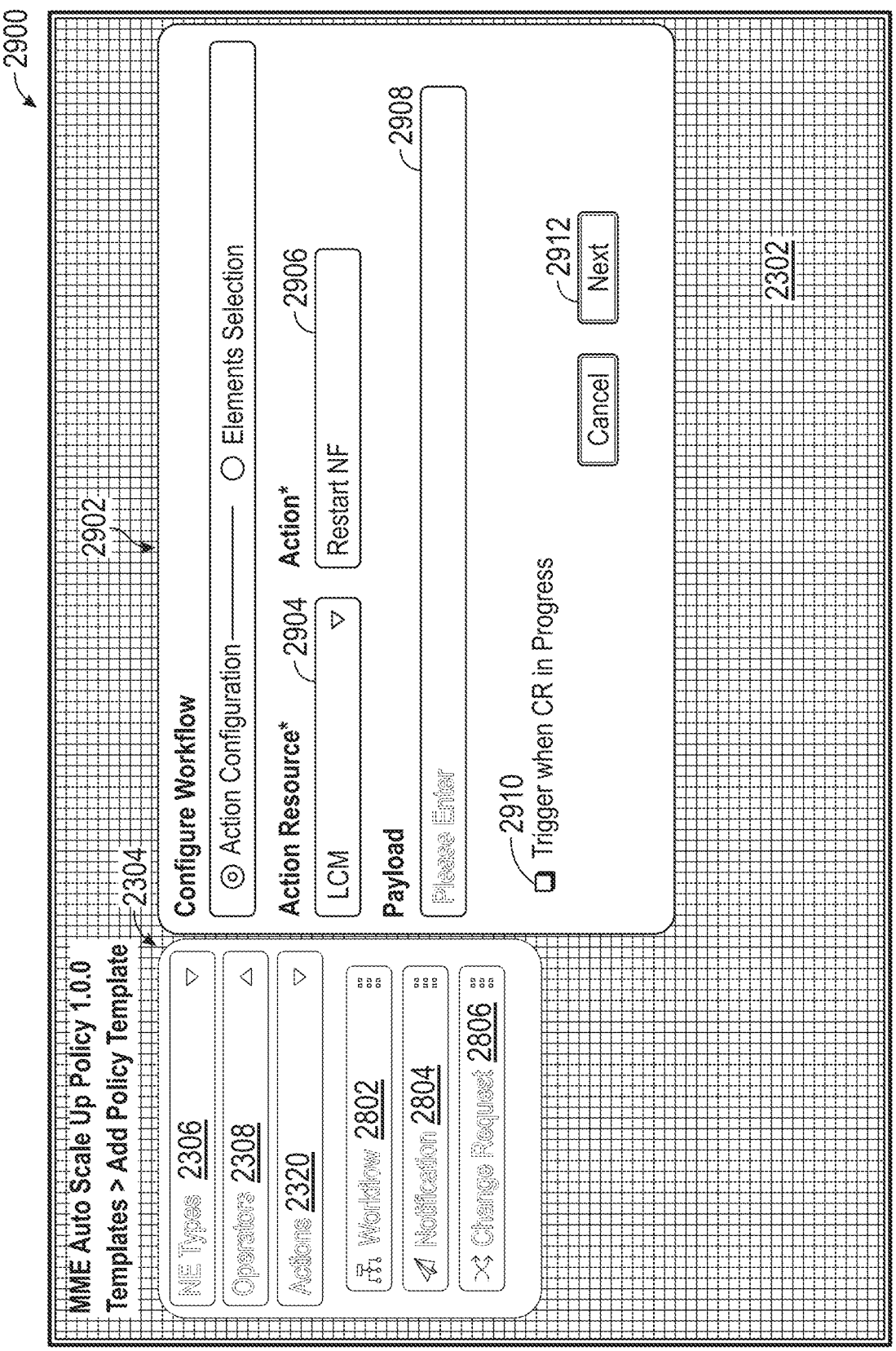

With reference to FIG. 29, upon the user dropping the workflow 2802 user selection box onto grid 2302, pop-up box 2902 is presented on GUI 2900. GUI 2900 is configured to allow a user to create an action. In user input field 2904, an action resource is designated. In the example of FIG. 29, LCM is selected. LCM, as discussed above in methods 600, 700, and 1000, is an orchestrator that aligns business requests with the applications, data, and infrastructure.

In user input field 2906, a user selects the action to be taken. In the example of FIG. 29, the user has selected to restart the network function like that discussed in method 600 and CPE 300. User input field 2908 allows the user to select a payload to coincide with the action taken (e.g., an XML payload with parameters to be set after a restart). At user input field 2910, a user selects to have the action to be triggered when a change request (CR) occurs. Upon completion of configuring the workflow, a user clicks on user selection field 2912 to move to next operation in the process.

Figure 30:
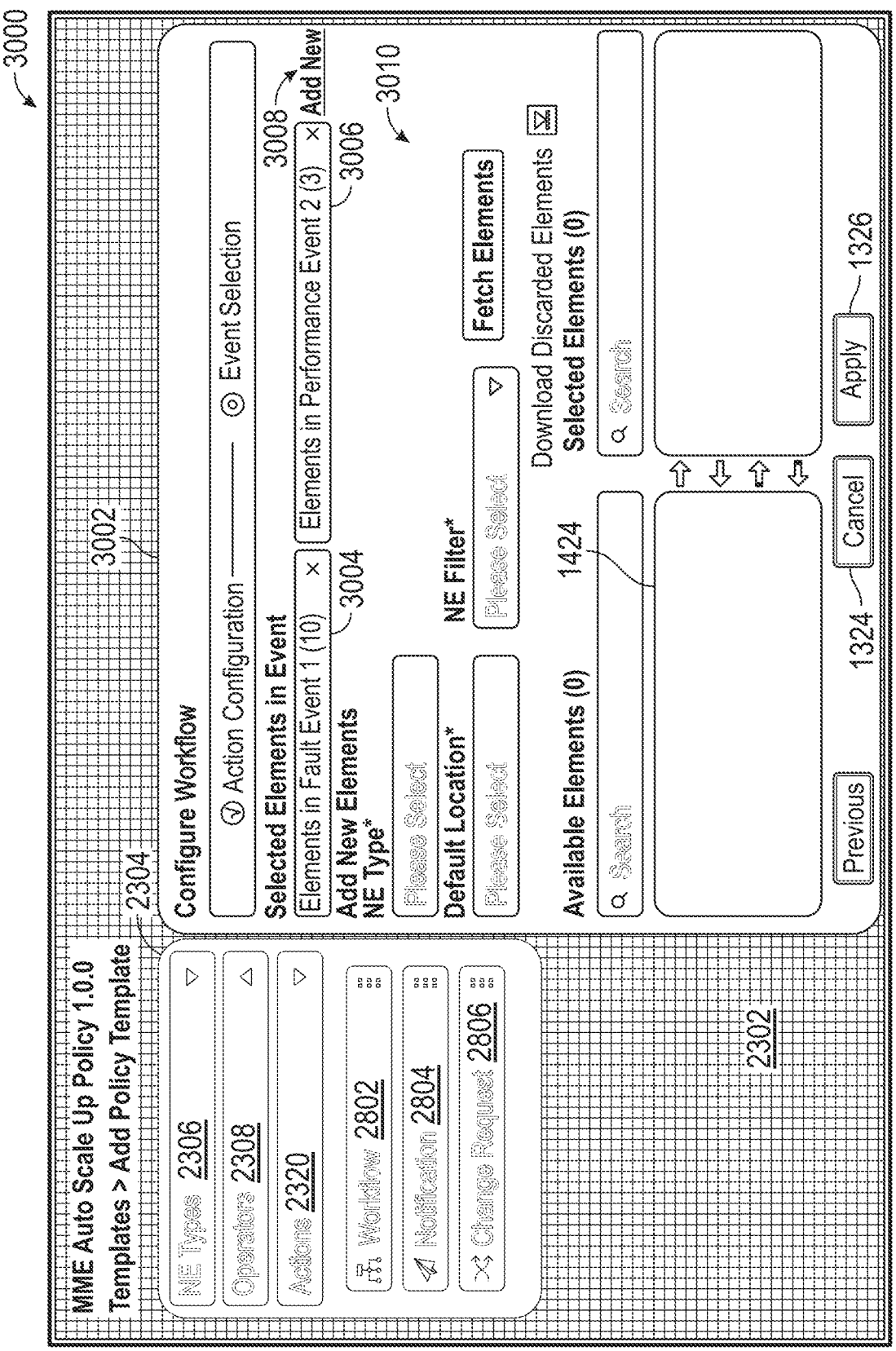
Figure 31:
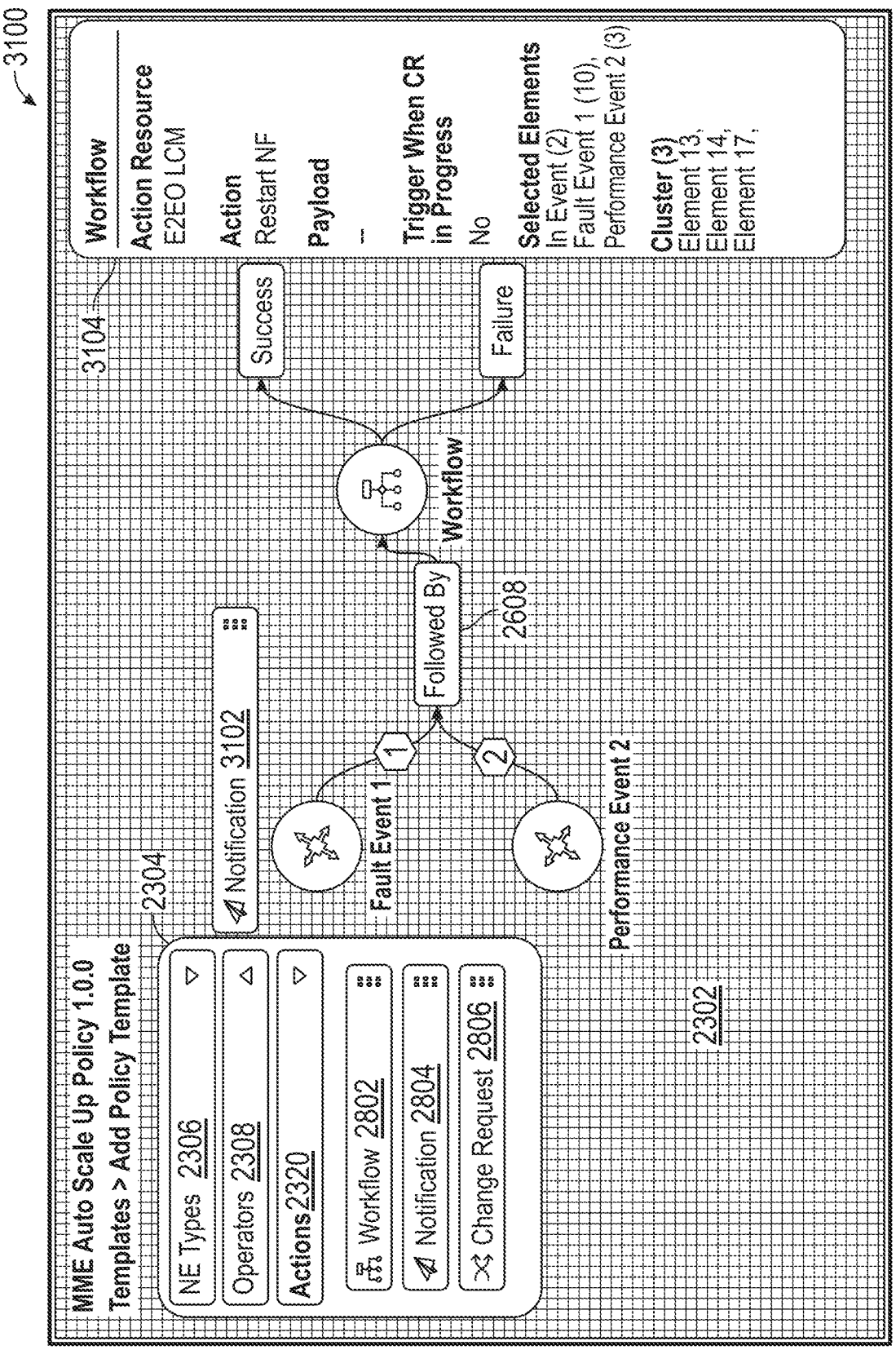
Figure 32:
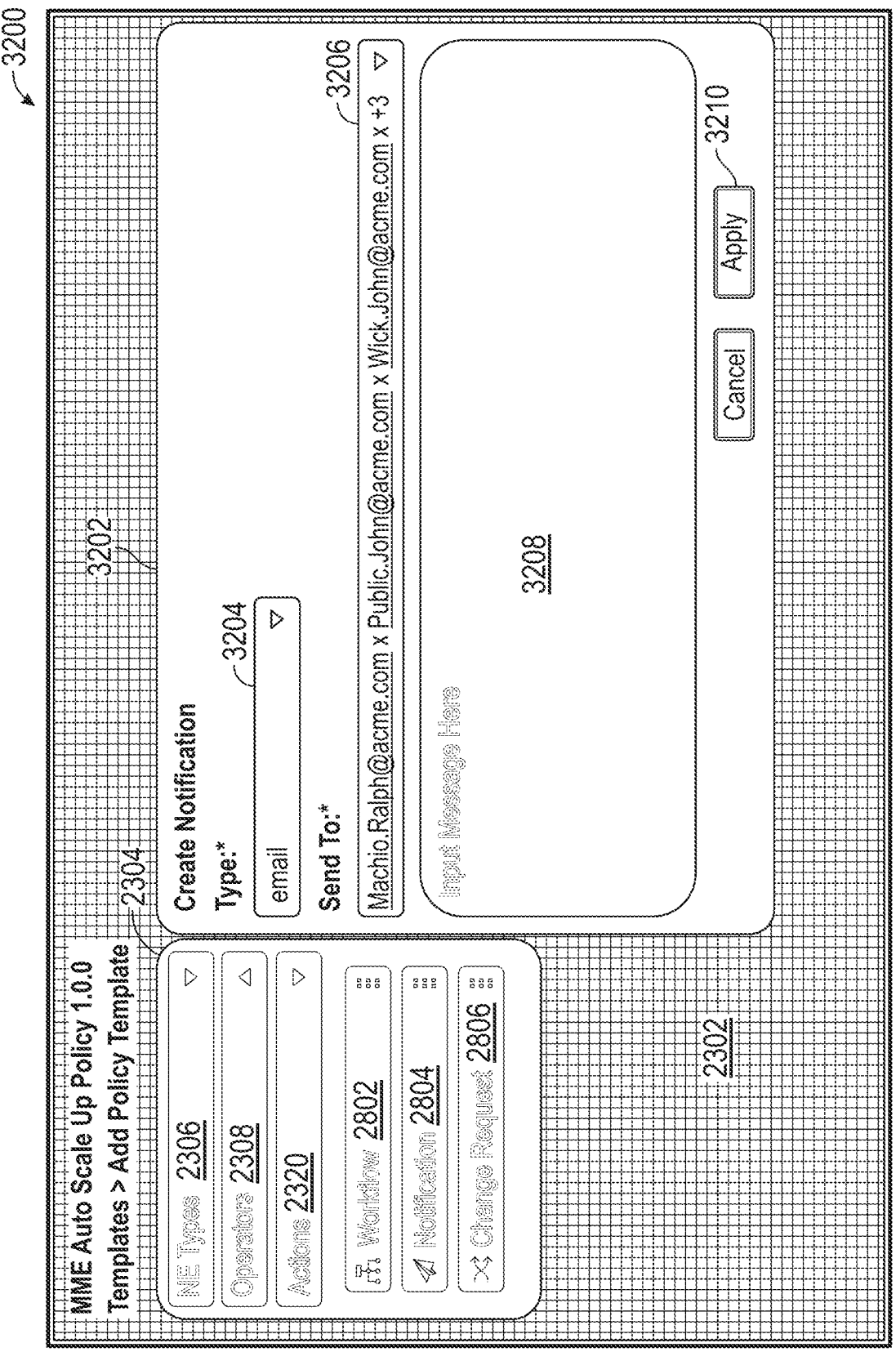

With reference to FIG. 30, upon the user clicking on user selection field 2912, pop-up box 3002 is presented in GUI 3000. GUI 3000 provides a summary of the selected elements in the event created. Continuing with the non-limiting example, box 3004 shows fault event 1 including the 10 elements which are part of fault event 1. Similarly, box 3006 shows performance event 2 including the three elements which are part of performance event 2.

In response to a user desiring at the last minute to add another element, the user clicks on user selection field 3008 to add a new element in the event. Upon clicking user selection field 3008, lower portion 3010 of pop-up box 3002 is present to the user. Lower portion 3010 is almost identical to pop-up box 2402 of GUI 2400, which allows a user to add additional elements to the event. Process flows from operation 2114 to operation 2116.

In operation 2116, a user selects a notification that occurs based upon a result of the workflow. Continuing with the non-limiting example, a user selects notification 3102 and drags notification box 3102 onto grid 2302. As shown, the workflow is connected to conjunctive operation 2608, indicating the workflow follows the triggered event. In a similar fashion, notification 3102 comes after the workflow to indicate either success or failure. Summary box 3104 provides the user with a summary of all elements on grid 2302 up to operation 2116.

In response to the user dropping notification 3102 onto grid 2302, GUI 3200 is presented to the user along with pop up box 3202. In the non-limiting example, pop-up box 3202 is in the form of an email; however, pop-up box 3202 is configured to be a short message service (SMS) or any other suitable messaging within embodiments of the present disclosure. For example, in response to the user desiring to send the notification via SMS, the user clicks the down arrow in user selection field 3204 and selects SMS from a pull-down window of messaging selections.

The user inputs the intended recipients in user input field 3206. In some embodiments, one or more of the inputs in input field 3206 are automatically filled based upon CPE settings. The user inputs a message to the recipients (listed in user input field 3206) within user input field 3208. Once complete, the user clicks on user selection field 3210 to apply the messaging settings.

Figure 33:
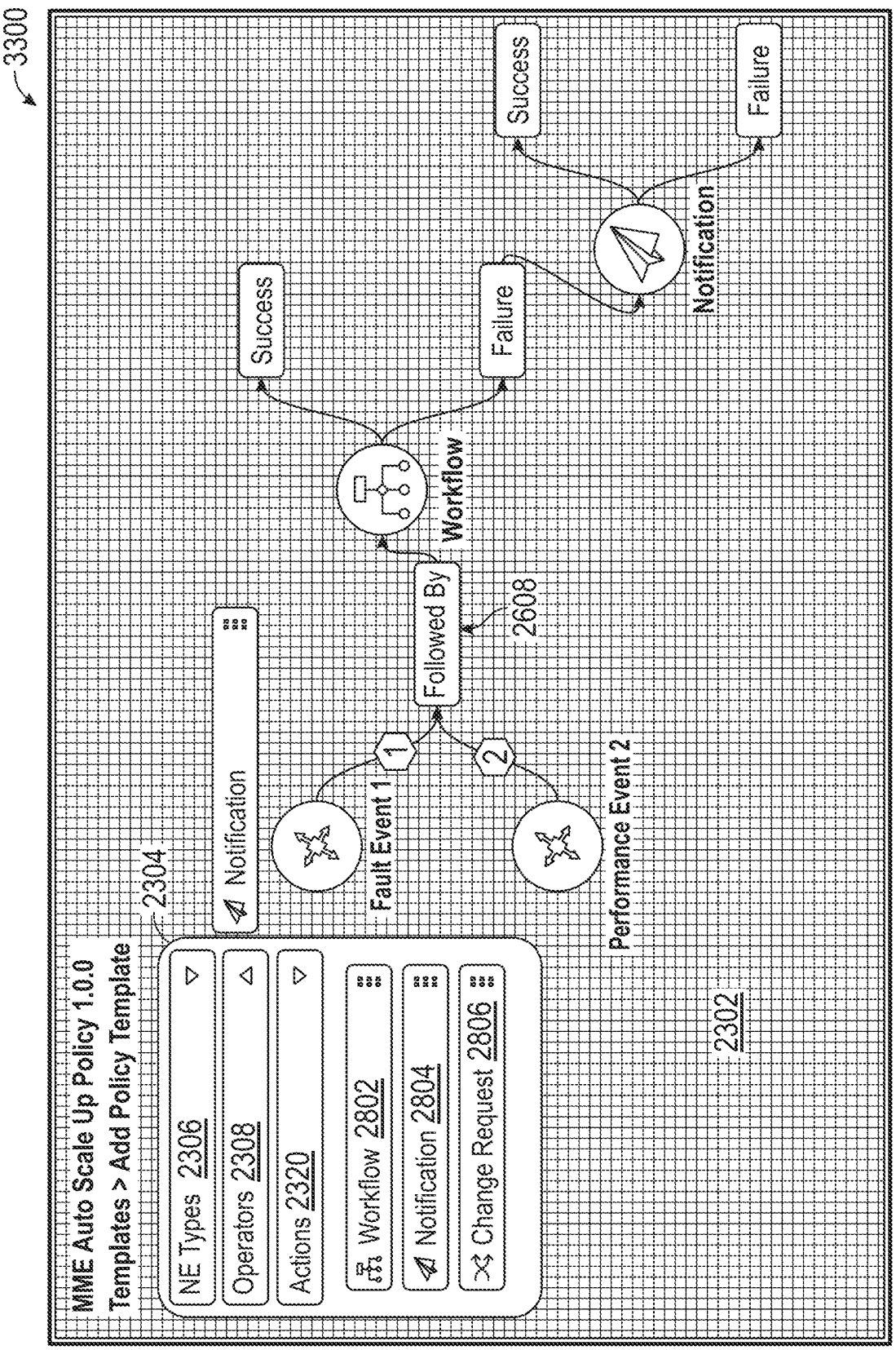

With reference to GUI 3300 of FIG. 33, the user has selected the notification to flow from a failure of the workflow event. In some embodiments, the user creates a second notification based upon success for the workflow event. In some embodiments, the user creates a notification based upon success of the workflow event instead of failure of the workflow event.

With reference to GUI 3400 of FIG. 34, in response to the policy template being accepted by a network manager or engineer, the policy template is put into service. When implemented, job status is monitored on GUI 3400. Those with access to job status GUI 3400 are able to monitor when the policy is successful, when the policy fails, how many times the policy was triggered, when the policy was last run, and other suitable information within embodiments of the present disclosure.

Figure 35:
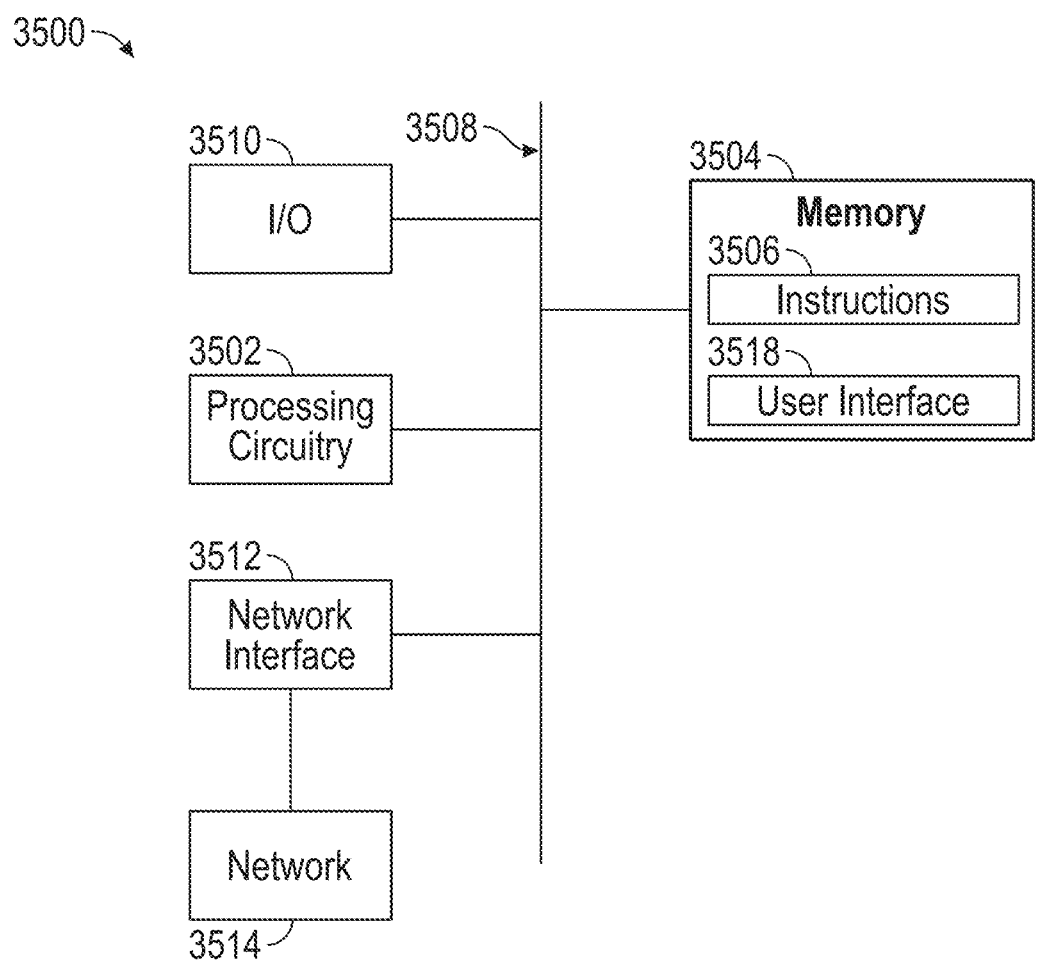
FIG. 35 is a high-level functional block diagram of a correlation and policy processor-based system, in accordance with some embodiments.

FIG. 35 is a block diagram of CPE system 3500 in accordance with some embodiments. In some embodiments, CPE system 3500 is a general-purpose computing device including a hardware processing circuitry 3502 and a non-transitory, computer-readable storage medium 3504. Storage medium 3504, amongst other things, is encoded with, i.e., stores, computer instructions 3506, i.e., a set of executable instructions such as a correlation engine and policy manager. Execution of instructions 3506 by hardware processing circuitry 3502 represents (at least in part) a CPE tool which implements a portion or all the methods, such as method 400, 600, 700, 800, 900, 1000, 1100, 1200, 2000, and 2100 described herein in accordance with one or more embodiments (hereinafter, the noted processes and/or methods).

Hardware processing circuitry 3502 is electrically coupled to a computer-readable storage medium 3504 via a bus 3508. Hardware processing circuitry 3502 is further electrically coupled to an I/O interface 3510 by bus 3508. A network interface 3512 is further electrically connected to processing circuitry 3502 via bus 3508. Network interface 3512 is connected to a network 3514, so that processing circuitry 3502 and computer-readable storage medium 3504 connect to external elements via network 3514. processing circuitry 3502 is configured to execute computer instructions 3506 encoded in computer-readable storage medium 3504 in order to cause CPE system 3500 to be usable for performing the noted processes and/or methods, such as methods 400, 600, 700, 800, 900, 1000, 1100, 1200, 2000, and 2100 of FIGS. 4, 6, 7, 8, 9, 10, 11, 12, 20 and 21. In one or more embodiments, processing circuitry 3502 is a central processing unit (CPU), a multi-processor, a distributed processing system, an application specific integrated circuit (ASIC), and/or a suitable processing unit.

In one or more embodiments, computer-readable storage medium 3504 is an electronic, magnetic, optical, electromagnetic, infrared, and/or a semiconductor system (or apparatus or device). For example, computer-readable storage medium 3504 includes a semiconductor or solid-state memory, a magnetic tape, a removable computer diskette, a random-access memory (RAM), a read-memory (ROM), a rigid magnetic disk, and/or an optical disk. In one or more embodiments using optical disks, computer-readable storage medium 3504 includes a compact disk-read memory (CD-ROM), a compact disk-read/write (CD-R/W), and/or a digital video disc (DVD).

In one or more embodiments, storage medium 3504 stores computer instructions 3506 configured to cause CPE system 3500 to be usable for performing a portion or the noted processes and/or methods. In one or more embodiments, storage medium 3504 further stores information, such as a correlation and policy engine which facilitates performing the noted processes and/or methods.

CPE system 3500 includes I/O interface 3510 that is like UI 208. I/O interface 3510 is coupled to external circuitry. In one or more embodiments, I/O interface 3510 includes a keyboard, keypad, mouse, trackball, trackpad, touchscreen, cursor direction keys and/or other suitable I/O interfaces are within the contemplated scope of the disclosure for communicating information and commands to processing circuitry 3502.

CPE system 3500 further includes network interface 3512 coupled to processing circuitry 3502. Network interface 3512 allows CPE system 3500 to communicate with network 3514, to which one or more other computer systems are connected. Network interface 3512 includes wireless network interfaces such as BLUETOOTH, WIFI, WIMAX, GPRS, or WCDMA; or wired network interfaces such as ETHERNET, USB, or IEEE-864. In one or more embodiments, noted processes and/or methods, is implemented in two or more CPE system 3500.

CPE system 3500 is configured to receive information through I/O interface 3510. The information received through I/O interface 3510 includes one or more of instructions, data, and/or other parameters for processing by processing circuitry 3502. The information is transferred to processing circuitry 3502 via bus 3508. CPE system 3500 is configured to receive information related to a UI through I/O interface 3510. The information is stored in computer-readable medium 3504 as user interface (UI) 3518.

In some embodiments, the noted processes and/or methods are implemented as a standalone software application for execution by processing circuitry. In some embodiments, the noted processes and/or methods are implemented as a software application that is a part of an additional software application. In some embodiments, the noted processes and/or methods is implemented as a plug-in to a software application.

In some embodiments, the processes are realized as functions of a program stored in a non-transitory computer readable recording medium. Examples of a non-transitory computer-readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

In some embodiments, a system includes processing circuitry; and a memory connected to the processing circuitry, wherein the memory is configured to store executable instructions that, when executed by the processing circuitry, facilitate performance of operations, including receive a policy template identifier; receive network element selections; receive network element filter parameters; receive network event parameters; receive conjunctive operation parameters; receive action configuration parameters; and create a network policy template to monitor event messages and perform an action based on the action configuration parameters.

In some embodiments, the executable instructions further facilitate performance of operations, including receive notification parameters to inform selected recipients of results of the action taken based on the action configuration parameters.

In some embodiments, the executable instructions further facilitate performance of operations, including cause a graphical user interface (GUI) to be output by a user interface (UI), the GUI including a display including a user selection field configured to create a custom policy template in response to a user input.

In some embodiments, the executable instructions further facilitate performance of operations, including cause a first graphical user interface (GUI) to be output by a user interface (UI), the first GUI including a display including a user selection field configured to display a drag and drop user selection field when selected by a user; in response to the drag and drop user selection field being dragged and dropped, cause a second graphical user interface (GUI) to be output by the UI, the second GUI including a display including user input fields to accept parameters for a network element type.

In some embodiments, the receiving network element selections includes cause a graphical user interface (GUI) to be output by a user interface (UI), the GUI including a display including one or more user input fields configured to receive one or more user inputs identifying a network element, a default location, a network element filter, a geography level, or filter value.

In some embodiments, the executable instructions further facilitate performance of operations, including cause a first graphical user interface (GUI) to be output by a user interface (UI), the first GUI including a display including a user selection field configured to display a drag and drop user selection field when selected by a user; in response to the drag and drop user selection field being dragged and dropped, cause a second graphical user interface (GUI) to be output by the UI, the second GUI including a display including user input fields to accept parameters for a conjunction operator to be associated with two event sources.

In some embodiments, the receiving the conjunctive operation parameters, includes cause a graphical user interface (GUI) to be output by a user interface (UI), the GUI including a display including one or more input fields configured to receive one or more inputs identifying a conjunctive operator type, a network element type, a time window for the conjunctive operator type, a first trigger event, and a second trigger event coupled to the first trigger event by the conjunctive operator type.

In some embodiments, the executable instructions further facilitate performance of operations, including cause a first graphical user interface (GUI) to be output by a user interface (UI), the first GUI including a display including a user selection field configured to display a drag and drop user selection field when selected by a user; in response to the drag and drop user selection field being dragged and dropped, cause a second graphical user interface (GUI) to be output by the UI, the second GUI including a display including user input fields to accept parameters for an action to be taken in response to a triggered event occurring.

In some embodiments, receiving the action configuration parameters, includes cause a graphical user interface (GUI) to be output by a user interface (UI), the GUI including a display including one or more input fields configured to receive one or more inputs identifying an action resource in which to implement the action, the action to be initiated, or a payload; and an input filed configured to receive an input designating the action is to be taken when a change request is initiated.

In some embodiments, a method executed by a processor, including receiving a policy template identifier; receiving network element selections; receiving network element filter parameters; receiving network event parameters; receiving conjunctive operation parameters; receiving action configuration parameters; and creating a network policy template to monitor event messages and perform an action based on the action configuration parameters.

In some embodiments, the method further includes receiving notification parameters to inform selected recipients of results of the action taken based on the action configuration parameters.

In some embodiments, the method further includes causing a graphical user interface (GUI) to be output by a user interface (UI), the GUI including a display including a user selection field configured to create a custom policy template in response to a user input.

In some embodiments, the method further includes causing a first graphical user interface (GUI) to be output by a user interface (UI), the first GUI including a display including a user selection field configured to display a drag and drop user selection field when selected by a user; in response to the drag and drop user selection field being dragged and dropped, causing a second graphical user interface (GUI) to be output by the UI, the second GUI including a display including user input fields to accept parameters for a network element type.

In some embodiments, the method further including causing a graphical user interface (GUI) to be output by a user interface (UI), the GUI including a display including one or more user input fields configured to receive one or more user inputs identifying a network element, a default location, a network element filter, a geography level, or filter value.

In some embodiments, the method further includes causing a first graphical user interface (GUI) to be output by a user interface (UI), the first GUI including a display including a user selection field configured to display a drag and drop user selection field when selected by a user; in response to the drag and drop user selection field being dragged and dropped, causing a second graphical user interface (GUI) to be output by the UI, the second GUI including a display including user input fields to accept parameters for a conjunction operator to be associated with two event sources.

In some embodiments, the method further includes causing a graphical user interface (GUI) to be output by a user interface (UI), the GUI including a display including one or more input fields configured to receive one or more inputs identifying a conjunctive operator type, a network element type, a time window for the conjunctive operator type, a first trigger event, and a second trigger event coupled to the first trigger event by the conjunctive operator type.

In some embodiments, the method further includes causing a first graphical user interface (GUI) to be output by a user interface (UI), the first GUI including a display including a user selection field configured to display a drag and drop user selection field when selected by a user; in response to the drag and drop user selection field being dragged and dropped, causing a second graphical user interface (GUI) to be output by the UI, the second GUI including a display including user input fields to accept parameters for an action to be taken in response to a triggered event occurring.

In some embodiments, the method further includes causing a graphical user interface (GUI) to be output by a user interface (UI), the GUI including a display including one or more input fields configured to receive one or more inputs identifying an action resource in which to implement the action, the action to be initiated, or a payload; and an input filed configured to receive an input designating the action is to be taken when a change request is initiated.

In some embodiments, a device includes a non-transitory, tangible computer readable storage medium storing a computer program, wherein the computer program contains instructions that when executed, cause a processor to perform operations including receive a policy template identifier; receive network element selections; receive network element filter parameters; receive network event parameters; receive conjunctive operation parameters; receive action configuration parameters; and create a network policy template to monitor event messages and perform an action based on the action configuration parameters.

In some embodiments, the instructions further cause the processor to perform operations including receive notification parameters to inform selected recipients of results of the action taken based on the action configuration parameters.

The foregoing outlines features of several embodiments so that those skilled in the art better understand the aspects of the present disclosure. Those skilled in the art should appreciate that they readily use the present disclosure as a basis for designing or modifying other processes and structures for carrying out the same purposes and/or achieving the same advantages of the embodiments introduced herein. Those skilled in the art should further realize that such equivalent constructions do not depart from the spirit and scope of the present disclosure, and that they make various changes, substitutions, and alterations herein without departing from the spirit and scope of the present disclosure.

What is claimed is:

1. A system, comprising:
    processing circuitry; and
    a memory connected to the processing circuitry, wherein the memory is configured to store executable instructions that, when executed by the processing circuitry, facilitate performance of operations, comprising:
        receive a policy template identifier;
        receive network element selections;
        receive network element filter parameters;
        receive network event parameters;
        receive conjunctive operation parameters;
        receive action configuration parameters; and
        create a network policy template to monitor event messages and perform an action based on the action configuration parameters.

2. The system of claim 1, wherein the executable instructions further facilitate performance of operations, comprising:
    receive notification parameters to inform selected recipients of results of the action taken based on the action configuration parameters.

3. The system of claim 1, wherein the executable instructions further facilitate performance of operations, comprising:
    cause a graphical user interface (GUI) to be output by a user interface (UI), the GUI comprising:
        a display including a user selection field configured to create a custom policy template in response to a user input.

4. The system of claim 1, wherein the executable instructions further facilitate performance of operations, comprising:
    cause a first graphical user interface (GUI) to be output by a user interface (UI), the first GUI comprising:
        a display including a user selection field configured to display a drag and drop user selection field when selected by a user;
    in response to the drag and drop user selection field being dragged and dropped, cause a second graphical user interface (GUI) to be output by the UI, the second GUI comprising:
        a display including user input fields to accept parameters for a network element type.

5. The system of claim 1, wherein the receiving network element selections comprises:
    cause a graphical user interface (GUI) to be output by a user interface (UI), the GUI comprising:
        a display including one or more user input fields configured to receive one or more user inputs identifying a network element, a default location, a network element filter, a geography level, or filter value.

6. The system of claim 1, wherein the executable instructions further facilitate performance of operations, comprising:
    cause a first graphical user interface (GUI) to be output by a user interface (UI), the first GUI comprising:
        a display including a user selection field configured to display a drag and drop user selection field when selected by a user;
    in response to the drag and drop user selection field being dragged and dropped, cause a second graphical user interface (GUI) to be output by the UI, the second GUI comprising:
        a display including user input fields to accept parameters for a conjunction operator to be associated with two event sources.

7. The system of claim 1, wherein the receiving the conjunctive operation parameters, comprises:
    cause a graphical user interface (GUI) to be output by a user interface (UI), the GUI comprising:
        a display including one or more input fields configured to receive one or more inputs identifying a conjunctive operator type, a network element type, a time window for the conjunctive operator type, a first trigger event, and a second trigger event coupled to the first trigger event by the conjunctive operator type.

8. The system of claim 1, wherein the executable instructions further facilitate performance of operations, comprising:
    cause a first graphical user interface (GUI) to be output by a user interface (UI), the first GUI comprising:
        a display including a user selection field configured to display a drag and drop user selection field when selected by a user;
    in response to the drag and drop user selection field being dragged and dropped, cause a second graphical user interface (GUI) to be output by the UI, the second GUI comprising:
        a display including user input fields to accept parameters for an action to be taken in response to a triggered event occurring.

9. The system of claim 1, wherein receiving the action configuration parameters, comprises:
    cause a graphical user interface (GUI) to be output by a user interface (UI), the GUI comprising:
        a display including one or more input fields configured to receive one or more inputs identifying an action resource in which to implement the action, the action to be initiated, or a payload; and an input filed configured to receive an input designating the action is to be taken when a change request is initiated.

10. A method executed by a processor, comprising:
receiving a policy template identifier;
receiving network element selections;
receiving network element filter parameters;
receiving network event parameters;
receiving conjunctive operation parameters;
receiving action configuration parameters; and
creating a network policy template to monitor event messages and perform an action based on the action configuration parameters.

11. The method of claim 10, further comprising:
receiving notification parameters to inform selected recipients of results of the action taken based on the action configuration parameters.

12. The method of claim 10, further comprising:
causing a graphical user interface (GUI) to be output by a user interface (UI), the GUI comprising:
a display including a user selection field configured to create a custom policy template in response to a user input.

13. The method of claim 10, further comprising:
causing a first graphical user interface (GUI) to be output by a user interface (UI), the first GUI comprising:
a display including a user selection field configured to display a drag and drop user selection field when selected by a user;
in response to the drag and drop user selection field being dragged and dropped, causing a second graphical user interface (GUI) to be output by the UI, the second GUI comprising:
a display including user input fields to accept parameters for a network element type.

14. The method of claim 10, further comprising:
causing a graphical user interface (GUI) to be output by a user interface (UI), the GUI comprising:
a display including one or more user input fields configured to receive one or more user inputs identifying a network element, a default location, a network element filter, a geography level, or filter value.

15. The method of claim 10, further comprising:
causing a first graphical user interface (GUI) to be output by a user interface (UI), the first GUI comprising:
a display including a user selection field configured to display a drag and drop user selection field when selected by a user;
in response to the drag and drop user selection field being dragged and dropped, causing a second graphical user interface (GUI) to be output by the UI, the second GUI comprising:
a display including user input fields to accept parameters for a conjunction operator to be associated with two event sources.

16. The method of claim 10, further comprising:
causing a graphical user interface (GUI) to be output by a user interface (UI), the GUI comprising:
a display including one or more input fields configured to receive one or more inputs identifying a conjunctive operator type, a network element type, a time window for the conjunctive operator type, a first trigger event, and a second trigger event coupled to the first trigger event by the conjunctive operator type.

17. The method of claim 10, further comprising:
causing a first graphical user interface (GUI) to be output by a user interface (UI), the first GUI comprising:
a display including a user selection field configured to display a drag and drop user selection field when selected by a user;
in response to the drag and drop user selection field being dragged and dropped, causing a second graphical user interface (GUI) to be output by the UI, the second GUI comprising:
a display including user input fields to accept parameters for an action to be taken in response to a triggered event occurring.

18. The method of claim 10, further comprising:
causing a graphical user interface (GUI) to be output by a user interface (UI), the GUI comprising:
a display including one or more input fields configured to receive one or more inputs identifying an action resource in which to implement the action, the action to be initiated, or a payload; and
an input filed configured to receive an input designating the action is to be taken when a change request is initiated.

19. A device comprising:
a non-transitory, tangible computer readable storage medium storing a computer program, wherein the computer program contains instructions that when executed, cause a processor to perform operations comprising:
receive a policy template identifier;
receive network element selections;
receive network element filter parameters;
receive network event parameters;
receive conjunctive operation parameters;
receive action configuration parameters; and
create a network policy template to monitor event messages and perform an action based on the action configuration parameters.

20. The device of claim 19, wherein the instructions further cause the processor to perform operations comprising:
receive notification parameters to inform selected recipients of results of the action taken based on the action configuration parameters.

* * * * *